(12) United States Patent
Jayawardene et al.

(10) Patent No.: US 11,736,841 B2
(45) Date of Patent: Aug. 22, 2023

(54) APPARATUS AND METHODS FOR ENABLING MOBILITY OF A USER DEVICE IN AN ENHANCED WIRELESS NETWORK

(71) Applicant: CHARTER COMMUNICATIONS OPERATING, LLC, St. Louis, MO (US)

(72) Inventors: Diwelawatte Jayawardene, Aurora, CO (US); Manish Jindal, Centennial, CO (US); Pratik Das, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 526 days.

(21) Appl. No.: 16/261,234

(22) Filed: Jan. 29, 2019

(65) Prior Publication Data

US 2019/0320494 A1 Oct. 17, 2019

Related U.S. Application Data

(60) Provisional application No. 62/658,465, filed on Apr. 16, 2018.

(51) Int. Cl.
*H04Q 11/02* (2006.01)
*H04L 5/00* (2006.01)
(Continued)

(52) U.S. Cl.
CPC ............ *H04Q 11/02* (2013.01); *H04J 3/1652* (2013.01); *H04L 5/0007* (2013.01);
(Continued)

(58) Field of Classification Search
CPC . H04W 16/14; H04W 36/08; H04W 72/0453; H04W 80/10; H04L 5/0007; H04L 12/2801
See application file for complete search history.

(56) References Cited

U.S. PATENT DOCUMENTS 5,742,583 A   4/1998 Scott
6,542,739 B1  4/2003 Garner
(Continued)

FOREIGN PATENT DOCUMENTS

CN    105071860 A   11/2015
EP      0812119 A2  12/1997
(Continued)

OTHER PUBLICATIONS

Campos et al., U.S. Appl. No. 62/620,615, filed Jan. 23, 2018 related to publication US 2019/0229974 A1. (Year: 2018).*
(Continued)

*Primary Examiner* — Scott M Sciacca
(74) *Attorney, Agent, or Firm* — Patent Beach PC

(57) ABSTRACT

Apparatus and methods for unified high-bandwidth, low-latency data services provided with enhanced user mobility. In one embodiment, a network architecture having service delivery over at least portions of extant infrastructure (e.g., a hybrid fiber coax infrastructure) is disclosed, which includes standards-compliant ultra-low latency and high data rate services (e.g., 5G NR services) via a common service provider. Premises devices are used to provide the 5G-based services to users at a given premises and thereabouts. In another variant, local area (e.g., "pole mounted") radio devices are used to provide supplemental RF coverage, including during mobility scenarios. The 5G-capable network enables uninterrupted and "seamless" exchange of data at a client device by utilizing a common waveform protocol (e.g., 3GPP-based) at a premises device and an external radio device to communicate with a client device at different locations and times while the device is moving between inside and outside the premises.

22 Claims, 26 Drawing Sheets

(51) Int. Cl.

| | |
|---|---|
| *H04L 12/28* | (2006.01) |
| *H04W 16/14* | (2009.01) |
| *H04W 36/08* | (2009.01) |
| *H04W 72/04* | (2023.01) |
| *H04W 80/10* | (2009.01) |
| *H04L 27/00* | (2006.01) |
| *H04L 27/26* | (2006.01) |
| *H04W 72/0453* | (2023.01) |
| *H04J 3/16* | (2006.01) |
| *H04W 56/00* | (2009.01) |
| *H04L 41/5003* | (2022.01) |
| *H04L 47/70* | (2022.01) |
| *H04L 67/12* | (2022.01) |
| *H04W 48/18* | (2009.01) |
| *H04L 61/5007* | (2022.01) |
| *H04M 7/00* | (2006.01) |
| *H04W 84/04* | (2009.01) |

(52) U.S. Cl.
CPC ........ *H04L 5/0041* (2013.01); *H04L 12/2801* (2013.01); *H04L 27/0006* (2013.01); *H04L 27/2637* (2013.01); *H04L 41/5003* (2013.01); *H04L 47/821* (2013.01); *H04L 61/5007* (2022.05); *H04L 67/12* (2013.01); *H04W 16/14* (2013.01); *H04W 36/08* (2013.01); *H04W 48/18* (2013.01); *H04W 56/001* (2013.01); *H04W 72/0453* (2013.01); *H04W 80/10* (2013.01); *H04M 7/006* (2013.01); *H04Q 2213/13012* (2013.01); *H04W 84/042* (2013.01)

(56) References Cited

U.S. PATENT DOCUMENTS

| | | | |
|---|---|---|---|
| 7,366,286 | B1 | 4/2008 | Shenoi |
| 7,581,012 | B2 | 8/2009 | Shiouchi et al. |
| 7,606,529 | B1 | 10/2009 | Swan et al. |
| 8,265,028 | B2 | 9/2012 | Davies et al. |
| 8,599,797 | B2 | 12/2013 | Pelkonen |
| 8,724,588 | B2 | 5/2014 | Li et al. |
| 8,750,710 | B1 | 6/2014 | Hirt et al. |
| 8,880,071 | B2 | 11/2014 | Taaghol et al. |
| 8,989,297 | B1 | 3/2015 | Lou et al. |
| 9,001,789 | B2 | 4/2015 | Hosobe |
| 9,185,341 | B2 | 11/2015 | Hardin |
| 9,209,898 | B1 | 12/2015 | Schemmann et al. |
| 9,300,445 | B2 | 3/2016 | Hardin |
| 9,596,593 | B2 | 3/2017 | Li et al. |
| 9,681,490 | B1 | 6/2017 | Umamaheswar et al. |
| 9,706,512 | B2 | 7/2017 | Suh |
| 9,948,349 | B2 | 4/2018 | Malach |
| 10,009,431 | B2 | 6/2018 | Holtmanns |
| 10,164,858 | B2 | 12/2018 | Gunasekara et al. |
| 10,375,629 | B2 | 8/2019 | Zhang |
| 10,506,499 | B2 | 12/2019 | Keller et al. |
| 10,693,687 | B1 | 6/2020 | Kushnir |
| 10,742,270 | B1 | 8/2020 | Kim |
| 10,924,825 | B2 | 2/2021 | Das et al. |
| 11,129,213 | B2 | 9/2021 | Maulik |
| 2004/0158649 | A1 | 8/2004 | Ophir et al. |
| 2004/0187156 | A1 | 9/2004 | Palm et al. |
| 2005/0034159 | A1 | 2/2005 | Ophir et al. |
| 2005/0063317 | A1 | 3/2005 | Risberg et al. |
| 2008/0101291 | A1 | 5/2008 | Jiang et al. |
| 2008/0279287 | A1 | 11/2008 | Asahina |
| 2009/0110088 | A1 | 4/2009 | Di Giandomenico et al. |
| 2009/0119735 | A1 | 5/2009 | Dounaevski et al. |
| 2009/0176490 | A1 | 7/2009 | Kazmi et al. |
| 2009/0207800 | A1 | 8/2009 | Shan et al. |
| 2009/0217326 | A1 | 8/2009 | Hasek |
| 2010/0008235 | A1 | 1/2010 | Tinnakornsrisuphap et al. |
| 2010/0064330 | A1 | 3/2010 | Yu et al. |
| 2010/0178912 | A1 | 7/2010 | Gunnarsson et al. |
| 2011/0117917 | A1 | 5/2011 | Gresset et al. |
| 2011/0207456 | A1 | 8/2011 | Radulescu et al. |
| 2012/0076009 | A1 | 3/2012 | Pasko |
| 2012/0083207 | A1 | 4/2012 | Rofougaran et al. |
| 2012/0224563 | A1 | 9/2012 | Zisimopoulos et al. |
| 2012/0246255 | A1 | 9/2012 | Walker et al. |
| 2012/0275315 | A1 | 11/2012 | Schlangen et al. |
| 2013/0010686 | A1 | 1/2013 | Shatzkamer et al. |
| 2013/0077554 | A1 | 3/2013 | Gauvreau et al. |
| 2013/0156115 | A1* | 6/2013 | Petrovic ............... H04N 7/104 375/257 |
| 2013/0178225 | A1 | 7/2013 | Xing |
| 2013/0252616 | A1 | 9/2013 | Murakami |
| 2013/0267229 | A1 | 10/2013 | Gopalakrishnan |
| 2013/0279914 | A1 | 10/2013 | Brooks |
| 2013/0322504 | A1 | 12/2013 | Asati et al. |
| 2014/0148107 | A1 | 5/2014 | Maltsev et al. |
| 2014/0370895 | A1 | 12/2014 | Pandey et al. |
| 2015/0085853 | A1 | 3/2015 | Smith et al. |
| 2015/0156777 | A1 | 6/2015 | Negus et al. |
| 2015/0181363 | A1 | 6/2015 | Khorami |
| 2015/0201088 | A1 | 7/2015 | Wu et al. |
| 2015/0229584 | A1 | 8/2015 | Okamoto et al. |
| 2015/0365178 | A1 | 12/2015 | Maattanen et al. |
| 2016/0013855 | A1 | 1/2016 | Campos et al. |
| 2016/0020835 | A1 | 1/2016 | Stadelmeier et al. |
| 2016/0021595 | A1* | 1/2016 | Czaja ............... H04W 36/0055 455/440 |
| 2016/0073344 | A1 | 3/2016 | Vutukuri et al. |
| 2016/0094421 | A1 | 3/2016 | Bali et al. |
| 2016/0127434 | A1 | 5/2016 | Yoon et al. |
| 2016/0128072 | A1 | 5/2016 | Rajagopal et al. |
| 2016/0212632 | A1 | 7/2016 | Katamreddy et al. |
| 2016/0259923 | A1 | 9/2016 | Papa et al. |
| 2016/0373974 | A1 | 12/2016 | Gomes et al. |
| 2017/0019144 | A1 | 1/2017 | Malach |
| 2017/0118527 | A1 | 4/2017 | Wachob et al. |
| 2017/0164068 | A1 | 6/2017 | Wachob et al. |
| 2017/0201912 | A1 | 7/2017 | Zingler et al. |
| 2017/0208488 | A1 | 7/2017 | Hwang et al. |
| 2017/0245281 | A1 | 8/2017 | Zuckerman et al. |
| 2017/0265220 | A1 | 9/2017 | Andreoli-Fang et al. |
| 2018/0063813 | A1 | 3/2018 | Gupta et al. |
| 2018/0092142 | A1 | 3/2018 | Han et al. |
| 2018/0098245 | A1 | 4/2018 | Livanos et al. |
| 2018/0146408 | A1* | 5/2018 | Meylan ............... H04W 48/16 |
| 2018/0167128 | A1 | 6/2018 | Kinamon et al. |
| 2018/0184337 | A1* | 6/2018 | Jin ............... H04B 3/23 |
| 2018/0213452 | A1* | 7/2018 | Kim ............... H04L 5/0053 |
| 2018/0269974 | A1 | 9/2018 | Luciano |
| 2018/0331935 | A1 | 11/2018 | Ross et al. |
| 2018/0338277 | A1 | 11/2018 | Byun et al. |
| 2018/0343685 | A1 | 11/2018 | Hart et al. |
| 2018/0351809 | A1 | 12/2018 | Meredith et al. |
| 2019/0007870 | A1 | 1/2019 | Gupta et al. |
| 2019/0028141 | A1 | 1/2019 | Padden et al. |
| 2019/0037630 | A1 | 1/2019 | Zhang et al. |
| 2019/0053193 | A1 | 2/2019 | Park et al. |
| 2019/0075023 | A1 | 3/2019 | Sirotkin |
| 2019/0082501 | A1 | 3/2019 | Vesely et al. |
| 2019/0109643 | A1 | 4/2019 | Campos et al. |
| 2019/0124572 | A1 | 4/2019 | Park et al. |
| 2019/0124696 | A1 | 4/2019 | Islam et al. |
| 2019/0208380 | A1 | 7/2019 | Shi et al. |
| 2019/0229974 | A1* | 7/2019 | Campos ............... H04L 27/0008 |
| 2019/0245740 | A1 | 8/2019 | Kachhla |
| 2019/0253944 | A1 | 8/2019 | Kim |
| 2019/0261264 | A1 | 8/2019 | Lou et al. |
| 2019/0289470 | A1 | 9/2019 | Vaidya et al. |
| 2019/0319814 | A1 | 10/2019 | Das |
| 2019/0319858 | A1 | 10/2019 | Das et al. |
| 2019/0320250 | A1 | 10/2019 | Hoole et al. |
| 2019/0320322 | A1 | 10/2019 | Jayawardene et al. |
| 2019/0349848 | A1 | 11/2019 | Bali |

(56) References Cited

U.S. PATENT DOCUMENTS

| | | |
|---|---|---|
| 2019/0357037 A1 | 11/2019 | Velev et al. |
| 2019/0357199 A1 | 11/2019 | Ali et al. |
| 2019/0364565 A1 | 11/2019 | Hmimy et al. |
| 2019/0379455 A1 | 12/2019 | Wang et al. |
| 2020/0053545 A1 | 2/2020 | Wong et al. |
| 2020/0091608 A1 | 3/2020 | Alpman et al. |
| 2020/0112888 A1 | 4/2020 | Glennon et al. |
| 2020/0120724 A1 | 4/2020 | Vaidya et al. |
| 2020/0154388 A1 | 5/2020 | Koshimizu et al. |
| 2020/0214065 A1 | 7/2020 | Tomala et al. |
| 2020/0280836 A1 | 9/2020 | Velev et al. |
| 2021/0028915 A1 | 1/2021 | Jia |
| 2021/0029759 A1 | 1/2021 | Tang |
| 2021/0112551 A1 | 4/2021 | Anderson et al. |
| 2021/0175925 A1 | 6/2021 | Tarighat Mehrabani |
| 2021/0176665 A1* | 6/2021 | Lan .................. H04W 72/0453 |
| 2021/0250196 A1 | 8/2021 | Das et al. |
| 2021/0289275 A1 | 9/2021 | Das |
| 2021/0336815 A1 | 10/2021 | Das et al. |
| 2021/0337543 A1 | 10/2021 | Das et al. |
| 2022/0007440 A1 | 1/2022 | Vaidya et al. |
| 2022/0039180 A1 | 2/2022 | Mukherjee et al. |
| 2022/0046343 A1 | 2/2022 | Hoole et al. |
| 2022/0078624 A1 | 3/2022 | Hong |
| 2022/0132524 A1 | 4/2022 | Mueck et al. |

FOREIGN PATENT DOCUMENTS

| | | | |
|---|---|---|---|
| GB | 2548796 A | 10/2017 | |
| JP | 2006325206 A | 11/2006 | |
| JP | 2007281617 A | 10/2007 | |
| JP | 2010136020 A | 6/2010 | |
| JP | 2011254495 A | 12/2011 | |
| JP | 2016511998 A | 4/2016 | |
| JP | 2017118483 A | 6/2017 | |
| JP | 2018023050 A | 2/2018 | |
| JP | 2018510589 A | 4/2018 | |
| KR | 20160097917 A | 8/2016 | |
| WO | WO-2004045125 A2 | 5/2004 | |
| WO | WO-2013096563 A1 | 6/2013 | |
| WO | WO-2015147707 A1 * | 10/2015 | ............ H04W 24/08 |
| WO | WO-2017186294 A1 | 11/2017 | |
| WO | WO-2018131488 A1 | 7/2018 | |
| WO | WO-2019204165 A1 | 10/2019 | |
| WO | WO-2019204336 A1 | 10/2019 | |
| WO | WO-2020033334 A1 | 2/2020 | |

OTHER PUBLICATIONS

3GPP., "Evolved Universal Terrestrial Radio Access (E-UTRA), Carrier Aggregation, Base Station (BS) radio transmission and reception (Release 10)", Technical Specification Group Radio Access Network, Technical Report (TR 36.808 V10.1.0), 2013, 31 pages.

3GPP TS 23.234 v13.1.0, "3GPP system to Wireless Local Area Network (WLAN) interworking; System description (Release 13)" 2017, 18 pages.

3GPP TS 32.300 V15.0.0 (Jun. 2018), Technical Specification—3rd Generation Partnership Project; Technical Specification Group Services and System Aspects; Telecommunication management; Configuration Management (CM); Name convention for managed objects, (Release 15) Jun. 2018, 27 pages.

3GPP TS 36.413, V14.4.1, "3rd Generation Partnership Project; Technical Specification Group Radio Access Network; Evolved Universal Terrestrial Radio Access Network (E-UTRAN); S1 Application Protocol (S1AP) (Release 14)", 2018.

3GPP TS 38.473 V15.A.A (Apr. 2018)"3rd Generation Partnership Project; Technical Specification Group Radio Access Network," TS 38.473 (v15.0.0), Dec. 2017, NG-RAN, F1 application protocol (F1AP), Release 15, 90 pages.

3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.

Article 5 of the Radio Regulations (edition 2001), Introduction to International Radio Regulations, 161 pages.

Interworking Wi-Fi and Mobile Networks, The Choice of Mobility Solutions, White Paper, 2013, 13 pages.

Nokia 5G New Radio (NR): Physical Layer Overview and Performance, IEEE Communication Theory Workshop, 2018 by A. Ghosh, May 15, 2018, 38 pages.

Wi-Fi Agile Multiband Specification Version 1.2 dated Dec. 31, 2018.

Wi-Fi Certified Agile MultibandTM Technology Overview, Dec. 2017, 9 pages.

Broadband Forum: "SD-420 R2 5G Fixed Mobile Convergence Study", Aug. 14, 2018 (Aug. 14, 2018), XP051533179, [retrieved on Aug. 14, 2018]Retrieved from the Internet: URL:http://www.3gpp.org/ftp/tsg_sa/TSG_SA/TSGS_81/Docs/SP-180636.zip.

Maamoun K. M. et al., "A Survey and a Novel Scheme for RoF-PON as FTTx Wireless Services," 2009 6th InternationalSymposium on High Capacity Optical Networks and EnablingTechnologies(HONET), IEEE, 2009, pp. 246-253.

\* cited by examiner

APPARATUS AND METHODS FOR ENABLING MOBILITY OF A USER DEVICE IN AN ENHANCED WIRELESS NETWORK

PRIORITY AND RELATED APPLICATIONS

This application claims the benefit of priority to U.S. Provisional Patent Application No. 62/658,465 filed Apr. 16, 2018 and entitled "APPARATUS AND METHODS FOR INTEGRATED HIGH-CAPACITY DATA AND WIRELESS NETWORK SERVICES", which is incorporated herein by reference in its entirety. This application is also related to U.S. patent application Ser. No. 16/216,835 filed Dec. 11, 2018 and entitled "APPARATUS AND METHODS FOR INTEGRATED HIGH-CAPACITY DATA AND WIRELESS NETWORK SERVICES," which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to an architecture which integrates or unifies provision of high-speed data services in a variety of different locations and use cases.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere", anytime," so that users (subscribers) can access the desired services (e.g., watch a movie) via a number of different receiving and rendering platforms, such as in different rooms of their house, on their mobile device while traveling, etc.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1 and 2 are a functional block diagrams illustrating a typical prior art managed (e.g., cable) content delivery network architecture used to provide such data services to its users and sub scribers.

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOC SIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Within the cable plant, VOD and so-called switched digital video (SDV) may also be used to provide content, and utilize a single-program transport stream (SPTS) delivery modality. In U. S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as SD. For an exemplary MPEG-2 Main Profile—High Level (MP@HL) video compression, each HD program requires around 15 Mbps bitrate.

Wireless

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

5G New Radio (NR) and NG-RAN (Next Generation Radio Area Network)—

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip")

wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As a brief aside, and referring to FIG. 3, the CU 304 (also known as gNB-CU) is a logical node within the NR architecture 300 that communicates with the NG Core 303, and includes gNB functions such as transfer of user data, session management, mobility control, RAN sharing, and positioning; however, other functions are allocated exclusively to the DU(s) 306 (also known as gNB-DUs) per various "split" options described subsequently herein in greater detail. The CU 304 communicates user data and controls the operation of the DU(s) 306, via corresponding front-haul (Fs) user plane and control plane interfaces 308, 310.

Accordingly, to implement the Fs interfaces 308, 310, the (standardized) F1 interface is employed. It provides a mechanism for interconnecting a gNB-CU 304 and a gNB-DU 306 of a gNB 302 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473.

Within such an architecture 300, a gNB-DU 306 (or ngeNB-DU) is under the control of a single gNB-CU 304. When a gNB-DU is initiated (including power-up), it executes the F1 SETUP procedure (which is generally modeled after the above-referenced S1 SETUP procedures of LTE) to inform the controlling gNB-CU of, inter alia, any number of parameters such as e.g., the number of cells (together with the identity of each particular cell) in the F1 SETUP REQUEST message.

Multi-RAT Devices and Mobility

In response to strong consumer demand for data connectivity, whether it be indoors and outdoors "on the go," data communication services are now ubiquitous throughout user premises (e.g., home, office, and even vehicles) as well as in most outdoor areas (e.g., via "data plans" that enable connections with cellular towers and nodes). Such data communication services may be provided via a managed or unmanaged network. For instance, a typical home has services provided by one or more network service providers via a managed network such as a cable or satellite network, as well as an (independent) MNO or MVNO such as a cellular service provider. MSO services may include for instance content delivery (e.g., linear television, on-demand content, personal or cloud DVR, "start over", etc.), as well as so-called "over-the-top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere, anytime," so that users (subscribers) can access the desired services (e.g., listen to music, use mobile applications such as email or social media, watch a video) via a number of different receiving and rendering platforms, such as in different rooms of their house, on their mobile device while traveling, etc.

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

One such technology that enables a user to engage in wireless communication (e.g., via services provided through the cable network operator) is Wi-Fi® (IEEE Std. 802.11), which has become a ubiquitously accepted standard for wireless networking in consumer electronics. Wi-Fi allows client devices to gain convenient high-speed access to networks (e.g., wireless local area networks (WLANs)) via one or more access points.

Commercially, Wi-Fi is able to provide services to a group of users within a venue or premises such as within a trusted home or business environment, or outside, e.g., cafes, hotels, business centers, restaurants, and other public areas. A typical Wi-Fi network setup may include the user's client device in wireless communication with an AP (and/or a modem connected to the AP) that are in communication with the backend, where the client device must be within a certain range that allows the client device to detect the signal from the AP and conduct communication with the AP.

Another wireless technology in widespread use is Long-Term Evolution standard (also colloquially referred to as "LTE," "4G," "LTE Advanced," among others). An LTE network is powered by an Evolved Packet Core ("EPC"), an Internet Protocol (IP)-based network architecture and eNodeB—Evolved NodeB or E-UTRAN node which part of the Radio Access Network (RAN), capable of providing high-speed wireless data communication services to many wireless-enabled devices of users with a wide coverage area.

Currently, most consumer devices include multi-RAT capability, e.g., the capability to access multiple different RATs, whether simultaneously, or in a "fail over" manner (such as via a wireless connection manager process running on the device). For example, a smartphone may be enabled for LTE data access, but when unavailable, utilize one or more Wi-Fi technologies (e.g., 802.11g/n/ac) for data communications.

The capabilities of different RATs (such as LTE and Wi-Fi) can be very different, including regarding establishment of wireless service to a given client device. As a brief aside, LTE-U enables data communication via LTE in an unlicensed spectrum (e.g., 5 GHz) to provide additional radio spectrum for data transmission (e.g., to compensate for overflow traffic). LTE-LAA uses carrier aggregation to combine LTE in unlicensed spectrum (e.g., 5 GHz) with the licensed band.

Increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as apartment buildings, hospitality units (e.g., hotels), enterprises, crowded venues, and the like, the contention issues may be unmanageable, even with a plethora of Wi-Fi APs installed to compensate. Yet further, there is generally no coordination between such APs, each in effect contending for bandwidth on its backhaul with others.

Most critically, lack of integration with other services provided by e.g., a managed network operator such as an MNO/MVNO, typically exists with unlicensed technology such as Wi-Fi. Wi-Fi typically acts as a "data pipe" opaquely carried by the network operator/service provider. This data pipe is logically isolated or siloed from mobile broadband services such as LTE/LTE-A or even LTE-U or -LAA; in fact, they utilize two different and non-harmonized sets of technology standards i.e., IEEE Std. 802.11 and 3GPP E-UTRAN/5G NR, respectively.

Better Solutions Needed

Even with the great advances in wireless data rate, robustness and coverage afforded by extant 4/4.5G (e.g. LTE/LTE-A) and WLAN (and other unlicensed) systems, significant disabilities still exist.

One such problem relates to the scenario where a broadband user migrates from an indoor use case to an outdoor use case. For instance, a user utilizing their premises Wi-Fi AP experiences a very limited range—perhaps 100 feet or so depending on premises construction and other factors—before they experience degradation and ultimately loss of signal. As noted above, due to (i) incompatible or non-harmonized technology standards, and (ii) no coordination between the e.g., WLAN service provider (MSO or ISP) and the mobile service provider (e.g., MNO or MVNO), there is no session continuity between shorter range technologies such as Wi-Fi and longer range broadband cellular systems such as LTE. Specifically, a user must terminate their Wi-Fi session and continue using a new LTE (3GPP) session.

Such "unlicensed to licensed" (and vice versa) spectral use presents unique challenges from the perspective of spectral management, in that unlicensed systems are often not configured to integrate with MNO systems (e.g., WLAN APs are not configured to comply with "unlicensed" 3GPP eUTRAN or other such standards such as LTE-U/LAA or NR-U as far as avoiding conflicts or interfering spectral allocations).

Moreover, since the foregoing solutions are generally not integrated or logically unified, they also require subscription to and use of multiple service provider technologies and infrastructure. For example, unlicensed WLAN APs within a user premises may be backhauled by a cable or fiber or satellite MSO, while cellular service is provided by a wholly separate MNO or MVNO using licensed cellular infrastructure.

In cases where MNO or other radio access node or base stations are backhauled by another provider (e.g., a wireless network built around HFC/DOCSIS as backhaul between the radio and wireless core network elements), several disadvantages are encountered, including (i) separate CAPEX (capital expenditure) and OPEX (operating expenditure) "silos" for maintaining the two different networks; i.e., wired and wireless; and (ii) lower data throughput efficiency and higher latency due to the additional overhead of encapsulating wireless data packets through e.g., the DOCSIS (backhaul) protocols. In the context of the aforementioned ultra-low latency requirements of 5G (i.e., 1 ms or less round-trip between endpoint nodes), such infrastructure-induced latency can result in failing to meet these requirements, making this architecture potentially unsuitable for 5G applications.

Accordingly, improved apparatus and methods are needed to, inter alia, enable optimized delivery of ultra-high data rate services (both wired and wireless) and which leverage extant network infrastructure, and which would also support seamless geographic, intra-platform and cross-platform (e.g., cross-RAT) mobility for users while providing such services, and support incipient applications and technologies such as IoT.

SUMMARY

The present disclosure addresses the foregoing needs by providing, inter alia, methods and apparatus for providing optimized user data mobility, including across different RATs.

In a first aspect of the disclosure, a method of operating a radio frequency (RF) network so that extant infrastructure is used to enable intra-network mobility of a client device is disclosed. In one embodiment, the method includes: transmitting OFDM (orthogonal frequency division multiplexing) waveforms over at least a portion of the extant infrastructure using at least a frequency band wider in frequency than a normal operating band of the extant infrastructure; receiving at least a portion of the transmitted OFDM waveforms via a premises device disposed at a premises; receiving at least a portion of the transmitted OFDM waveforms via a radio device external to the premises; enabling establishment of a radio frequency connection between the client device and the premises device; determining that the established radio frequency connection is at least one of (i) degrading, or (ii) not optimized; and based at least on the determining, causing establishment of a radio frequency connection between the client device and the radio device external to the premises.

In one variant, the extant infrastructure comprises a hybrid fiber coax (HFC) infrastructure, and at least one of (i) the radio frequency connection between the client device and the premises device, and (ii) the radio frequency connection between the client device and the radio device external to the premises, is configured for data delivery at rates in excess of 1 Gbps. In one implementation, the frequency band wider in frequency than a normal operating band of the extant infrastructure comprises a frequency band of at least 1.6 GHz in total bandwidth, and the method further includes allocating the frequency band of at least 1.6 GHz in total bandwidth to two or more sub-bands. In another variant, the radio frequency connections between (ii) the client device and the premises device, and (ii) the client device and the radio device external to the premises, enable at least delivery to the client device of the at least portion of the OFDM waveforms received by the premises device and the at least portion of the OFDM waveforms received by the radio device external to the premises, respectively.

In a further variant, the method includes: terminating the radio frequency connection between the premises device and the client device after the radio frequency connection between the radio device external to the premises and the client device has been established; and causing all OFDM waveforms destined for the client device to be transmitted to the radio device external to the premises.

In yet another variant, the method further includes upconverting the at least a portion of the OFDM waveforms received via the premises device to a user frequency band. Upconversion of the at least a portion of the OFDM waveforms received via the radio device external to the premises to the user frequency band may also be performed.

In one implementation, the establishments of the radio frequency connections between the premises device and the client device and between the radio device external to the premises and the client device each comprise establishment via a 3GPP (Third Generation Partnership Project) wireless protocol, and the user frequency band comprises at least one unlicensed frequency that is designated for use with at least one 3GPP unlicensed standard (such as at least one of: (i) a 5G NR-U (New Radio-Unlicensed) standard, or (ii) an LTE (Long Term Evolution) unlicensed standard).

In still another variant, the transmitting OFDM (orthogonal frequency division multiplexing) waveforms over at least a portion of the extant infrastructure using at least a frequency band wider in frequency than a normal operating band of the extant infrastructure comprises transmitting the OFDM waveforms over at least coaxial cable and via a plurality of amplifier stages associated with the coaxial cable.

In another aspect of the disclosure, a network architecture configured to support wireless user devices is disclosed. In one embodiment, the architecture includes: a distribution node, the distribution node configured to transmit radio frequency (RF) waveforms onto a wireline or optical medium of a network, the RF waveforms being orthogonal frequency division multiplex (OFDM) modulated; at least one user node in data communication with the wireline or optical medium and comprising a receiver apparatus configured to receive the transmitted OFDM modulated waveforms; a least one radio node in data communication with the distribution node, the at least one radio node configured to provide at least supplemental data communication to the at least one user node; and controller apparatus in data communication with the at least one user node and the at least one radio node.

In one variant, the controller apparatus is configured to effectuate at least one of: handover of a wireless user device at least from the at least one user node to the at least one radio node; and/or creation of simultaneous wireless connections between a) the wireless user device and the at least one user node, and b) the wireless user device and the at least one radio node.

In one implementation, the controller node comprises a 3GPP 5G NR (New Radio) compliant Central Unit (CU), and the at least one radio node comprises a 3GPP 5G NR (New Radio) compliant Distributed Unit (DU).

In another implementation, the network architecture further includes at least one wireless local area node controller in data communication with the distribution node, the at least one wireless local area node controller configured to cooperate with the distribution node to effect handover of one or more wireless sessions between the at least wireless local area node and the at least one radio node. The at least one wireless local area node may operate for instance within a first unlicensed frequency band, and the at least one radio node may operate within a second unlicensed frequency band different from the first unlicensed band.

In a further aspect of the disclosure, a method of operating a content distribution network is disclosed. In one embodiment, the method includes: delivering waveforms via at least a radio frequency medium of the content distribution network to a first node disposed at a premises; enabling a first wireless communications session between a wireless user device and the first node, the first wireless communication session enabling delivery of the waveforms to the wireless user device; determining a condition necessitating handover of the wireless user device from the first node; delivering waveforms via at least a radio frequency medium of the content distribution network to a second node disposed external to the premises; causing creation of a wireless connection between the wireless user device and the second node; causing handover of the first wireless communications session from the first node to the second node; and continuing operation of the first wireless communications session via the wireless connection between the wireless user device and the second node, the continued operation comprising continuing delivery of the waveforms to the wireless user device.

In one variant, the method further includes selecting the second node from a plurality of candidate nodes, the selecting at least based on at least one of (i) spatial or physical location relative to the premises, and/or (ii) topological location within the content distribution node.

In another aspect of the disclosure, a network architecture is disclosed. In one embodiment, the network architecture includes at least one wireless local area node controller in data communication with a distribution node, the at least one wireless local area node controller configured to cooperate with the distribution node to effect handover of one or more wireless sessions between the at least wireless local area node and the at least one of the first plurality of user nodes.

The at least one wireless local area node may operate for example within a first unlicensed frequency band, and the at least one of the first plurality of user nodes operates within a second unlicensed frequency band. For instance, the at least one wireless local area node may operate according to an IEEE-Std. 802.11 (Wi-Fi) protocol, and the at least one of the first plurality of user nodes may operate according a 3GPP 5G NR (Fifth Generation, New Radio) protocol.

In another aspect of the disclosure, a controller apparatus for use within a hybrid fiber/coaxial cable distribution network is described. In one embodiment, the controller apparatus includes: a radio frequency (RF) communications management module; a first data interface in data communication with the RF communications management module for data communication with a network core process; a second data interface in data communication with the RF communications management module for data communication with a first RF distribution node of the hybrid fiber/coaxial cable distribution network; and a third data interface in data communication with the RF communications management module for data communication with a second RF distribution node of the hybrid fiber/coaxial cable distribution network.

In one variant, the radio frequency (RF) communications management module includes computerized logic to enable at least the transmission of digital data from at least one of the first RF distribution node and the second RF distribution node with an RF band outside of that normally used by the at least one first RF distribution node and the second RF distribution node.

In one implementation, the radio frequency (RF) communications management module includes a 3GPP Fifth Generation New Radio (5G NR) gNB (gNodeB) Controller Unit (CU), the first data interface for data communication with a network core process includes a 3GPP Fifth Generation New Radio (5G NR) $X_n$ interface with a 5GC (Fifth Generation Core), and the second data interface includes a 3GPP Fifth Generation New Radio (5G NR) F1 interface operative over at least a wireline data bearer medium, the first RF distribution node including a 3GPP Fifth Generation New Radio (5G NR) gNB (gNodeB) Distributed Unit (DU); and the third data interface includes an Fifth Generation New Radio (5G NR) F1 interface operative over at least a dense wave division multiplexed (DWDM) optical data bearer, the second RF distribution node including a 3GPP Fifth Generation New Radio (5G NR) gNB (gNodeB) Distributed Unit (DU).

In one aspect, methods and apparatus for seamless mobility in a network with heterogeneous media using common control nodes is disclosed. In one embodiment, the method includes use of common network elements and a split CU-DU base-station architecture for providing a seamless mobility experience between indoor and outdoor spaces which are connected using common waveforms and protocols through heterogeneous media, e.g., HFC and wireless In another aspect, methods and apparatus for data throughput performance-triggered mobility between 3GPP and Wi-Fi is provided. In one embodiment, a centralized Wi-Fi controller is utilized; via data communication between the Wi-Fi controller and a 3GPP mobility controller, both indoor and outdoor spaces are provided coordinated 3GPP and Wi-Fi service coverage.

In still a further aspect of the disclosure, a method for providing device mobility is described. In one embodiment, the method includes providing indoor wireless coverage via a wireless-enabled CPE backhauled by an HFC network, and providing outdoor wireless coverage via one or more external (e.g., pole mounted) access nodes.

In another aspect of the disclosure, a method for providing device mobility is described. In one embodiment, the method includes first providing indoor/outdoor premises wireless coverage via a wireless-enabled CPE backhauled by an HFC network, and subsequently providing outdoor wireless coverage via one or more external (e.g., pole mounted) access nodes via a handover while maintaining data session continuity.

In a further aspect of the disclosure, a method for providing high speed data services to a device is described. In one embodiment, the method includes providing indoor wireless coverage via a wireless-enabled CPE backhauled by an HFC network, and supplementing that capability via one or more external (e.g., pole mounted) access nodes that are communicative with the CPE via an external antenna apparatus. In one variant, the external access nodes are backhauled by the same HFC network, and intra-node mobility is provided using MSO-only control functions (i.e., no interface with an external entity such as an MNO is required).

In another aspect, a computerized device implementing one or more of the foregoing aspects is disclosed and described. In one embodiment, the device includes a personal or laptop computer. In another embodiment, the device includes a mobile device (e.g., tablet or smartphone). In another embodiment, the device includes a computerized "smart" television or rendering device.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device. In yet another embodiment, the apparatus includes a "cloud" (network) based storage device which is remote from yet accessible via a computerized user or client electronic device. In yet another embodiment, the apparatus includes a "fog" (network) based storage device which is distributed across multiple nodes of varying proximity and accessible via a computerized user or client electronic device.

These and other aspects shall become apparent when considered in light of the disclosure provided herein.

Figure 1:
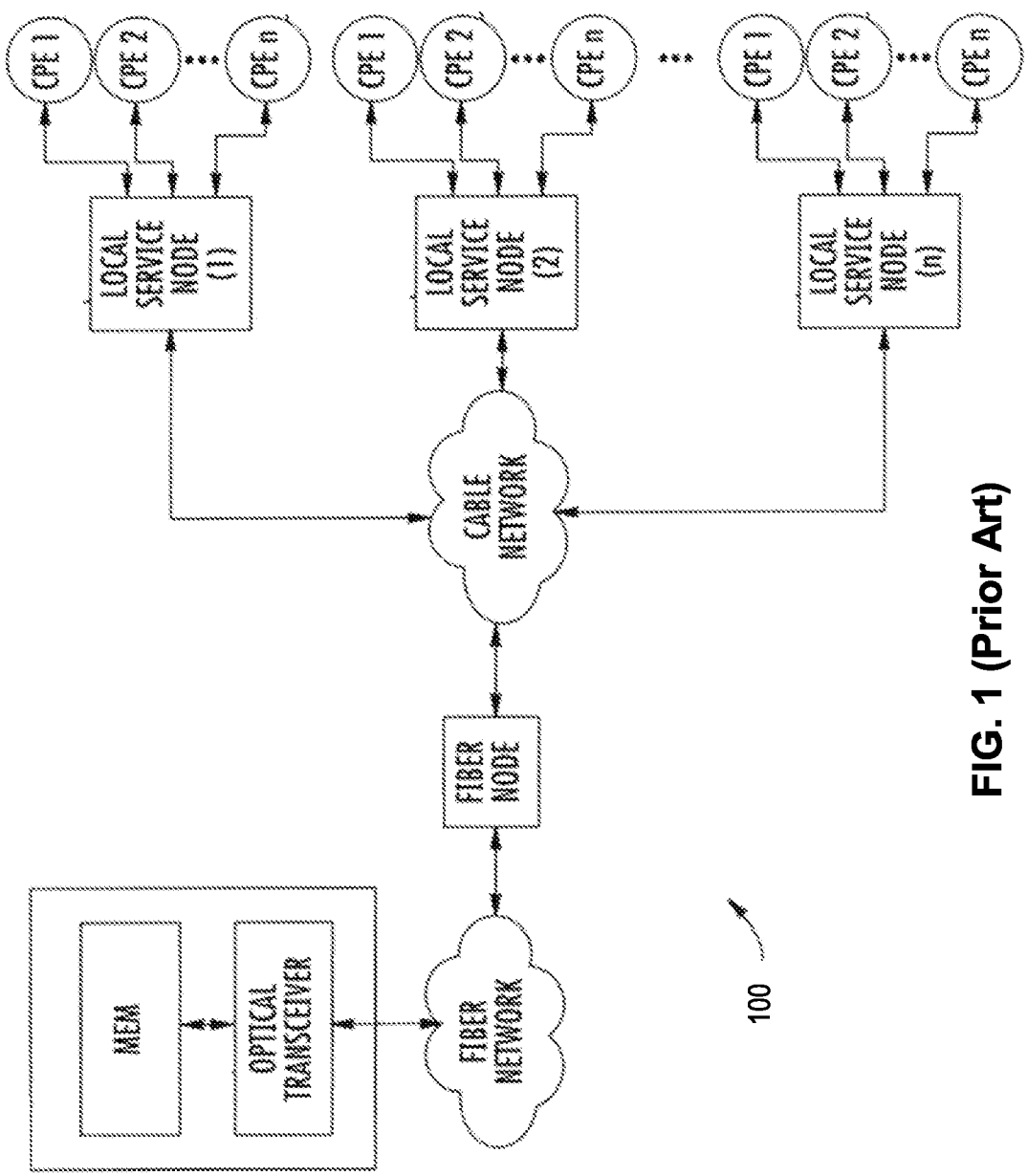
FIGS. 1 and 2 are a functional block diagrams illustrating a typical prior art managed (e.g., cable) content delivery network architecture.

All figures © Copyright 2017-2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle telematics or infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, "transmit" and "transmission" of data include without limitation transmitting packetized digital data, whether in wired or wireless fashion. Wireless transmission of data may be accomplished via various means, including via interfaces using IEEE Std. 802.11 (e.g., WLAN Wi-Fi) or 3GPP-based (e.g., 3G, 4G LTE, LTE-U, LTE-LAA, LTE-A, 4G/4.5G/5G) protocols. Such transmission allows a client device (e.g., smartphone, laptop, tablets) to download or stream the data from the transmitting entity.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved architectures, methods and apparatus for providing enhanced ultra-high data rate services which, inter alia, leverage existing managed network (e.g., cable network) infrastructure. The disclosed architectures enable a highly uniform user-experience regardless of the environment (e.g., indoor/outdoor/mobility), in which content is consumed and eliminates the need to distinguish between fixed-broadband and mobile-broadband, or the foregoing and IoT.

In one embodiment, a Hybrid Fiber Coax (HFC) plant infrastructure and extant 3GPP LTE and 5G NR protocols are used as bases for provision of standards-compliant ultra-low latency and high data rate services (e.g., 5G NR services) via a common service provider. In one variant, an expanded frequency band (approximately 1.6 GHz in total bandwidth) is used over the coaxial portions of the HFC infrastructure, which is allocated to two or more sub-bands. Wideband amplifier apparatus are used to support delivery of the sub-bands to extant HFC network nodes (e.g., hubs or distribution points) within the network, and ultimately to premises devices. An OFDM and TDD-based access and modulation scheme is used to allow for maximal efficiency and flexibility in allocating bandwidth to UL and DL transmissions over the HFC infrastructure.

5G-enabled premises devices (e.g., CPE) are used within the foregoing architecture to provide the services to users at a given premises and thereabouts, using extant 3GPP protocols. In another variant, local area (e.g., "pole mounted") radio access nodes are used in concert with the 5G-enabled CPE to provide supplemental RF coverage, including during mobility scenarios, as well as supplemental capacity to the CPE for indoor use cases (i.e., when the CPE requires additional bandwidth over what the HFC coaxial cable drop to the premises alone can provide), thereby enabling data rates on the order of 10 Gbps and above.

Advantageously, in exemplary embodiments, the foregoing enhanced high data rate, high mobility, low latency services are provided without (i) the need for any module or customized application software or protocols of the user device (e.g., mobile UE), and (ii) the need to expend CAPEX/OPEX relating to laying new fiber and/or maintaining two (e.g., MSO and MNO) network infrastructures in parallel.

Moreover, latency within the disclosed infrastructure is reduced by, inter alia, obviating encapsulation and other network/transport protocols normally necessitated through use of e.g., DOCSIS bearers and equipment (i.e., DOCSIS modems and CMTS apparatus within the MSO core.

Edge-heavy solutions (e.g., Fog models) are also supported via the use of the 5G protocols as well as high bandwidth and enhanced connectivity out at the edge of the MSO infrastructure.

Using 3GPP protocols through HFC also enables broadband service benefits stemming from the rich feature set, vendor diversity and operational reliability that 3GPP has already developed for the over 2.6 billion global subscribers of 3GPP 4G LTE.

The improved architecture also advantageously facilitates so-called "network slicing," including providing differentiated services (and QoS/QoE) for various target applications and use cases.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Service Provider Network Architecture—

Figure 4:
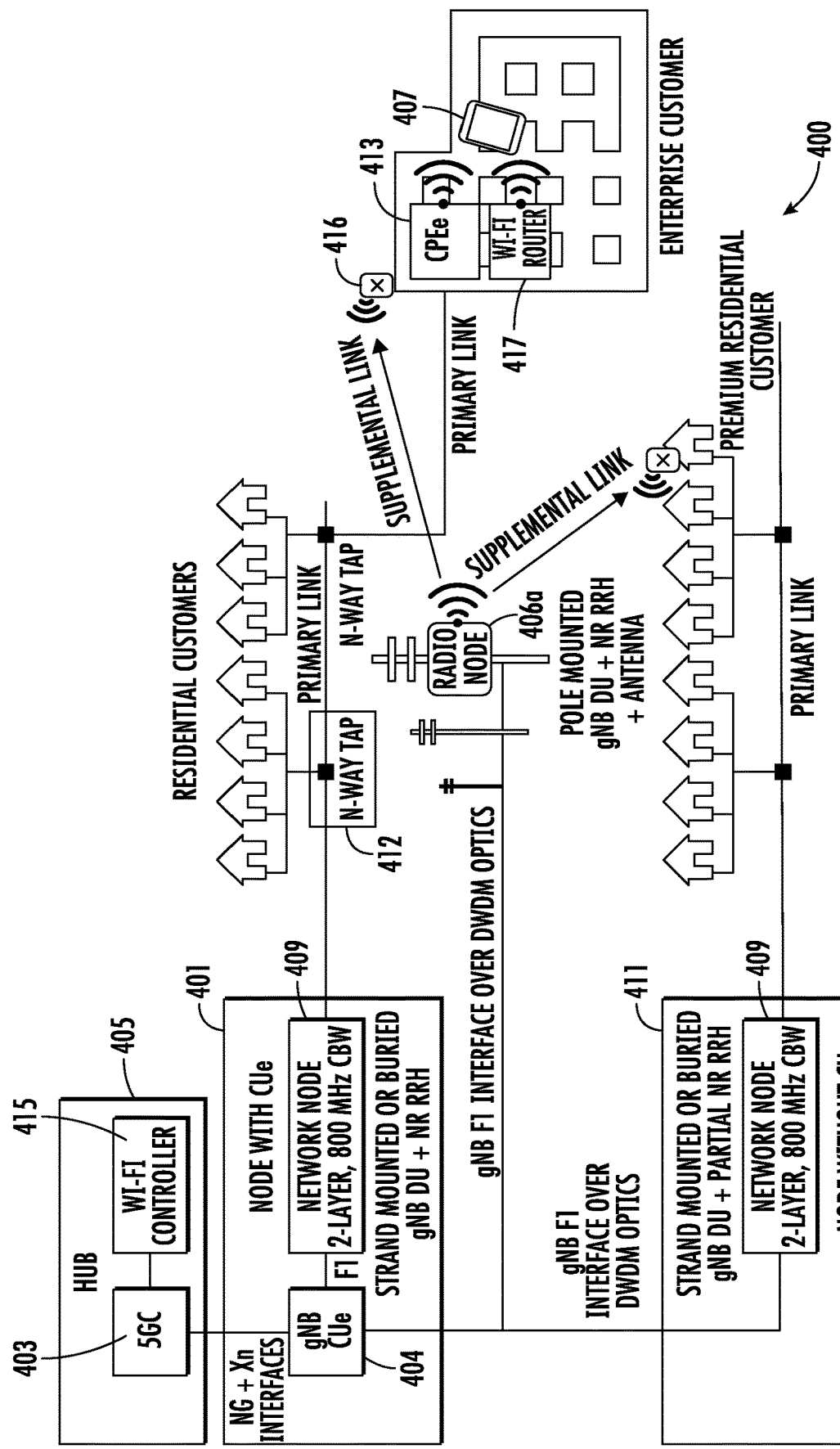
FIG. 4 is a functional block diagram of an exemplary MSO network architecture comprising various features described herein.

Referring now to FIG. 4, one embodiment of an enhanced service provider network architecture 400 is shown and described in detail.

As illustrated, the architecture 400 includes one or more hubs 405 within the MSO network (e.g., whether near edge portions of the network, or further towards the core), including a 5G NR core (5GC) 403. The hub 405 includes a WLAN controller process 415, and services one or more "enhanced" nodes 401, which each include a gNB CUe 404 and an network radio node 409, described in greater detail below. The nodes 401 utilize HFC infrastructure, including N-way taps 412 to deliver RF waveforms to the various served premises (including the enhanced CPE or CPEe) 413 and ultimately the user device(s) 407 (e.g., 3GPP-enabled UEs).

Also serviced by the node 401 are one or more non-CUe enabled nodes 411 including 4G/4.5G/5G enabled network radio nodes 409, which service additional premises as shown.

In the illustrated embodiment, the nodes 401, 411 are backhauled by optical fiber, although this is merely illustrative, as other types of backhauls including e.g., high-bandwidth wireless may be used consistent with the present disclosure.

Similarly, one or more pole-mounted radio nodes 406a (and potentially other mobile client devices enabled for DU-type functionalities; e.g., authorized to receive data from another node or client device, and broadcast/receive signals according to the user domain frequency band) are backhauled to the MSO network via optical fiber (or other medium); these nodes 406a provide, inter alia, supplemental capacity/coverage for both indoor and outdoor (and mobility) scenarios as described in greater detail below.

In one exemplary embodiment, radio nodes 406a are located on an "edge" of a network (i.e., functioning as a network node proximate to the premises and away from the core), and are enabled for 4G and/or 5G communications as described in greater detail below. A given DU that provides 5G coverage to the premises thereby supplements the ultra-low latency and high-bandwidth services by the CUe 404. Moreover, as described further below, the CUe may be logically and functionally grouped with one or more DUes 406a to together make up a gNB.

In one variant, as noted above, mobile devices may function as intermediary nodes or transient "jumping points." Such devices may be those owned by subscribers of the hub or core providing the managed network services who have opted into (or not opted out) of use of their eligible devices as nodes. In other variants, devices owned by subscribers of a different core (e.g., managed by a different entity) may be included in the network of nodes. As an aside, such networking schemes are often generally referred to as "fog networking," a decentralized computing infrastructure in which data, computations, storage, and applications are distributed in an efficient manner between the data source and the destination (e.g., a "cloud" server, premises equipment, end user device) as opposed to a more highly centralized architecture.

A Wi-Fi router device 417 is also present in the served premises to provide WLAN coverage, in conjunction with the controller 415 at the hub 405. The centralized Wi-Fi controller 415 is also utilized in the exemplary architecture 400 for tight-interworking and better mobility between the 3GPP and Wi-Fi access technologies where the Wi-Fi router is either integrated with the consumer premises equipment (e.g., enhanced CPE or CPEe) or connected to it. In various embodiments, one or more intermediary nodes (e.g., radio node 406a) located between the CUe 404 and the served premises are utilized to provide additional coverage and bandwidth to the premises. Then, mobility between the 3GPP and Wi-Fi channels for any user can be triggered for the best data throughput, such as based on (i) estimation of the RF quality of the Wi-Fi channel toward the user, and/or (ii) the degree of congestion of the Wi-Fi router, and not just the Wi-Fi received signal strength indicators (RSSI) measured at the mobile device, the latter which may not be representative of the service quality that can be obtained by the user.

In the exemplary configuration, the controller (e.g., Wi-Fi Controller 415) is configured to choose the best (optimal) wireless connection available to it based on performance (as opposed to coverage/coverage area alone). Typically today, a preferred method of access is predetermined based on its received signal strength and/or as a preferred means (e.g. Wi-Fi could be defined as the preferred method of access to offload the mobile wireless network). However, this method suffers from the drawback of blind 'stickiness' to a technology, without considering the end user experience. Given that in exemplary embodiments of the architecture described herein, both Wi-Fi and licensed/unlicensed 3GPP access technologies are both controlled by the network operator (e.g., MSO), there is no need to prefer an access method, such as to purely to offload a user's traffic. The decision to offload or steer a user to a given access technology, can be based upon other criteria, such as e.g., a select set of Key Performance Indicators (KPIs) such as the user perceived latency, throughput, packet loss, jitter and bit/packet/frame error rates as measured in real-time at any given layer (e.g., L1, L2 or L3) by the network. For instance, in one implementation, once a target KPI threshold is triggered, the switching of the user can be triggered by either the AMF function (for 3GPP) or Wi-Fi Controller. This switching may then trigger a session establishment at the alternate access medium to transfer the user to that technology. This helps optimize QoE for connected users, since the controller will always be attempting to holistically optimize the connection versus merely making decisions based on coverage or signal strength alone.

This architecture also obviates the problematic transition between premises Wi-Fi and cellular, thereby enabling content consumption while the user is mobile, with no reduction in QoE or interruptions due to e.g., new session establishment in the cellular network. This is accomplished by, inter alia, communication between the Wi-Fi controller 415 and the CUe 404, such that the CUe can remain cognizant of both Wi-Fi and 3GPP channel status, performance and availability. Advantageously, in exemplary embodiments, the foregoing enhanced mobility is provided without the need for any module or customized application software or protocols of the user device (e.g., mobile UE), since all communication sessions (whether between the CPEe and the UE, or the supplemental radio access node and the UE) are both (i) controlled by a common system, and (ii) utilize extant 3GPP (e.g., 4G/4.5G/5G) protocols and architectural elements. In one variant a GPRS Tunneling Protocol (GTP) is utilized for maintenance of session continuity between the heterogeneous RAN technologies (e.g., 3GPP and IEEE Std. 802.11). In another variant, a PMIP (Proxy Mobile IP) based approach is utilized for session maintenance/handover. In yet a further variant, techniques described in 3GPP TS 23.234 v13.1.0, "3GPP system to Wireless Local Area Network (WLAN) interworking; System description (Release 13)," incorporated herein by reference in its entirety, (aka "I-WLAN") based approach is utilized for these purposes. As will be appreciated by those of ordinary skill given the present disclosure, combinations of the foregoing mechanisms may be utilized as well, depending on the particular application (including the two heterogeneous technologies that are party to the session maintenance/handoff).

The MSO network architecture 400 of FIG. 4 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 4 may deliver Internet data and OTT (over-the-top) services to the end users (including those of the DUe's 406) via the Internet protocol (IP) and TCP (i.e., over the 5G radio bearer), although other protocols and transport mechanisms of the type well known in the digital communication art may be substituted.

The architecture 400 of FIG. 4 further provides a consistent and seamless user experience with IPTV over both wireline and wireless interfaces. Additionally, in the IP paradigm, dynamic switching between unicast delivery and multicast/broadcast is used based on e.g., local demand. For instance, where a single user (device) is requesting content, an IP unicast can be utilized. For multiple devices (i.e., with multiple different IP addresses, such as e.g., different premises), multicast can be utilized. This approach provides for efficient and responsive switching of delivery and obviates other more equipment/CAPEX-intensive approaches.

Moreover, the architecture can be used for both broadband data delivery as well as "content" (e.g., movie channels) simultaneously, and obviates much of the prior separate infrastructure for "in band" and DOCSIS (and OOB) transport. Specifically, with DOCSIS (even FDX DOCSIS), bandwidth is often allocated for video QAMs, and a "split" is hard-coded for downstream and upstream data traffic. This hard split is typically implemented across all network elements—even amplifiers. In contrast, under the exemplary configuration of the architecture disclosed herein, effectively all traffic traversing the architecture is IP-based, and hence in many cases there is no need to allocate QAMs and frequency splits for different program or data streams. This "all-IP" approach enables flexible use of the available bandwidth on the transmission medium for all applications dynamically, based on for instance the demand of each such application at any given period or point in time.

In certain embodiments, the service provider network 400 also advantageously permits the aggregation and/or analysis of subscriber- or account-specific data (including inter alia, correlation of particular CUe or DUe or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 407 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising or 5G "slicing" configuration or delivery; and (iii) determination of subscription level, and hence subscriber privileges and access to certain services as applicable.

Moreover, device profiles for particular devices (e.g., 3GPP 5 g NR and WLAN-enabled UE, or the CPEe 413 and any associated antenna 416, etc.) can be maintained by the MSO, such that the MSO (or its automated proxy processes) can model the device for wireless or other capabilities. For instance, one (non-supplemented) CPEe 413 may be modeled as having bandwidth capability of X Gbps, while another premises' supplemented CPEe may be modeled as having bandwidth capability of X+Y Gbps, and hence the latter may be eligible for services or "slices" that are not available to the former.

As a brief aside, the 5G technology defines a number of network functions (NFs), which include the following:

1. Access and Mobility Management function (AMF)—Provides for termination of NAS signaling, NAS integrity protection and ciphering, registration and connection and mobility management, access authentication and authorization, and security context management. The AMF has functions analogous to part of the MME functionality of the prior Evolved Packet Core (EPC).

2. Application Function (AF)—Manages application influence on traffic routing, accessing NEF, interaction with policy framework for policy control. The NR AF is comparable to the AF in EPC.

3. Authentication Server Function (AUSF)—Provides authentication server functionality. The AUSF is similar to portions of the HSS from EPC.

4. Network Exposure function (NEF)—Manages exposure of capabilities and events, secure provision of information from external applications to 3GPP network, translation of internal/external information. The NEF is a wholly new entity as compared to EPC.

5. Network Slice Selection Function (NSSF)—Provides for selection of the Network Slice instances to serve the UE, determining the allowed NSSAI, determining the AMF set to be used to serve the UE. The NSSF is a wholly new entity as compared to EPC.

6. NF Repository function (NRF)—Supports the service discovery function, maintains NF profile and available NF instances The NRF is a wholly new entity as compared to EPC.

7. Policy Control Function (PCF)—Provides a unified policy framework, providing policy rules to CP functions, and access subscription information for policy decisions in UDR. The PCF has part of the PCRF functionality from EPC.

8. Session Management function (SMF)—Provides for session management (session establishment, modification, release), IP address allocation & management for UEs, DHCP functions, termination of NAS signaling related to session management, DL data notification, traffic steering configuration for UPF for proper traffic routing. The SMF includes portions of the MME and PGW functionality from EPC.

9. Unified Data Management (UDM)—Supports generation of Authentication and Key Agreement (AKA) credentials, user identification handling, access authorization, subscription management. This comprises a portion of HSS functionality from EPC.

10. User plane function (UPF)—The UPF provides packet routing & forwarding, packet inspection, QoS handling, and also acts as an external PDU session point of interconnect to Data Network (DN). The UPF may also act as an anchor point for intra-RAT and inter-RAT mobility. The UPF includes some of the prior SGW and PGW functionality from EPC.

Within the 5G NR architecture, the control plane (CP) and user plane (UP) functionality is divided within the core network or NGC (Next Generation Core). For instance, the 5G UPF discussed above supports UP data processing, while other nodes support CP functions. This divided approach advantageously allows for, inter alia, independent scaling of CP and UP functions. Additionally, network slices can be tailored to support different services, such as for instance those described herein with respect to session handover between e.g., WLAN and 3GPP NR, and supplemental links to the CPEe.

In addition to the NFs described above, a number of different identifiers are used in the NG-RAN architecture, including those of UE's and for other network entities, and may be assigned to various entities described herein. Specifically:

the AMF Identifier (AMF ID) is used to identify an AMF (Access and Mobility Management Function);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network.

Distributed gNB Architectures

In the context of FIG. 4, the DUe's described herein may assume any number of forms and functions relative to the enhanced CPE (CPEe) 413 and the radio node 406*a* (e.g., pole mounted external device). Recognizing that generally speaking, "DU" and "CU" refer to 3GPP standardized features and functions, these features and functions can, so long as supported in the architecture 400 of FIG. 4, be implemented in any myriad number of ways and/or locations. Moreover, enhancements and/or extensions to these components (herein referred to as CUe and DUe) and their functions provided by the present disclosure may likewise be distributed at various nodes and locations throughout the architecture 400, the illustrated locations and dispositions being merely exemplary.

Notably, the "enhanced" NR-based gNB architecture utilizes existing infrastructure (e.g., at least a portion of the extant HFC cabling controlled by an MSO such as the Assignee hereof) while expanding the frequency spectrum used for signal propagation within the infrastructure (e.g., 1.6 GHz in total bandwidth). Moreover, access points or nodes installed at venues or premises, especially "edge"-based nodes (at least some of which may be controlled, licensed, installed, or leased by the MSO), may be leveraged to deliver 5G-based services to a subscriber of the 5G NR Core (e.g., 403, 523). Fog-based networking made possible through this leveraged infrastructure allows the subscriber to access receive and maintain 5G service whether indoor or outdoor, and in fact, even while the subscriber is changing locations, e.g., moving indoor to outdoor, outdoor to indoor, between servicing nodes indoors (e.g., within a large house, office or housing complex, or venue), and between servicing nodes outdoors. Other nodes may be leveraged, including other 5G-enabled mobile devices that have opted into (or not opted out of) participating in the fog network. In effect, the ubiquity of mobile devices creates a peer-to-peer network for distribution and delivery of ultra-low-latency (e.g., 1 ms ping) and ultra-high-speed (e.g., 10 Gbps or higher) connectivity. In many cases, utilizing one or more participating peer devices results in faster service (e.g., greatly reduced ping) by obviating the need to reach a cell tower, a server, or a gateway that is resident in the backend portion of a cloud-type network.

Notably, the principles described further below enable a subscriber to maintain the 5G service (or any other 3GPP- or IEEE 802.11-based connectivity) without the signals dropping or disconnecting between sessions. In other words, "seamless" transfer of connectivity between nodes (akin to handovers) is made possible despite a difference in at least a portion of wireless data communications standards that may be utilized by the nodes. For instance, a CPEe and a DUe disposed near the "edge" of the network (i.e., near consumer premises) may each be capable of communicating data with, e.g., a mobile user device, via either or both 3GPP- and IEEE 802.11-based protocols. A subscriber, however, would not require a reconnection process with a different base station or modem (as opposed to, e.g., establishing connection to cellular data services when outside the range of a Wi-Fi AP, or connecting back to the Wi-Fi AP when entering the premises), invoking a "seamless" feel and further increasing the user experience.

By virtue of the way the frequency spectra used in existing infrastructure is accessed, such enhanced gNB architecture provides salient advantages to a subscriber thereof, such as improved connectivity speeds (e.g., data rates, response times, latency) and seamless mobility of user devices as noted above and described further below, thus significantly improving user experience relative to currently available services. Further, the operator of such an architecture may advantageously save costs of connecting new cables and pipes across long distances by obviating the need to overhaul the infrastructure itself.

Figure 5A:
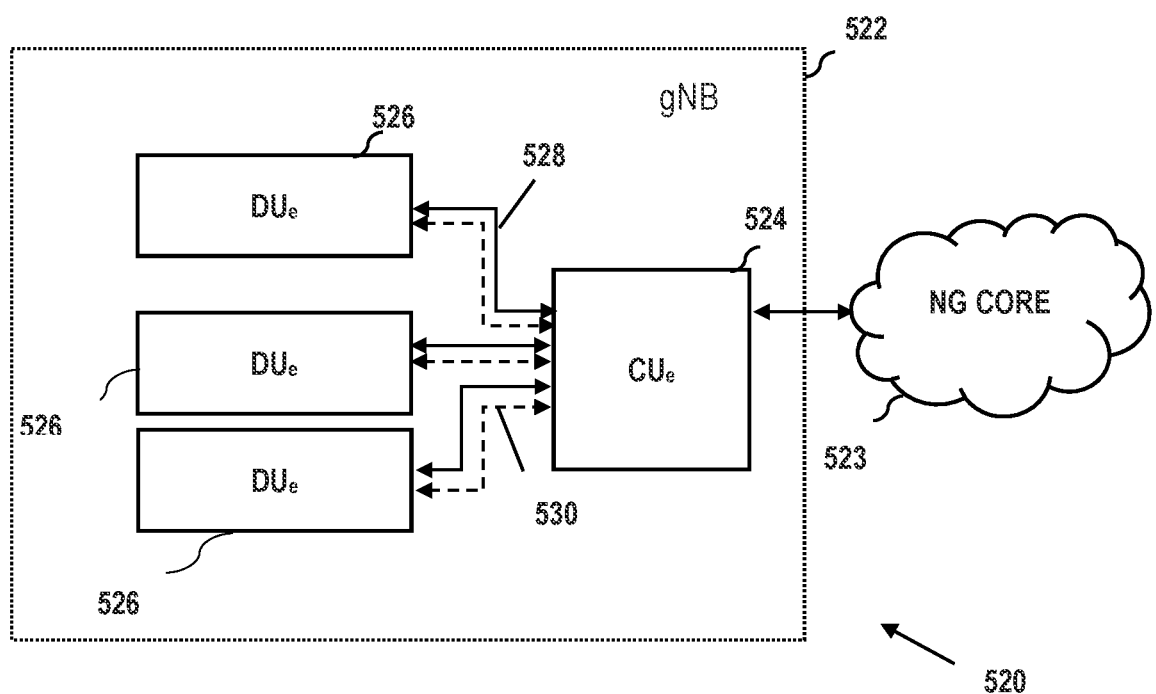
FIG. 5a is a functional block diagram of one exemplary embodiment of a gNB architecture including CUe and multiple DUes, according to the present disclosure.
Figure 5B:
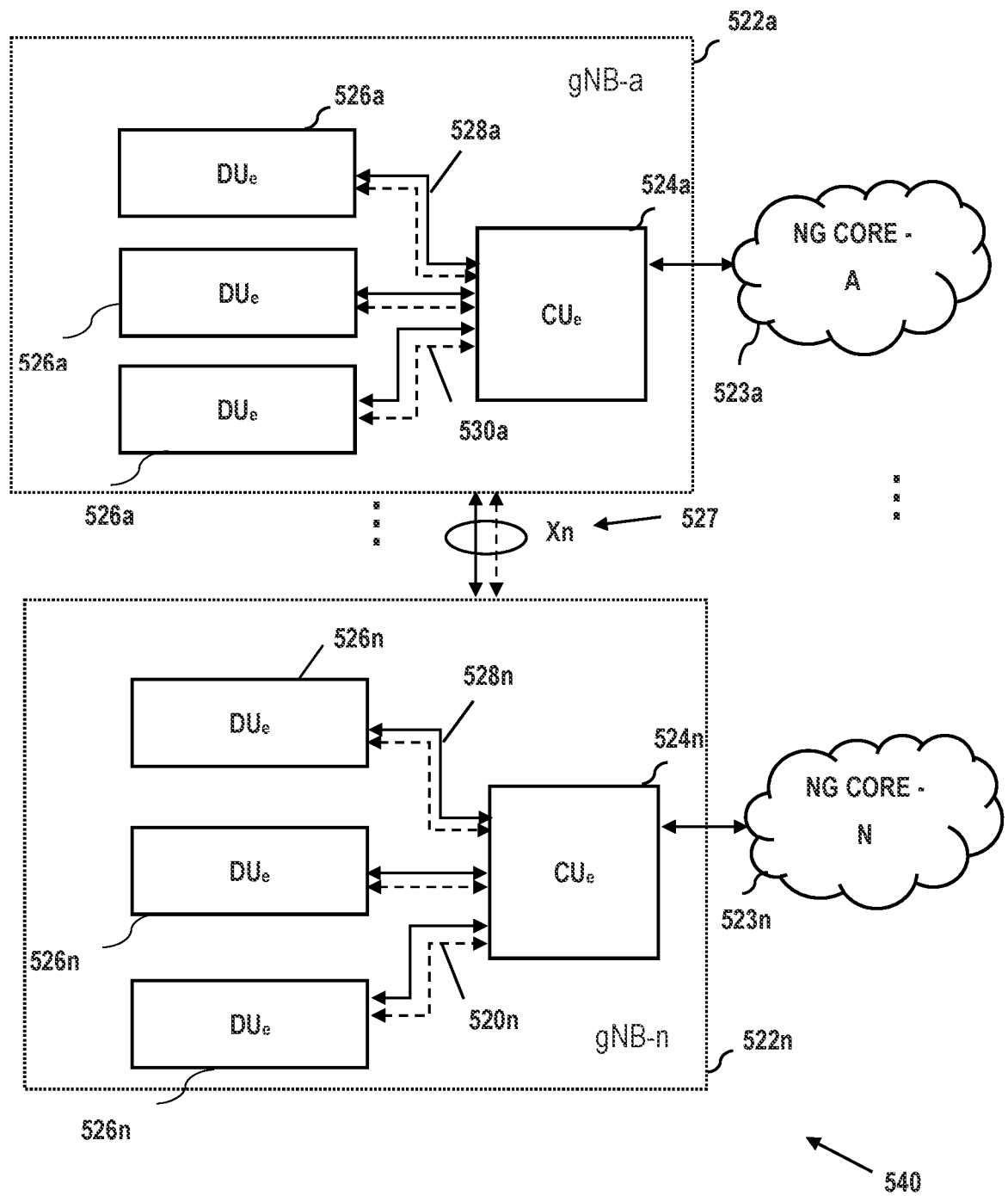
FIG. 5b is a functional block diagram of another exemplary embodiment of a gNB architecture including multiple CUes and multiple corresponding DUes, according to the present disclosure.
Figure 5C:
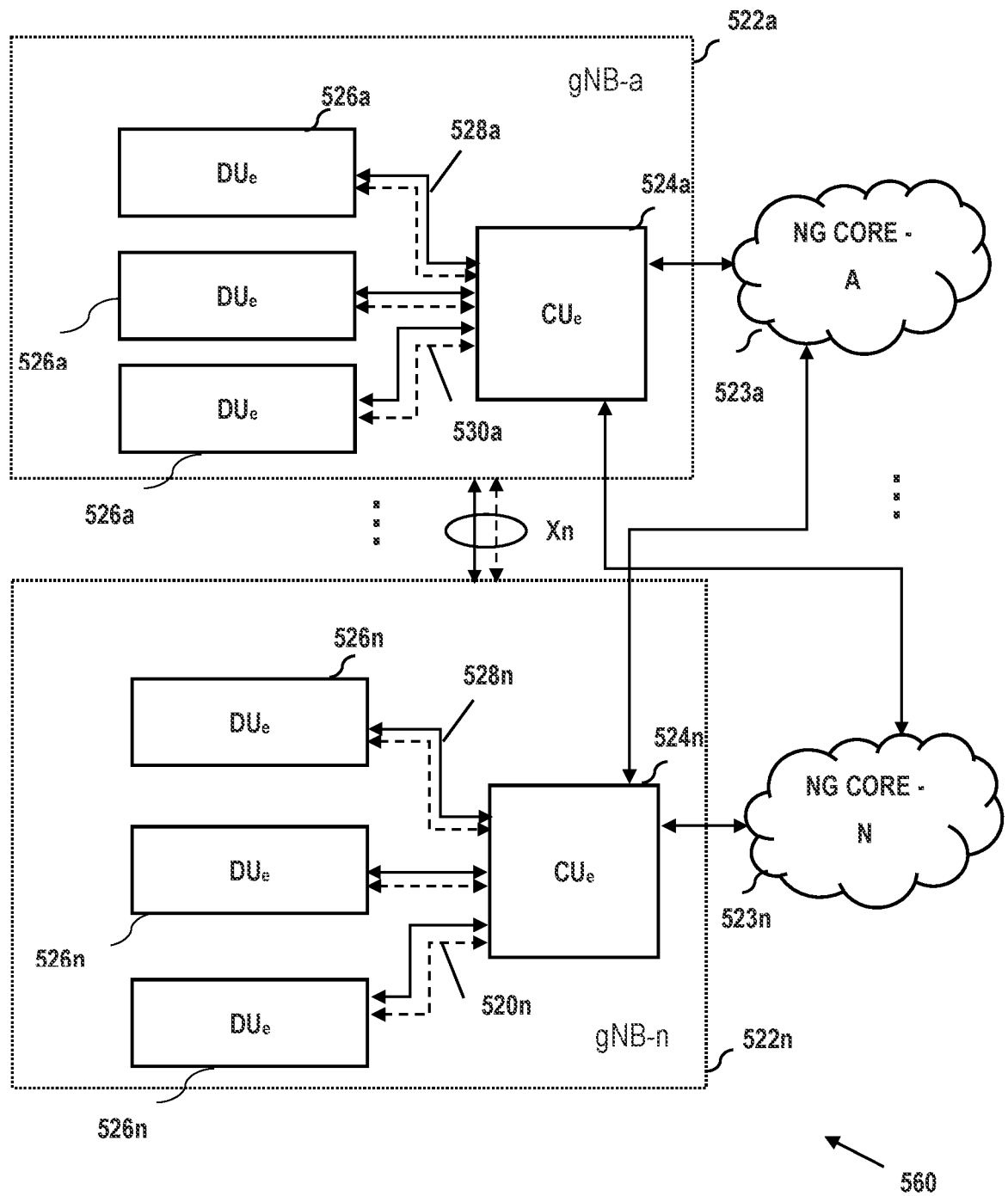
FIG. 5c is a functional block diagram of yet another exemplary embodiment of a gNB architecture including multiple CUes logically cross-connected to multiple different cores, according to the present disclosure.

Accordingly, referring now to FIGS. 5a-5c, various embodiments of the distributed (CUe/DUe) gNB architecture according to the present disclosure are described. As shown in FIG. 5a, a first architecture 520 includes a gNB 522 having an enhanced CU (CUe) 524 and a plurality of enhanced DUs (DUe) 526. As described in greater detail subsequently herein, these enhanced entities are enabled to permit inter-process signaling and high data rate, low latency services, whether autonomously or under control of another logical entity (such as the NG Core 523 with which the gNB communicates, or components thereof), as well as unified mobility and IoT services.

The individual DUe's 526 in FIG. 5a communicate data and messaging with the CUe 524 via interposed physical communication interfaces 528 and logical interfaces. As previously described, such interfaces may include a user plane and control plane, and be embodied in prescribed protocols such as F1AP. Operation of each DUe and CUe are described in greater detail subsequently herein; however, it will be noted that in this embodiment, one CUe 524 is associated with one or more DUe's 526, yet a given DUe is only associated with a single CUe. Likewise, the single CUe 524 is communicative with a single NG Core 523, such as that operated by an MSO. Each NG Core 523 may have multiple gNBs 522 associated therewith (e.g., of the type 404 shown in FIG. 4).

In other embodiments, each gNB 522 may include multiple CUe's 524, each configured to handle discrete functions and tasks for the gNB. For example, in one variant, one CUe may handle downlink communication (e.g., with client devices and premises equipment) and another CUe in data communication with the first CUe may handle uplink communications (e.g., with the NG core 523).

In another variant, each CUe may manage and supervise different groups of DUe's so as to distribute the computing load across the multiple CUe's. In some implementations, each group of DUe's may correspond to a geographic area or user service group (SG).

In another implementation, a group of DUe's may correspond to a particular tier of service (e.g., a particular CUe may handle DUe's that are limited to client devices that have enabled 5G service, those who have not opted out of it, or those who have subscribed to receive paid content from the NG core).

In further implementations, different classes of DUe may be utilized, each class having different capabilities, e.g., range of wireless service, data rates, number of connections (where, for instance, a DUe node located in a populated area, e.g., outdoor malls, may prefer to be capable of more connections than a CPEe that may service a home).

In yet another implementation, a particular CUe may handle processing and delivery of secondary content, such as advertisements, while another CUe handles processing of other digital content, thereby allowing each CUe to determine how much bandwidth and processing load to spare. In one implementation, these CUe's and/or different groups of DUe's may overlap depending on which category they quality for; they may be "tagged" with metadata descriptive of which geographic area, service level, type of content, etc. is applicable.

Various functions of a gNB may be split among CUe's and DUe's as well, consistent with the physically distributed nature of the CUe and DUe portions of gNB. However, those having ordinary skill in the relevant arts will appreciate that CUe(s) and DUe(s) need not necessarily be enclosed in one physical node. See also the functional split options described below.

Furthermore, each CUe may be operated by one or multiple processor apparatus. In some implementations, the processors may be independently operable and able to perform dedicated operations without requiring a master-slave relationship between processors.

Similar distribution schemes for content processing may be implemented across multiple gNBs instead of multiple CUe's. For instance, each gNB or group of gNBs may handle one aspect of content delivery. Multiple-gNB embodiments are now described with respect to FIGS. 5b and 5c.

In the architecture 540 of FIG. 5b, two or more gNBs 522a-n are communicative with one another via e.g., an Xn interface 527, and accordingly can conduct at least CUe to CUe data transfer and communication. Separate NG Cores 523a-n are used for control and user plane (and other) functions of the network. As a brief aside, an Xn interface is an interface for the interconnection of two NG-RAN nodes within the NG-RAN architecture. In one embodiment, the Xn interface (an "Xn-C" type) may interconnect the CUe's 524a, 524n. In another embodiment, the Xn interface may comprise multiple interfaces connecting various entities, e.g., DUe's and CUe's, as a logical or virtual grouping. In another embodiment, the Xn interface may connect the NG cores 523a, 523n via the backend portion of the network comprising the core and the gNBs.

In the architecture 560 of FIG. 5c, two or more gNBs 522a-n are communicative with one another via e.g., the Xn interface 527, and accordingly can conduct at least CUe to CUe data transfer and communication. Moreover, the separate NG Cores 523a-n are logically "cross-connected" to the gNBs 522 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 522 other than its own, and so forth), or the gNBs 522 and NG Cores 523 may form a "mesh" topology where multiple Cores 523 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MSOs, or between MNO and MSO, which is especially useful in e.g., dense deployment environments which may not be able to support multiple sets of RAN infrastructure, such as for different service providers.

It will also be appreciated that while described primarily with respect to a unitary gNB-CUe entity or device 404, 524 as shown in FIGS. 4-5c, the present disclosure is in no way limited to such architectures. For example, the techniques described herein may be implemented as part of a distributed or dis-aggregated or distributed CUe entity (e.g., one wherein the user plane and control plane functions of the CUe are dis-aggregated or distributed across two or more entities such as a CUe-C (control) and CUe-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 4-5c. For instance, a given DUe may (in addition to supporting node operations as discussed in greater detail with respect to FIGS. 7-7a below), act (i)

solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-collocated with the eNB or femtocell, but still provide NR coverage within the macrocell coverage area.

In accordance with the 5G NR model, the DUe(s) 526 comprise logical nodes that each may include varying subsets of the gNB functions, depending on the functional split option. DUe operation is controlled by the CUe 524 (and ultimately for some functions by the NG Core 523). Split options between the DUe and CUe in the present disclosure may include for example:
  Option 1 (RRC/PCDP split)
  Option 2 (PDCP/RLC split)
  Option 3 (Intra RLC split)
  Option 4 (RLC-MAC split)
  Option 5 (Intra MAC split)
  Option 6 (MAC-PHY split)
  Option 7 (Intra PHY split)
  Option 8 (PHY-RF split)

Under Option 1 (RRC/PDCP split), the RRC (radio resource control) is in the CUe 524 while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s) 526; and (ii) RRC, PDCP in the CUe (with split user plane and control plane stacks), and RLC, MAC, physical layer and RF in the DUe's 526.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe 524, while MAC, physical layer, and RF are maintained in the DUe's.

Under Option 5 (Intra-MAC split), RF, physical layer and lower part of the MAC layer (Low-MAC) are in the DUe's 526, while the higher part of the MAC layer (High-MAC), RLC and PDCP are in the CUe 524.

Under Option 6 (MAC-PHY split), the MAC and upper layers are in the CUe, while the PHY layer and RF are in the DUe's 526. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's 526, while remaining functions reside in the CUe 524. In the DL, iFFT and CP addition may reside in the DUe 526, while the remainder of the PHY resides in the CUe 524.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

Generally speaking, the foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency to support 5G RAN requirements, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It is also noted that the "DU" functionality referenced in the various split options above can itself be split across the DUe and its downstream components, such as the RF stages of the node 409 (see FIGS. 7 and 7a) and/or the CPEe 413. As such, the present disclosure contemplates embodiments where some of the functionality typically found within the DUe may be distributed to the node/CPEe.

It will further be recognized that user-plane data/traffic may also be routed and delivered apart from the CUe. In one implementation (described above), the CUe hosts both the RRC (control-plane) and PDCP (user-plane); however, as but one alternate embodiment, a so-called "dis-aggregated" CUe may be utilized, wherein a CUe-CP entity (i.e., CUe—control plane) hosts only the RRC related functions, and a CUe-UP (CUe—user plane) which is configured to host only PDCP/SDAP (user-plane) functions. In some embodiments, such dis-aggregated functions may be processed through multiple respective independently operable processor apparatus as noted above. The CUe-CP and CUe-UP entities can, in one variant, interface data and inter-process communications via an E1 data interface, although other approaches for communication may be used.

It will also be appreciated that the CUe-CP and CUe-UP may be controlled and/or operated by different entities, such as where one service provider or network operator maintains cognizance/control over the CUe-UP, and another over the CUe-CP, and the operations of the two coordinated according to one or more prescribed operational or service policies or rules.

Referring again to FIG. 4, the exemplary embodiment of the DUe 409 is a strand-mounted or buried DUe (along with the downstream radio chain(s), the latter which may include one or more partial or complete RRH's (remote radio heads) which include at least portions of the PHY functionality of the node (e.g., analog front end, DAC/ADCs, etc.). As can be appreciated, the location and configuration of each DUe/node may be altered to suit operational requirements such as population density, available electrical power service (e.g., in rural areas), presence of other closely located or co-located radio equipment, geographic features, etc.

As discussed with respect to FIGS. 7-7a below, the nodes 409 in the embodiment of FIG. 4 include multiple OFDM-based transmitter-receiver chains of 800 MHz nominal bandwidth, although this configuration is merely exemplary. In operation, the node generates waveforms that are transmitted in the allocated band (e.g., up to approximately 1.6 GHz), but it will be appreciated that if desired, the OFDM signals may in effect be operated in parallel with signals carried in the below-800 MHz band such as for normal cable system operations.

As shown in FIG. 4, in one implementation, each node (and hence DUe) is in communication with its serving CUe via an F1 interface, and may be either co-located or not co-located with the CUe. For example, a node/DUe may be positioned within the MSO HFC infrastructure proximate a distribution node within the extant HFC topology, such as before the N-way tap point 412, such that a plurality of premises (e.g., the shown residential customers) can be served by the node/DUe via the aforementioned OFDM waveforms and extant HFC plant. In certain embodiments, each node/DUe 409, 526 is located closer to the edge of the network, so as to service one or more venues or residences (e.g., a building, room, or plaza for commercial, corporate, academic purposes, and/or any other space suitable for wireless access). For instance, in the context of FIG. 5, a node might even comprise a CPEe or external access node (each discussed elsewhere herein). Each radio node 406a is configured to provide wireless network coverage within its coverage or connectivity range for its RAT (e.g., 4G and/or 5G NR). For example, a venue may have a wireless NR modem (radio node) installed within the entrance thereof for prospective customers to connect to, including those in the parking lot via inter alia, their NR or LTE-enabled vehicles or personal devices of operators thereof.

Notably, different classes of DUe/node 409, 526 may be utilized. For instance, a putative "Class A" LTE eNB may transmit up X dbm, while a "Class-B" LTE eNBs can transmit up to Y dbm (where Y>X), so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc. Similarly, different types of NR-enabled nodes/DUe 409, 526 can be used depending on these factors, whether alone or with other wireless PHYs such as WLAN, etc.

Signal Attenuation and Bandwidth

Figure 2:
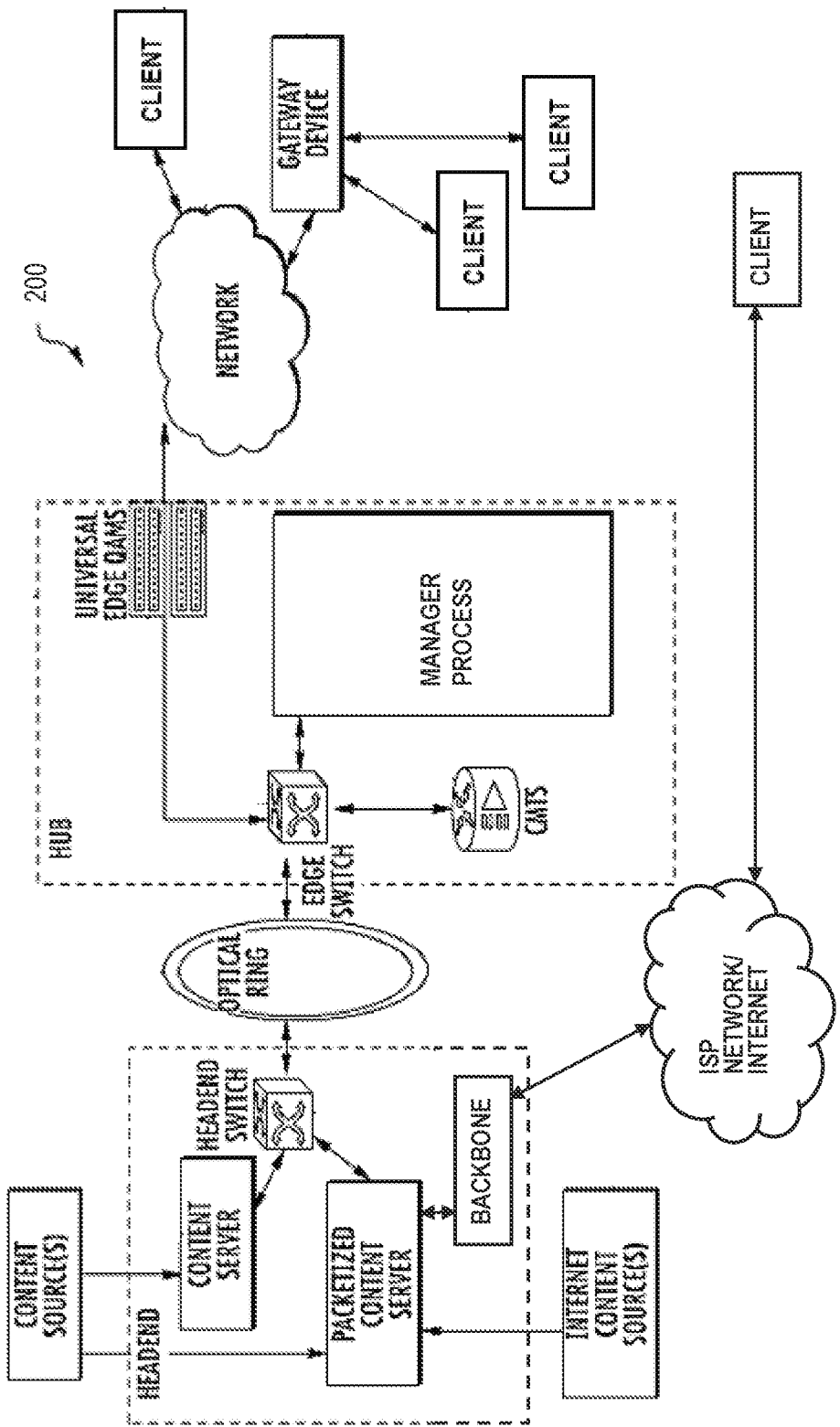
Figure 3:
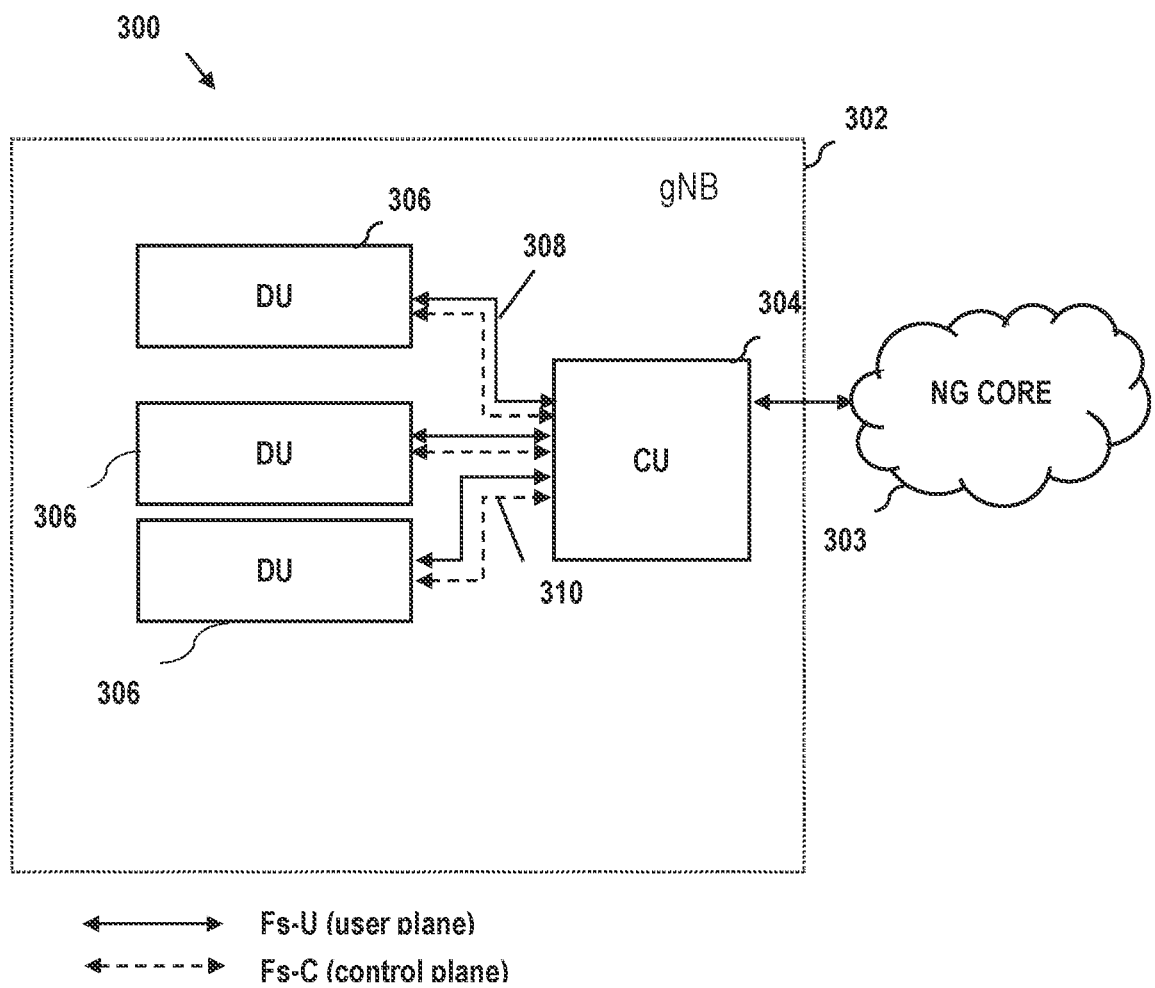
FIG. 3 is a functional block diagram of a prior art gNB architecture including CU and multiple DUs.

To achieve certain capacity targets (e.g., 10 Gbps) over extant network infrastructure (see e.g., FIGS. 1 and 2 herein), increased use of optical fiber is needed in certain parts of the infrastructure. Under current HFC network design, services are provided to users via a coaxial cable "drop" to their premises, and groups of such premises are served by common tap-off points or nodes within the larger architecture. Individual premises "tap off" the cabling or other infrastructure from each node and, depending on their geographic placement and other considerations, may require utilization of a number of different amplification units in order to maintain sufficient signal strength out to the most distant (topology-wise) premises in the system.

For instance, a common description of how many amplifier stages are used between a source node and premises is "N+i", where i=the number of amplifier stages between the source node and the premises. For instance, N=0 refers to the situation where no amplifiers are used, and N+3 refers to use of three (3) amplifiers. In some extant cable/HFC systems in operation, values of i may be as high as seven (7); i.e., N+7, such as for service to rural areas.

As can be expected, use of such amplifier stages introduces some limitations on the data rates or bandwidth (both downstream; i.e., toward the client premises, and upstream, i.e., from the client premises) achievable by such systems. In effect, such systems are limited in maximum bandwidth/data rate, due in part to the design of the amplifiers; for example, they are typically designed to provide services primarily in the downstream direction (with much lower upstream bandwidth via so-called "OOB" or out-of band RF channels providing highly limited upstream communication. Cable modem or DOCSIS-compliant systems utilize DOCSIS QAMs (RF channels) for enhanced upstream bandwidth capability such as for Internet services, but even such technologies are significantly limited in capability, and moreover have limited flexibility in the allocation of downstream versus upstream bandwidth, especially dynamically.

Accordingly, replacement of such amplifier stages (and supporting coaxial cabling) with higher bandwidth, low-loss mediums such as optical fiber is necessary to achieve very high target data rates (sometimes referred to as going "fiber deep"), including all the way back to an N+0 configuration throughout the entire network to achieve the highest data rates. However, replacement of literally tens of thousands of amplifiers and thousands of miles of cabling with optical fiber or the like is prohibitively expensive, and can take years.

Figure 6A:
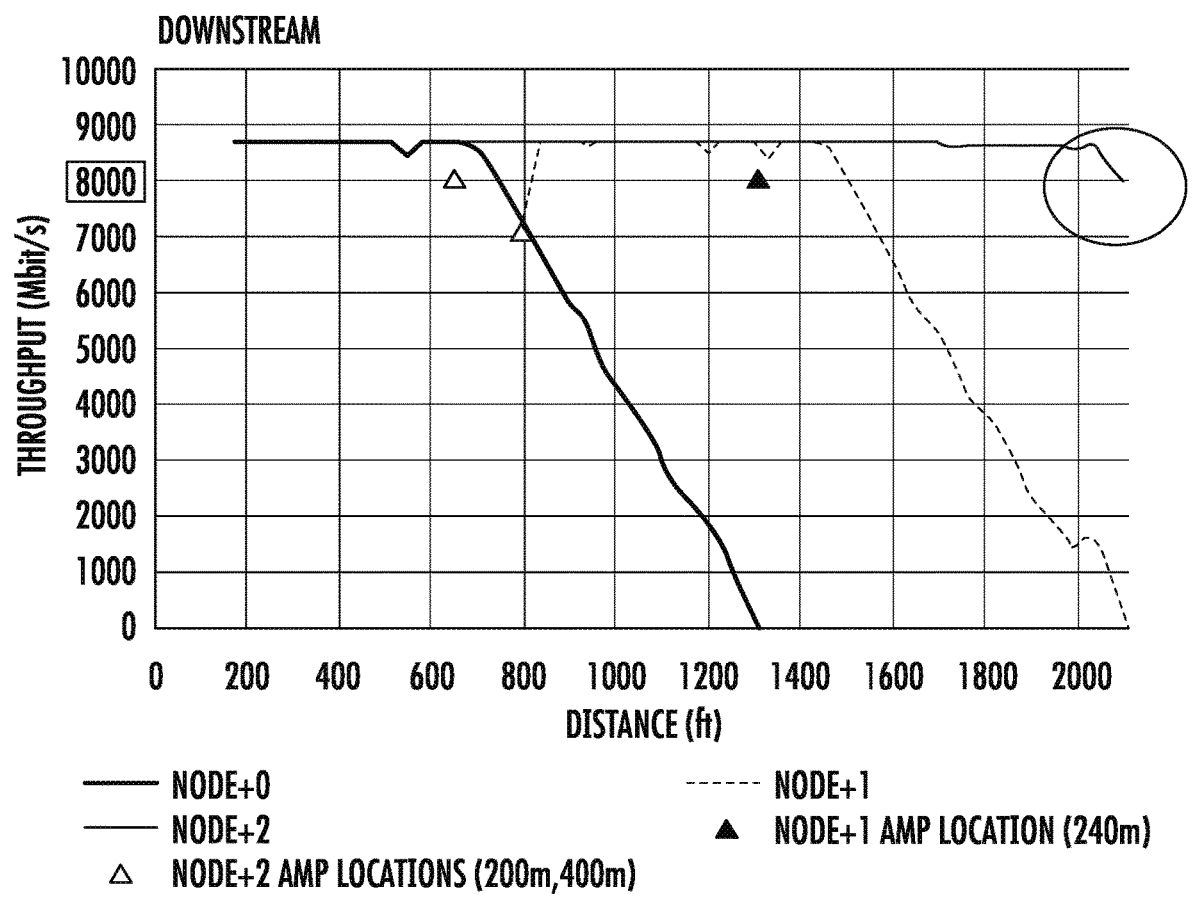
FIGS. 6a and 6b illustrate exemplary downstream (DS) and upstream (US) data throughputs or rates as a function of distance within the HFC cable plant of FIG. 5.
Figure 6B:
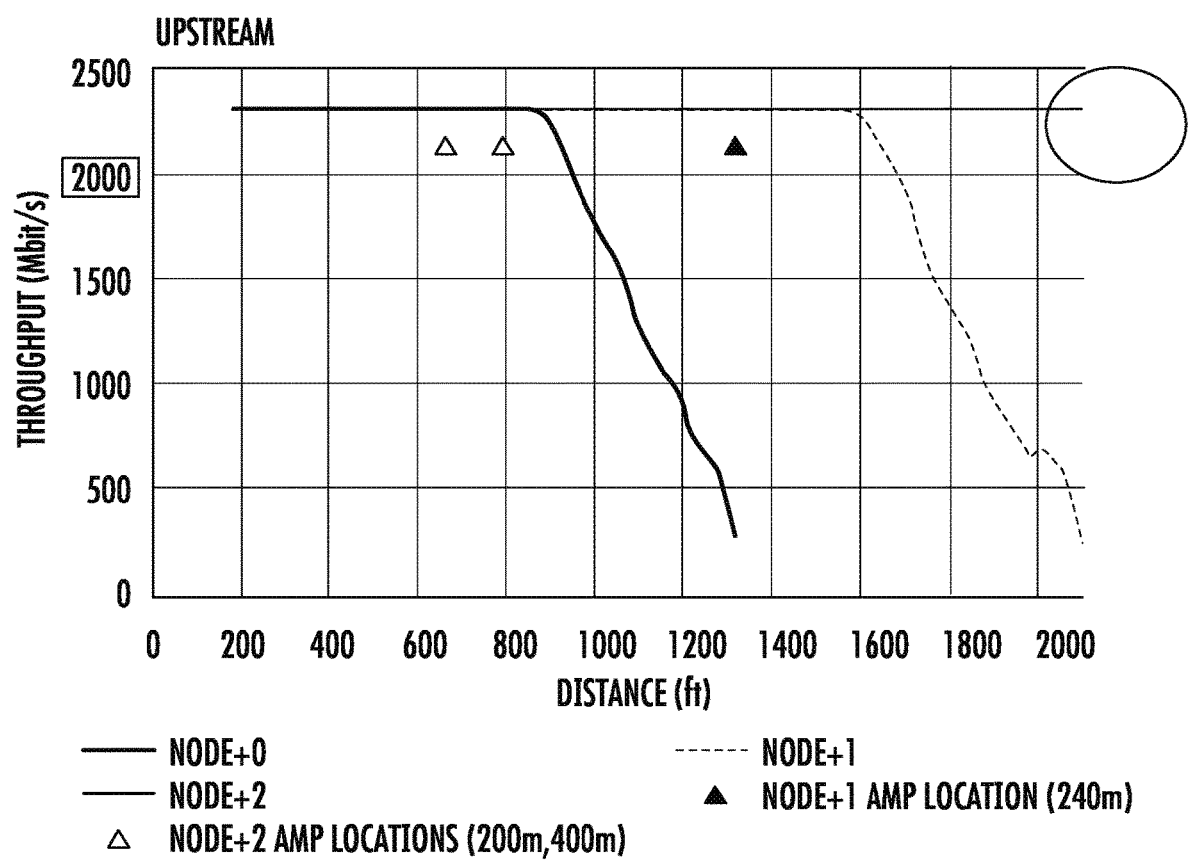

FIGS. 6a and 6b illustrate exemplary downstream (DS) and upstream (US) data throughputs or rates as a function of distance within the inventive HFC cable plant of the present disclosure; e.g., that of FIG. 4. As illustrated, a total (DS and US combined) bandwidth on the order of 10 Gbps is achievable (based on computerized simulation conducted by the Assignee hereof), at Node+2 at 2100 ft (640 m), and at Node+1 at 1475 ft (450 m). One exemplary split of the aforementioned 10 Gbps is asymmetric; e.g., 8 Gbps DL/2 Gbps UL, although this may be dynamically varied using e.g., TDD variation as described elsewhere herein.

Notably, the portions of the extant HFC architecture described above (FIGS. 1 and 2) utilized by the architecture 400 of FIG. 4 are not inherently limited by their medium and architecture (i.e., optical fiber transport ring, with coaxial cable toward the edges); coaxial cable can operate at frequencies significantly higher than the sub-1 GHz typically used in cable systems, but at a price of significantly increased attenuation. As is known, the formula for theoretical calculation of attenuation (A) in a typical coaxial cable includes the attenuation due to conductors plus attenuation due to the dielectric medium:

$$A = 4.35(R_t/Z_0) + 2\sqrt{E}\, 78 \text{ pF}$$
$$= \text{dB per 100 ft.}$$

where:
$R_t$=Total line resistance ohms per 1000 ft.
$R_t$=0.1 (1/d+1$\sqrt{F}$D)
  (for single, copper line)
p=Power factor of dielectric
F=Frequency in megahertz (MHz)

As such, attenuation increases with increasing frequency, and hence there are practical restraints on the upper frequency limit of the operating band. However, these restraints are not prohibitive in ranges up to for example 2 GHz, where with suitable cable and amplifier manufacturing and design, such coaxial cables can suitably carry RF signals without undue attenuation. Notably, a doubling of the roughly 800 MHz-wide typical cable RF band (i.e., to 1.6 GHz width) is very possible without suffering undue attenuation at the higher frequencies.

It will also be appreciated that the attenuation described above is a function of, inter alia, coaxial conductor length, and hence higher levels of "per-MHz" attenuation may be acceptable for shorter runs of cable. Stated differently, nodes serviced by shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure contemplates use of selective mapping of frequency spectrum usage as a function of total cable medium run length or similar.

Another factor of transmission medium performance is the velocity factor (VF), also known as wave propagation speed or velocity of propagation (VoP), defined as the ratio of the speed at which a wavefront (of an electromagnetic or radio frequency signal, a light pulse in an optical fiber or a change of the electrical voltage on a copper wire) propagates over the transmission medium, to the speed of light (c, approximately 3E08 m/s) in a vacuum. For optical signals, the velocity factor is the reciprocal of the refractive index. The speed of radio frequency signals in a vacuum is the speed of light, and so the velocity factor of a radio wave in a vacuum is 1, or 100%. In electrical cables, the velocity factor mainly depends on the material used for insulating the current-carrying conductor(s). Velocity factor is an important characteristic of communication media such as coaxial, CAT-5/6 cables, and optical fiber. Data cable and fiber typically has a VF between roughly 0.40 and 0.8 (40% to 80% of the speed of light in a vacuum).

Achievable round-trip latencies in LTE (UL/DL) are on the order of 2 ms (for "fast" UL access, which eliminates need for scheduling requests and individual scheduling grants, thereby minimizing latency, and shorter TTI (Transmission Time Interval), per Release 15), while those for 5G NR are on the order of 1 ms or less, depending on transmission time interval frequency (e.g., 60 kHz).

Notably, as demand for connectivity and wireless speed among consumers increases (due in part to ubiquity of mobile user devices), latency becomes a bottleneck and a new indicator for measuring user experience. For example, user experience studies show that a user will leave a webpage if it does not load within a few seconds. To that end, greatly improving response rates (e.g., lower ping) and download speeds from a server through use of the architecture(s) described herein achieve a significant improvement in user experience.

Notably, a significant portion of 4G/4.5G transport latency relates to network core and transport (i.e., non-edge) portions of the supporting infrastructure.

Hence, assuming a nominal 0.7 VF and a one (1) ms roundtrip latency requirement, putative service distances on the order of 100 km are possible, assuming no other processing or transport latency:

$0.5E$-03 s (assume symmetric US/DS)×(0.7×3$E$08 m/s)×1 km/1000m=1.05$E$02 km

Network Node and DUe Apparatus—

Figure 7:
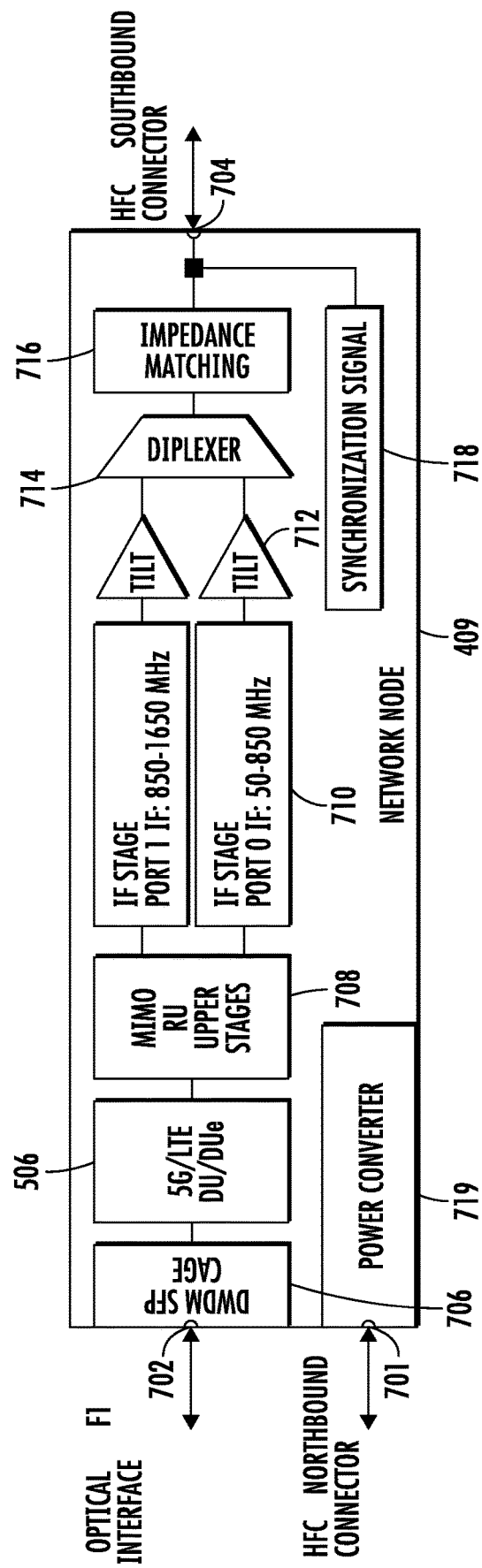
FIG. 7 is a functional block diagram illustrating an exemplary general configuration of a network node apparatus according to the present disclosure.
Figure 7A:
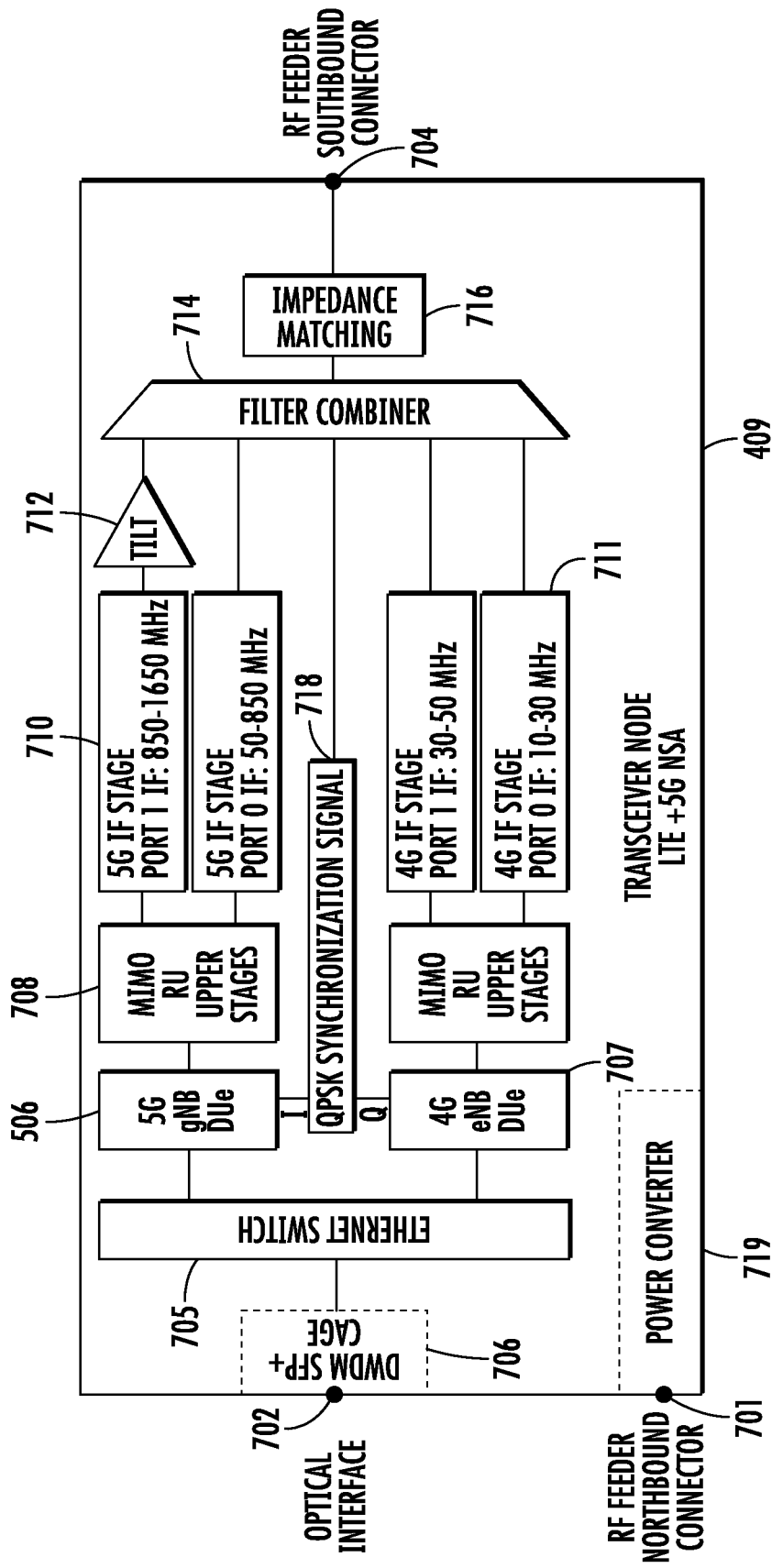
FIG. 7a is a functional block diagram illustrating an exemplary implementation of the network node apparatus according to the present disclosure, configured for 3GPP 4G and 5G capability.

FIGS. 7 and 7a illustrate exemplary configurations of a network radio frequency node apparatus 409 according to the present disclosure. As referenced above, these nodes 409 can take any number of form factors, including (i) co-located with other MSO equipment, such as in a physically secured space of the MSO, (ii) "strand" or pole mounted, (iii) surface mounted, and (iv) buried, so as to inter alia, facilitate most efficient integration with the extant HFC (and optical) infrastructure, as well as other 4G/4.5G/5G components such as the CUe 404.

As shown, in FIG. 7, the exemplary node 509 in one embodiment generally includes an optical interface 702 to the HFC network DWDM system (see FIG. 2), as well as a "Southbound" RF interface 704 to the HFC distribution network (i.e., coax). The optical interface 702 communicates with an SFP connector cage 706 for receiving the DWDM signals via the interposed optical fiber. A 5G NR DUe 506 is also included to provide 5G DU functionality as previously described, based on the selected option split. The MIMO/radio unit (RU) stages 708 operate at baseband, prior to upconversion of the transmitted waveforms by the IF (intermediate frequency) stages 710 as shown. As discussed below, multiple parallel stages are used in the exemplary embodiment to capitalize on the multiple parallel data streams afforded by the MIMO technology within the 3GPP technology. A tilt stage 712 is also utilized prior to the diplexer stage 714 and impedance matching stage 716. Specifically, in one implementation, this "tilt" stage is used to compensate for non-linearity across different frequencies carried by the medium (e.g., coaxial cable). For instance, higher frequencies may have a higher loss per unit distance when travelling on the medium as compared to lower frequencies travelling the same distance on the same medium. When a high bandwidth signal (e.g. 50-1650 MHz) is transmitted on a coax line, its loss across the entire frequency bandwidth will not be linear, and may include shape artifacts such as a slope (or "tilt"), and/or bends or "knees" in the attenuation curve (e.g., akin to a low-pass filter). Such non-linear losses may be compensated for to achieve optimal performance on the medium, by the use of one or more tilt compensation apparatus 712 on the RF stage of the node device.

A synchronization signal generator 718 is also used in some embodiments as discussed in greater detail below with respect to FIG. 7a.

In the exemplary implementation of FIG. 7a, both 4G and 5G gNB DUe 707, 406 are also included to support the RF chains for 4G and 5G communication respectively. As described in greater detail below, the 5G portion of the spectrum is divided into two bands (upper and lower), while the 4G portion is divided into upper and lower bands within a different frequency range. In the exemplary implementation, OFDM modulation is applied to generate a plurality of carriers in the time domain. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based spectrum generation apparatus useful with various embodiments of the node 409 described herein.

In the exemplary embodiment, the 5G and LTE OFDM carriers produced by the node 409 utilize 1650 MHz of the available HFC bearer bandwidth, and this bandwidth is partitioned into two or more sub-bands depending on e.g., operational conditions, ratio of "N+0" subscribers served versus "N+i" subscribers served, and other parameters. In one variant, each node utilizes RF power from its upstream nodes to derive electrical power, and further propagate the RF signal (whether at the same of different frequency) to downstream nodes and devices including the wideband amplifiers.

While the present embodiments are described primarily in the context of an OFDM-based PHY (e.g., one using IFFT and FFT processes with multiple carriers in the time domain) along with TDD (time division duplex) temporal multiplexing, it will be appreciated that other PHY/multiple access schemes may be utilized consistent with the various aspects of the present disclosure, including for example and without limitation FDD (frequency division duplexing), direct sequence or other spread spectrum, and FDMA (e.g., SC-FDMA or NB FDMA).

As a brief aside, to achieve high throughput using a single receiver chipset in the consumer premises equipment (CPEe) 413 and 3GPP 5G NR waveforms over a single coaxial feeder, such as the coaxial cable that MSOs bring to their subscriber's premises or the single coaxial cable that is installed for lower-cost single input single output (SISO) distributed antenna systems (DAS), the total carrier bandwidth that can be aggregated by the chipset is limited to a value, e.g. 800 MHz, which is insufficient for reaching high throughputs such as 10 Gbit/s using one data stream alone given the spectral efficiencies supported by the 3GPP 5G NR standard.

Since the 3GPP 5G NR standard supports the transmission of multiple independent parallel data streams as part of a multiple input multiple output (MIMO) channel for the same RF bandwidth to leverage the spatial diversity that wireless channels afford when multiple antenna elements are used, the very first generation of 3GPP 5G chipsets will support such parallel MIMO data streams. However, attempts to transmit these parallel streams over a single cable would generally be counterproductive, as all the streams would occupy the same RF bandwidth and would interfere with each other for lack of spatial diversity between them.

Accordingly, the various embodiments disclosed herein (FIGS. 7 and 7a) leverage the parallel MIMO data streams supported by 3GPP 5G NR, which are shifted in frequency in a transceiver node before being injected into the single coaxial feeder so that frequency diversity (instead of spatial diversity; spatial diversity may be utilized at the CPEe and/or supplemental pole-mounted radio access node if desired) is leveraged to achieve the maximum total carrier bandwidth that 3GPP 5G NR chipsets will support with parallel data streams.

Also, since higher frequencies attenuate much more over the coaxial transmission media than lower frequencies, in one variant the Intermediate Frequencies (IF) are transmitted over the media, and block-conversion to RF carrier frequency is employed subsequently in the consumer premises equipment (CPEe) 413 for 3GPP band-compliant interoperability with the 3GPP 5G NR chipset in the CPEe. In this fashion, attenuation that would otherwise be experienced by conversion earlier in the topology is advantageously avoided.

The IF carriers injected by the transceiver node into the coaxial feeder 704 can be received by multiple CPEe 413 that share the feeder as a common bus using directional couplers and power dividers or taps. Point-to-Multipoint (PtMP) downstream transmissions from the node 409 to the CPEe 413 can be achieved by, for instance, scheduling payload for different CPEe on different 3GPP 5G NR physical resource blocks (PRB) which are separated in frequency.

In the exemplary embodiment, the vast majority of bandwidth in the coaxial cable bearer is used in Time Division Duplex (TDD) fashion to switch between downstream (DS) and upstream (US) 5G NR communications. Upstream communications from the multiple CPEe 413 to the transceiver node can also/alternatively occur simultaneously over separate PRBs (frequency separation).

In one variant (see FIG. 7a), a minor portion of the lower spectrum (since lower frequencies attenuate less on the cable) is allocated to a 3GPP 4G LTE MIMO carrier with up to two parallel streams of 20 MHz bandwidth for a total of 40 MHz. This is performed since 3GPP Release 15 only supports 5G NR in Non-Standalone (NSA) mode, whereby it must operate in tandem with a 4G LTE carrier. Just as with the parallel 5G streams, the two parallel LTE MIMO streams are to be offset in frequency so as to not interfere with each other and are configured in the exemplary embodiment to operate in TDD mode.

As an aside, 5G NR supports adaptive TDD duty cycles, whereby the proportion of time allocated for downstream and upstream transmissions can be adapted to the net demand for traffic from the total set of transmitting network elements, viz. the node and all the CPEe 413 sharing the coaxial bus with the node. 4G LTE does not support such adaptive duty cycles. To prevent receiver blocking in the likely scenario that the 5G and 4G duty cycles differ, high-rejection filter combiners 714 are used in all active network elements, viz. transceiver nodes, inline amplifiers and CPEe 413 for the 4G and 5G carriers to not interfere with each other or cause receiver blocking. In the exemplary diplexer of FIG. 7a, both 4G and 5G are addressed via a high-rejection filter to allow for different duty cycles.

In one variant, another minor portion of the lower spectrum on the coaxial cable employs one-way communication in the downstream for the transmission of two digital synchronization channels, one for 5G and one for 4G, which are I-Q multiplexed onto one QPSK analog synchronization channel within the aforementioned "minor portion" from the signal generator 718 of the transceiver node 409 to the multiple inline amplifiers and CPEe 413 that may be sharing the coaxial bus. These synchronization channels aid coherent reception of the PRBs, and in one variant command the network elements to switch between downstream and upstream communication modes according to the TDD duty cycle set by the transceiver node 409. In the exemplary configuration, two digital synchronization channels are required since the 5G and 4G streams may have different upstream-downstream ratios or duty-cycles. Since lower frequencies attenuate less on the cable, the synchronization channel is in one implementation transmitted over a lower portion of the spectrum on the cable so that it reaches every downstream network element and CPEe.

The connectivity between the transceiver node 409 and the northbound network element is achieved with a fiber optic link 702 to the MSO DWDM plant. To minimize the number of fiber channels required to feed the transceiver node 409, and to restrict it to a pair of fiber strands, in one embodiment the 3GPP 5G NR F1 interface (described supra) is realized over the fiber pair to leverage the low overhead of the F1 interface. The 3GPP 5G NR Distribution Unit (DUe) functionality is incorporated into the transceiver node 409 as previously described, since the F1 interface is defined between the Central Unit (CU/CUe) and DU/DUe where, in the illustrated embodiment, the CUe and DUe together constitute a 3GPP 5G NR base station or gNB (see FIGS. 5a-5c).

An Ethernet switch 705 is also provided at the optical interface in the embodiment of FIG. 7a to divide the backhaul into the 4G and 5G data paths (e.g., the received upstream 4G and 5G signals are respectively routed differently based on the switch 705).

The exemplary node 409 also includes a power converter 719 to adapt for internal use of quasi-square wave low voltage power supply technology over HFC used by DOCSIS network elements as of the date of this disclosure. The node 409 in one variant is further configured to pass the quasi-square wave low voltage power received on the input port 701 through to the HFC output port 704 to other active network elements such as e.g., amplifiers, which may be installed downstream of the node on the HFC infrastructure.

It is noted that as compared to some extant solutions, the illustrated embodiment of FIGS. 4 and 7-7a uses HFC versus twisted pair to feed the CPEe 413; HFC advantageously provides lower loss and wider bandwidths than twisted pair, which is exploited to provide 5G throughputs to farther distances, and to leverage the large existing base of installed coaxial cable. Moreover, the foregoing architecture in one implementation is configured to serve multiple CPEe 413 using directional couplers and power dividers or taps to attach to a common coaxial bus which connects to a single interface at the transceiver node. The aforementioned Ethernet services (necessary to service an external Wi-Fi access-point and an integrated Wi-Fi router) are further added in other implementations to provide expanded capability, in contrast to the existing solutions.

CPEe Apparatus—

Figure 8:
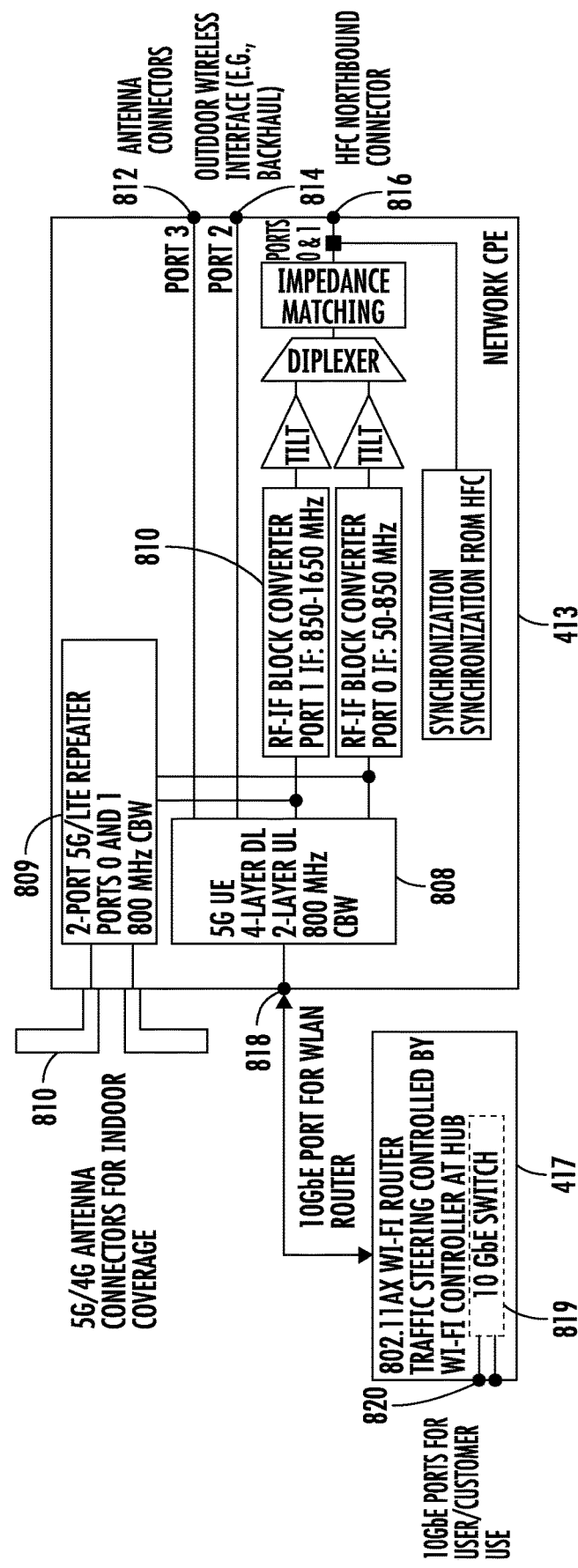
FIG. 8 is a functional block diagram illustrating an exemplary general configuration of a CPEe apparatus according to the present disclosure.

FIG. 8 illustrates an exemplary configuration of a CPEe apparatus 413 according to the present disclosure. As shown, the CPEe 413 generally an RF input interface 816 to the HFC distribution network (i.e., coax drop at the premises). A transmitter/receiver architecture generally symmetrical to the transmitter/receiver of the node 409 discussed previously is used; i.e., impedance matching circuitry, diplexer, synchronization circuit, tilt, etc. are used as part of the CPEe RF front end. Block converters 810 are used to convert to and from the coaxial cable domain bands (here, 50-850 and 850-1650 MHz) to the premises domain, discussed in greater detail below.

The exemplary CPEe 413 also includes a 5G UE process 808 to implement 3GPP functionality of the UE within the CPEe, and 3GPP (e.g., 5G/LTE) repeater module 809 which includes one or more antennae elements 810 for indoor/premises coverage within the user RF band(s). As such, the CPEe 413 shown can in effect function as a base station for user devices within the premises operating within the user band(s).

A 10 GbE WLAN port 818 is also included, which interfaces between the UE module 808 and the (optional) WLAN router 417 with internal 10 GbE switch 819) to support data interchange with premises WLAN infrastructure such as a Wi-Fi AP.

Also shown in the configuration of FIG. 8 are several external ports 812, 814 for external antenna 416 connection (e.g., roof-top antenna element(s) used for provision of the supplemental data link as previously described with respect to FIG. 4), wireless high-bandwidth backhaul, or other functions.

Figure 8A:
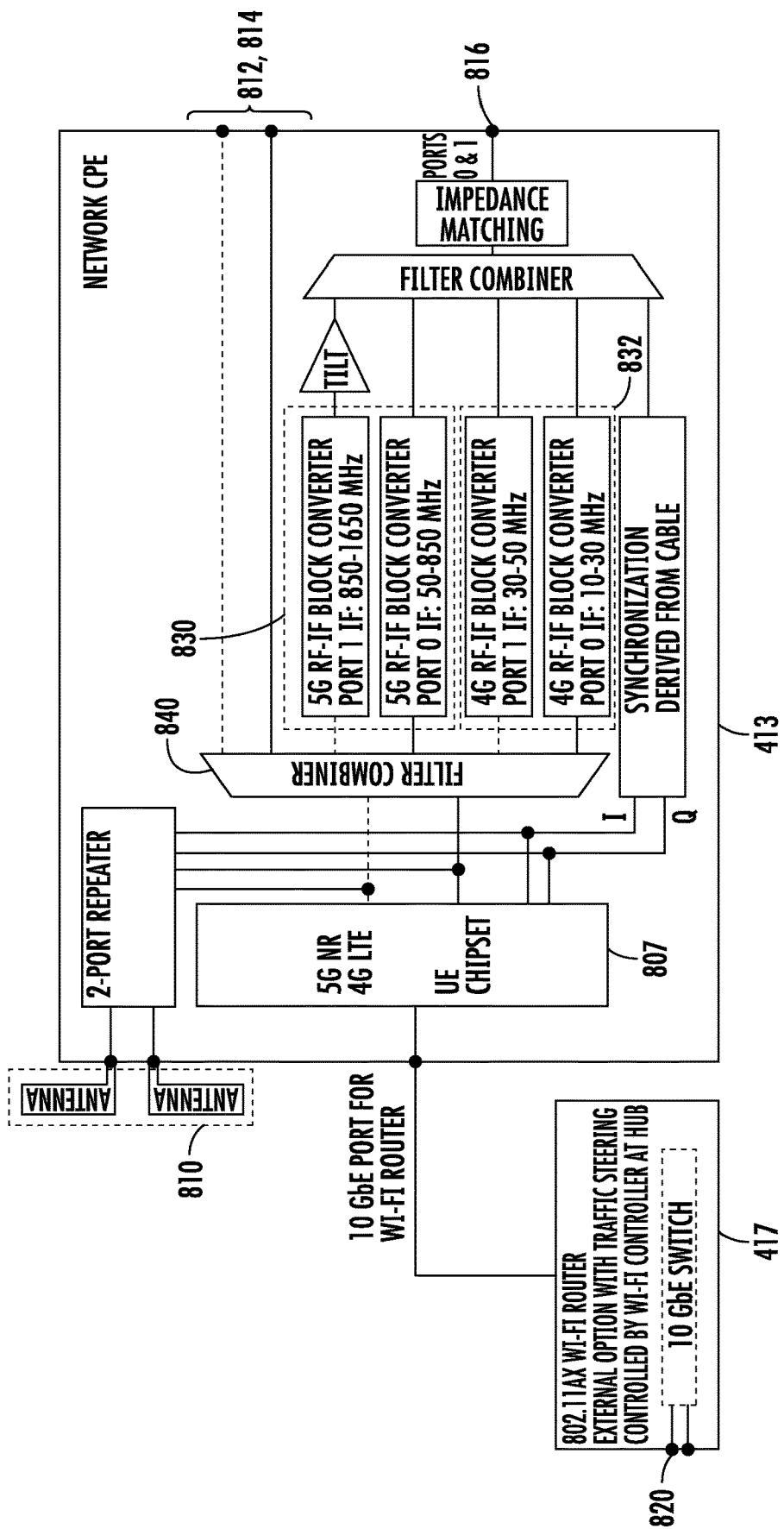
FIG. 8a is a functional block diagram illustrating an exemplary implementation of a CPEe apparatus according to the present disclosure, configured for 3GPP 4G and 5G capability.

In the exemplary implementation of FIG. 8*a*, both 4G and 5G gNB block converters 832, 830 are included to support the RF chains for 4G and 5G communication respectively (i.e., for conversion of the IF-band signals received to the relevant RF frequencies of the 4G/4.5G/5G interfaces and modems within the CPEe, such as in the 2 GHz band. The block converters also enable upstream communication with the distribution node 409 via the relevant IF bands via the coaxial input 816 as previously described.

Notably, the CPEe 413 applies block-conversion between the IF and RF carrier frequency for the 4G and 5G carrier separately since they may be on different frequency bands. The CPEe includes in one implementation a 5G NR and 4G LTE capable user equipment (UE) chipset 807. The two technologies are supported in this embodiment, since the first release of 3GPP 5G NR requires 4G and 5G to operate in tandem as part of the non-standalone (NSA) configuration.

It is noted that in the exemplary configuration of FIG. 8*a* (showing the lower frequencies in 4G combined with 5G), a filter combiner is used (in contrast to the more generalized approach of FIG. 8).

It is also noted that the specific implementation of FIG. 8*a* utilizes "tilt" compensation as previously described on only one of the RF-IF block converters 830. This is due to the fact that the need for such compensation arises, in certain cases such as coaxial cable operated in the frequency band noted) disproportionately at the higher frequencies (i.e., up to 1650 MHz in this embodiment). It will be appreciated however that depending on the particular application, different compensation configurations may be used consistent with the present disclosure. For example, in one variant, the upper-band block converters 830 may be allocated against more granular frequency bands, and hence tilt/compensation applied only in narrow regions of the utilized frequency band (e.g., on one or two of four % G RF-IF block converters). Similarly, different types of tilt/compensation may be applied to each block converter (or a subset thereof) in heterogeneous fashion. Various different combinations of the foregoing will also be appreciated by those of ordinary skill given the present disclosure.

Block conversion to the RF frequency makes the signals 3GPP band-compliant and interoperable with the UE chipset in the CPEe 413. The RF carriers are also then amenable for amplification through the included repeater 809 for 4G and 5G which can radiate the RF carriers, typically indoors, through detachable external antennas 810 connected to the CPEe. Mobile devices such as smartphones, tablets with cellular modems and IoT devices can then serve off of the radiated signal for 4G and 5G service (see discussion of FIGS. 9*a*-9*c* below).

The UE chipset 807 and the repeater 809 receive separate digital I/Q synchronization signals, one for 4G and one for 5G, for switching between the downstream and upstream modes of the respective TDD carriers, since they are likely to have different downstream-to-upstream ratios or duty cycle. These two digital synchronization signals are received from an I-Q modulated analog QPSK signal received from lower-end spectrum on the coaxial cable that feeds the CPEe 413 via the port 816.

As noted, in the exemplary implementation, OFDM modulation is applied to generate a plurality of carriers in the time domain at the distribution node 509; accordingly, demodulation (via inter alia, FFT) is used in the CPEe to demodulate the IF signals. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based receiver/demodulation apparatus useful with various embodiments of the CPEe 413 described herein.

Similar to the embodiment of FIG. 8, a 10 Gbe Ethernet port is also provided to support operation of the WLAN router 417 in the device of FIG. 8*a*, including for LAN use within the served premises.

Figure 9A:
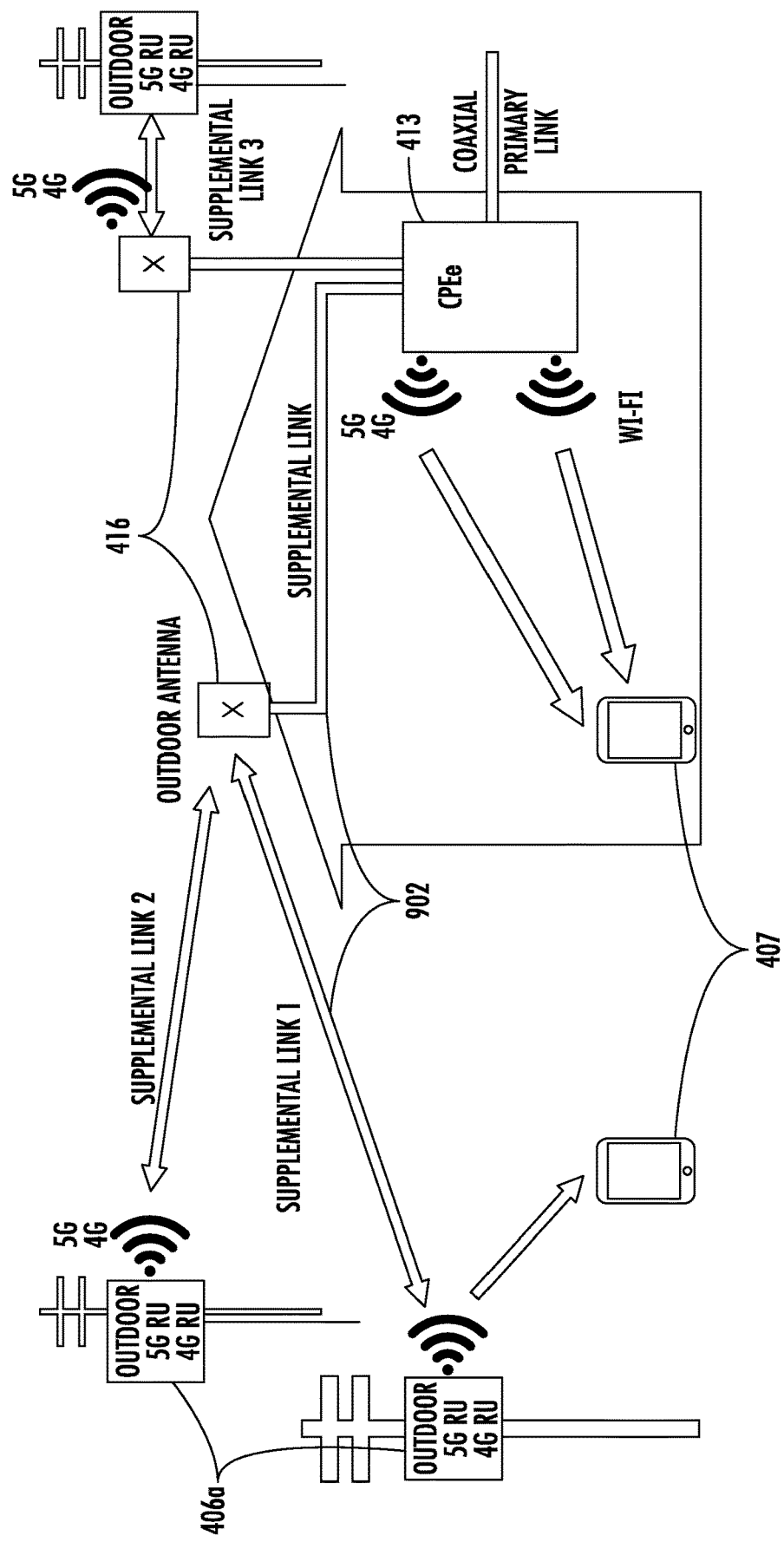
FIG. 9a is a block diagram illustrating an exemplary embodiment of a supplemental wireless link architecture supporting indoor enhanced bandwidth capability, according to the present disclosure.

Further, to boost the broadband capacity beyond the capacity available through the primary coaxial cable link and to add a redundant connection for higher reliability (which could be important for small businesses, enterprises, educational institutions, etc.), two additional RF interfaces on the CPEe of FIG. 8*a* are included for connecting the CPEe to a 2-port external antenna 416 which is installed outdoors, e.g., on the roof of the small business, multi-dwelling unit (MDU) or multi-story enterprise (see FIG. 9*a*). This external antenna can be used to receive supplemental signals from outdoor radios installed in the vicinity of the consumer premises. It will be appreciated that the outdoor radios may have a primary purpose of providing coverage for outdoor mobility, but signals from them can also/alternatively be used in a fixed-wireless manner to supplement the capacity from the primary coaxial link and to add redundancy, as described elsewhere herein.

Supplemental Link and Mobility Enhancement—

In a further embodiment of the architecture 400, a supplemental or complementary data link 902 is utilized to provide additional data capacity (and redundancy to the primary link in the event of an equipment or other failure), as shown in FIG. 9a. The supplemental link in one variant includes a 5G NR wireless interface between a pole-mounted or other external radio access node 406a, and the premises transceiver (which in one embodiment includes the CPEe 413 with added antenna capability 416. As used in the present context, the terms "pole-mounted" and "external" refer without limitation to any mounting placement or location which can establish a connection or data connectivity with e.g., the supplemental antenna 416 (e.g., roof-top or outdoor antenna) of the CPEe. Such mounting may be outdoor or within a large structure (e.g., a sports stadium, large building complex, and may be only temporary or semi-permanent in some implementations.

In FIG. 9a, an exemplary portion of the architecture 400 (including portions of the relevant CUe/Due architectures 520, 540 and/or 560) is shown. In one embodiment, a premises (a house, commercial facility, outdoor location, etc.) receives data service through an enhanced consumer premises equipment (CPEe) 413. CPEe 413 may receive data via coaxial cabling; e.g., via hybrid fiber coaxial (HFC) cables used in extant content delivery infrastructures. CPEe 413 is a network node that comprises a modem, a gateway device, and/or a router. The CPEe thus manages and delivers data to client devices or endpoints in the vicinity that consume the received data, i.e., within the service range and authenticated for connection. In one variant, the CPEe comprises an intermediary node that delivers received data to another CPEe 413 before the client devices 407 or endpoints. Connections between these nodes and endpoints may be for instance "daisy-chained" in a linear fashion, or connected in a branched fashion in which one node services one or more other nodes. However, one will appreciate that, within a "fog-based" 5G network comprising a web of peer-to-peer connections, each device or node may act as an "intermediary" node that may maintain and further transmit the data to another device or node if the device or node has opted in (or not opted out) as a node.

As an aside, to help address concerns about battery usage, data usage, or privacy, consumers may also be incentivized to participate when given the prospect of ultra-high data rates enabled by the architecture shown in FIGS. 9a-9c (to be discussed in more detail below). In this configuration, total data rates on the order of 21 Gbps can be achieved based on modeling by the Assignee hereof, e.g., 17 Gbps DS and 4 Gbps US. In practical parlance, a downstream rate of 1 Gbps equates to a download speed of 125 megabytes per second; thus, a downstream rate of 21 Gbps equates to a download speed of 2.125 gigabytes per second, which can greatly exceed data transfer rates associated with commonly utilized wired data transfers, e.g., via USB 3.0 or data transfer between mechanical or solid-state hard drives.

For purposes of clarity, the exemplary embodiment assumes that the CPEe 413 is a data communication and routing device that ultimately delivers digital data to a client device 407. Examples of client device 407 include but are not limited to 3GPP-enabled mobile devices such as smartphones, laptops, tablets, smartwatches, smart home devices (e.g., Internet of Things (IoT)-enabled devices), personal digital assistants (PDAs), e-readers, portable music players, digital cameras, and wireless-enabled office equipment (e.g., printer). Client devices may also include wired equipment, such as desktop PCs, servers, other CPEe 413, and COTS/off-the-shelf or ISP-provided modem or router devices.

In the exemplary embodiment, a supplemental or complementary data link 902 is utilized to provide additional data capacity (and redundancy to the primary link in the event of an equipment or other failure). The supplemental link in one variant comprises a 5G NR wireless interface between the external radio access node 406a and the premises transceiver, which in one embodiment comprises the CPEe 413 with added antenna capability (e.g., outdoor antenna 416, or 4G LTE and 5G NR antenna connectors 812, 814 of FIGS. 8 and 8a). The radio access node 406a is, in terms of topological placement, on the "edge" of the 5G network, and physically is proximate the end user's premises or one or more other nodes that are enabled for communication with a CPEe 413.

Each radio access node 406a may comprise a wireless access point capable of broadcasting its services (e.g., broadcasted according to 3GPP 4G and 5G protocols), receiving, and transmitting data. For example, the DUe module in one particular implementation is mounted on a utility pole and operates as the radio access node 406a. In some variants, an E-UTRAN small- or femto-cell device may be implemented as part of the radio access node for, inter alia, 4G service.

Factors determinative of which edge-based node (e.g., radio access node 406a among other radio access nodes, not shown) to use to create the supplemental link include (but are not limited to): (i) distance between the served premises equipment (e.g., CPEe via the outdoor antenna 416) and node, (ii) signal strength in UL and/or DL directions (which may or may not be related to distance, based on e.g., the presence of multipath propagation, RF interferers in the designated band(s), etc.), (iii) available number of channels/bandwidth for that node 406a and number of connections currently in use (i.e., does the node have the requisite capacity in terms of unallocated channels), (iv) capabilities (e.g., whether the premises equipment is 4G/4.5G/5G-enabled, whether it has integrated WLAN capability, whether the outdoor antenna 416 is MIMO-capable, etc.), (v) permission to participate and/or battery power associated with intermediate nodes (e.g., if a mobile client device 407 is used as an intermediary node; see discussion of FIG. 10A below), and (vi) capabilities of any such intermediary nodes (e.g., number of antennas or arrays thereof, processing power, and/or "class" of device (as noted above)).

In one function, the supplemental/complementary data link provides additional bandwidth to the premises. Specifically, the CPEe 413 (and/or other premises equipment as noted above) is capable of transceiving data with multiple data sources/sinks and can thereby consolidate the transceived data. In the exemplary embodiment, the supplemental link 902 may be established with the premises via an outdoor antenna 416 that connects to a pole-mounted or other external radio access node 406a within the prescribed unlicensed and/or licensed frequency bands. For example, in one implementation, the disclosed solution supports one or more prescribed subsets of NR and NR-U band combinations as defined by 3GPP, depending on the particular application(s) anticipated by the installation and the locale in which it is installed (including for example whether other operators or carriers such as MNOs are utilizing licensed spectrum within the prescribed area, and which frequency bands such operators are using). It will also be appreciated that so-called "quasi-licensed" spectrum (such as for instance that within the 3.55-3.70 GHz CBRS bands in the U.S.) may be utilized consistent with the methods and apparatus described herein.

In another embodiment, the supplemental link 902 may be the only source of bandwidth for the premises and the CPEe 413. For example, a premises that is equipped only with wireless-enabled devices (e.g., premises such as outdoor areas, or a "modernized" house that does not have coaxial cable drops) may receive data via the supplemental link 902 through an external antenna 416. In one variant, the supplemental link 902 may activate only in the event of equipment (e.g., gateway) or link (e.g., HFC) failure, such as where the primary delivery path via the N-way taps and HFC cable becomes non-functional for whatever reason.

In another embodiment, the outdoor antenna 416 may receive multiple supplemental links from multiple radio access nodes 406a (i.e., supplemental links 1 and 2 as shown in FIG. 9a). In another embodiment, premises may be equipped with multiple outdoor antennas 416, each receiving data from one or more radio access nodes 406a (see e.g., supplemental link 3 in FIG. 9a). In further embodiments, various combinations of the foregoing may be used to enable the most efficient receipt of data, e.g., based on availability of radio access nodes and outdoor antennas, each of which may be receiving data from various sources and/or may be receiving different types of data (e.g., audio, video, text, gaming data for one or more users).

It will also be appreciated that each of the RU transmit/receive channels associated with each link (whether primary or supplementary) may also be assigned to a different 5G NR network "slice" for purposes of, e.g., carrying certain types of prescribed data, maintaining QoS requirements for carried data, etc.

As shown in FIG. 9a, a user device (e.g., UE) 407 that is positioned indoors of the premises is served by the CPEe 413 via 5G/4G protocols utilizing the unlicensed "user band" previously described. The exemplary CPEe also provides WLAN (802.11) wireless access within its respective frequency band(s) (e.g. 2.4 GHz and 5.0 GHz generally), such as to a multi-RAT UE 407. Depending on the premises size, materials of construction, etc., the various WLAN and 4G/4.5G/5G signals from the CPEe will propagate varying distances, including in some cases to portions of the outdoor area of the premises. However, this outdoor coverage (if present) will typically fall off rapidly with distance and may be "spotty" due to e.g., $1/r^2$ spreading, attenuation, etc. As such, a user may completely lose both WLAN and 5G/4G coverage from the CPEe when outdoors, but for connectivity and session maintenance with one or more of the outdoor radio nodes 406a, as shown in FIG. 9a.

Table 4 below lists exemplary source/target technology combinations for the architecture 400 shown in FIG. 4 and FIG. 9a. Specifically, various permutations of (i) 5G NR, (ii) 4/4.5G LTE, and (iii) WLAN (IEEE STd. 802.11) RATs may be used consistent with the architecture as either a source or recipient technology as part of data session transfer or migration. As previously noted, each of these migrations is advantageously supported by the architecture 400 of FIG. 4 in that there is no cross-operator or cross-domain session transfer occurring; MSO-managed infrastructure which maintains communication between each of the relevant nodes/entities (including the CPEe 413 with associated WLAN router 417, radio node(s) 406a, CUe 404, and WLAN controller 415 within the 5GC) so as to enable intra-MSO session handovers between each of the listed RATs.

In the instance, where the desired handover is between an NR-based device and another 3GPP device (whether LTE/LTE-A or NR), mobility operations may be governed by the mechanisms set forth in the relevant 3GPP standards; e.g., where neighbor cell measurements can be triggered based on for instance a signal strength or signal quality metric, and the handover can be triggered by a separate trigger threshold and hysteresis with a specified time to trigger value (in ms).

In instance where the desired handover is between a 3GPP-based technology and Wi-Fi, the Wi-Fi to NR (and vice versa) transition is in one embodiment executed using the "tight" integration of the 5G Core (5GC) 403 and the Wi-Fi Controller 415 as described elsewhere herein (see FIG. 4). Specifically, in one implementation, the cognizant MSO-managed (e.g., WLAN controller 415) can signal another MSO-managed entity (e.g., CUe 404) via e.g., the Xn interface as shown in FIG. 4 to establish a handover of the WLAN session at the premises (i.e., between the UE and the Wi-Fi router 417, the latter acting as the premises WLAN AP) to the external pole-mounted radio node 406a when the user moves from indoors to outdoors. For instance, the WLAN controller 415 can be configured to utilize 3GPP-based protocols for communication of data relating to handovers between the 3GPP-based entity and the WLAN controller. Stated differently, the WLAN controller 415 can be configured to be 3GPP-compliant with regard to at least necessary features and functions for communication of data and messaging necessary to effectuate handovers (in effect making the WLAN portion of the architecture appear to be an eNB/gNB to the 3GPP-based portion of the architecture), such as via addition of a 3GPP protocol stack. This can also be realized without the use of a connection manager entity or process running on the UE (which might arbitrate or control utilization of different technologies for connection).

Figure 9B:
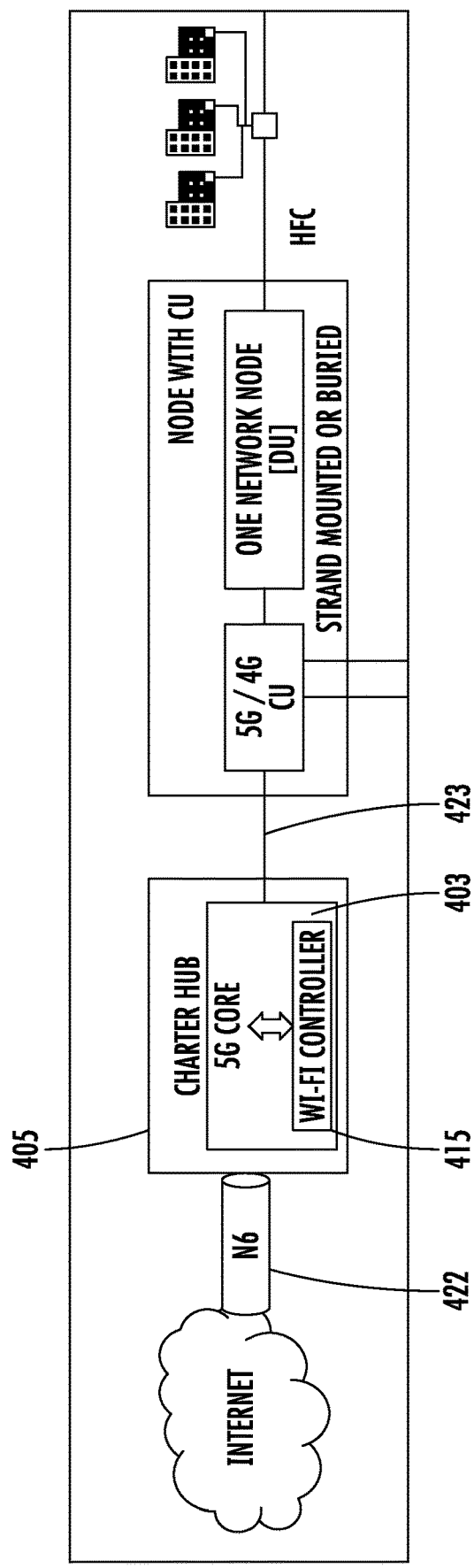
FIG. 9b is a block diagram illustrating an exemplary 5GC/Wi-Fi controller integrated hub architecture and communication via the NG/Xn and N6 interfaces.

In the exemplary configuration of the inventive architecture, the UE's IP address is always be anchored at the 5G Core (5GC), and the 5GC (and Wi-Fi Controller 415) connects to the Internet over the extant N6 interface 422, and the CUe-equipped 5G Node via the NG/Xn interface 423, as shown in FIG. 9b. The Wi-Fi controller's function can be logically (and even physically) integrated within the 5GC, thereby ensuring fast responses between the two functions.

In another implementation, this integration includes utilization of the so-called "Agile Multiband" features developed by the Wi-Fi Alliance, specifically as set forth in the "Wi-Fi Agile Multiband Specification" Version 1.2 dated Dec. 31, 2018, and incorporated herein by reference in its entirety, for handover of the communication session. As a brief aside, using Wi-Fi Agile Multiband, a Wi-Fi AP (access point) and "client" (which may be for example a Wi-Fi-enabled 3GPP UE) can exchange data relating to their respective cellular data network capabilities (if any). Specifically, in an AP compliant with Wi-Fi Agile Multiband, the MBO-OCE IE (information element) contains the MBO AP Capabilities Indication, and the attribute indicates whether that AP is aware of any relevant (e.g., overlapping) cellular data network coverage. The ability to directly or indirectly be aware of cellular coverage is an optional capability for APs. For instance, direct awareness might include the AP being configured (through appropriate RF sensing apparatus/modem) of cellular waveforms, such as via band scanning. Conversely, indirect awareness might include the ability to obtain data from another entity (e.g., network entity, controller, eNB/gNB, etc.) regarding putative coverage by cellular infrastructure. Typically, the AP is not directly aware (sensing or in data communication with the cellular network), but rather uses indirect awareness via e.g., access to information elsewhere in the infrastructure.

For a Wi-Fi client device, the MBO-OCE IE contains a similar attribute (Cellular Data Capabilities attribute), which indicates whether the client has cellular data connection capability, and if so, whether it maintains a current cellular data network connection. Note that inclusion of the Cellular Data Capabilities attribute in the MBO-OCE IE is mandatory for any Wi-Fi Agile Multiband client device that is cellular data (e.g., 3GPP) capable.

The Wi-Fi AM also specifies that cellular data-capable clients update their cellular data network connection status using the WNM notification process, akin to the Non-preferred Channel Report. Prior to association of the client to an AP, and when the client uses the ANQP-based neighbor report mechanism to identify candidate APs, the client configures the ANQP query to include data indicating a desire to obtain preference information about cellular data networks. A cellular-aware AP respond to this data within the query via the Cellular Data Connection Preference subtype ANQP element to indicate infrastructure preference regarding the client's use of the cellular network relative to the Wi-Fi network. Likewise, during an association, a cellular-capable client and cellular-aware AP will include the Cellular Data Connection Preference attribute in any BTM Query or unsolicited BTM Requests and Responses.

One key advantage in the Agile Multiband-based embodiment of the disclosed network architecture is the high level of integration of the Agile Multiband features to the 5GC; this enables, inter alia, the network operator (e.g., MSO) to eliminate any dependency on a connection manager to trigger the preferential treatment of an access technology—be it 3GPP or Wi-Fi. In effect, the logic for effecting such preferential treatment (and pursuant thereto, a handover) is network-based and accordingly entirely controlled by (and configurable by) the MSO.

The DUe to RRH interface is shown as the "fronthaul," while the DUe to CUe interface is shown as the "backhaul", although these terms are merely for purposes of illustration and not necessarily indicative of any particular architecture. The CPEe 413 (premises-side gateway, modem, router, etc.) is in data communication with the CUe 404 via DUe 409*b* located in the fronthaul/backhaul of the HFC cable drop to the served premises. In some variants, the DUe's 409*a* and 409*b* are physically and/or logically collocated within the same device.

In prior art networks, a mobile device transmitting and receiving data to e.g., an Internet website via one wireless air interface protocol (e.g., WLAN) would have to disconnect from its AP when leaving the service range of that AP, and establish a new connection using another wireless air interface protocol (e.g., 4/4.5G cell service) and then instantiate a new session with the web server associated with the website. Such suspension of service and necessity to establish a new higher-layer session with the target server or resource, albeit temporary, results in an interruption of exchange of content initially performed with the first wireless protocol. It may further require new authentication protocols be executed, login credentials/passwords, etc.

However, in one aspect of the present disclosure, the mobile client device 407 is able to move from one location serviced by one access point (e.g., CPEe 413) to another location outside of the service range of that access point, yet maintain the higher-layer extant data session, by virtue of the common MSO core and infrastructure utilizing 4G/4.5G/5G-capable nodes. Specifically, the bearer PHY is migrated from extant connection to another extant connection (the latter which may be established for instance in response to data indicative that the migration is to occur), thereby maintaining apparent PHY continuity from the standpoint of the higher layer session. In the exemplary embodiment, existing 3GPP-based mobility protocols are utilized in this

TABLE 4

| Source Session Technology | Recipient Session Technology | Transfer Operations |
|---|---|---|
| 5G (e.g., NR-U) | 5G (e.g., NR) | 5G NR-U CPEe to/from 5G NR Outdoor DUe (s) |
|  | 5G (e.g., NR-U) | 5G CPEe to/from 5G Outdoor DUe (s) |
|  | 4/4.5G (e.g., LTE-U/LAA) | 4/4.5G CPEe from 5G Outdoor DUe (s) |
|  |  | 4/4.5G Outdoor DUe (s) from 5G CPEe |
|  | WLAN (IEEE Std. 802.11) | WLAN CPEe/router from 5G CPEe |
|  |  | WLAN CPEe/router from 5G Outdoor DUe (s) |
| 4/4.5G (e.g., LTE-U/LAA) | 5G (e.g., NR-U) | 5G CPEe from 4/4.5G Outdoor DUe (s) |
|  |  | 5G Outdoor DUe (s) from 4/4.5G CPEe |
|  | 4/4.5G (e.g., LTE-U/LAA) | 4/4.5G CPEe to/from 4/4.5G Outdoor DUe (s) |
|  | WLAN (IEEE Std. 802.11) | WLAN CPEe/router from 4/4.5G Outdoor DUe (s) |
|  |  | WLAN CPEe/router from 4/4.5G CPEe |
| WLAN (IEEE Std. 802.11) | 5G (e.g., NR-U) | 5G CPEe from WLAN CPEe/router |
|  |  | 5G Outdoor DUe (s) from WLAN CPEe/router |
|  | 4/4.5G (e.g., LTE-U/LAA) | 4/4.5G CPEe from WLAN CPEe/router |
|  |  | 4/4.5G Outdoor DUe (s) from WLAN CPEe/router |

Figure 9C:
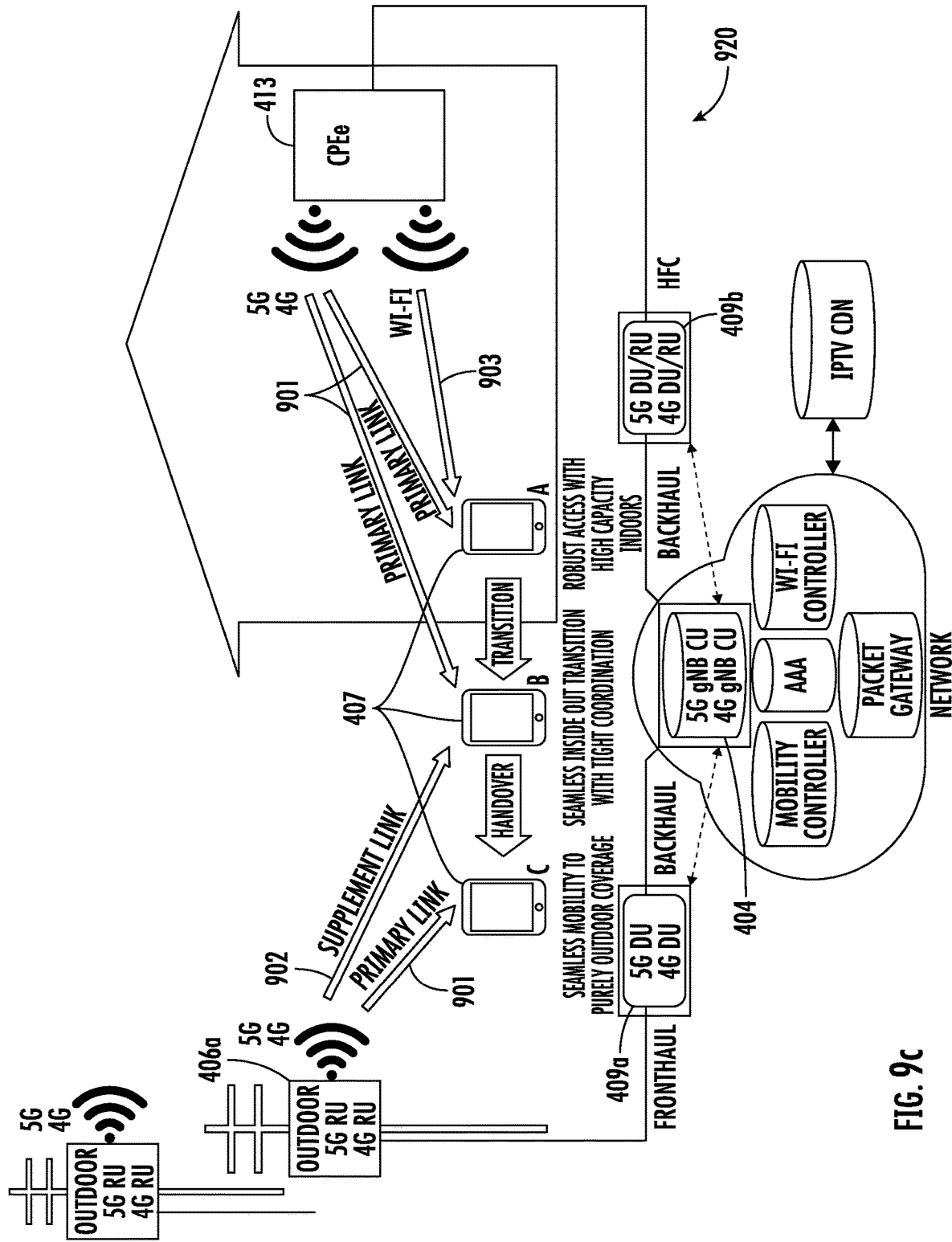
FIG. 9c is a block diagram illustrating an exemplary embodiment of a supplemental wireless link architecture supporting indoor/outdoor mobility transitions, according to the present disclosure.

FIG. 9*c* illustrates an exemplary embodiment of a network architecture 920 according to the present disclosure, including use of a supplemental link 902 in support of "seamless" mobility of a mobile user device (as contrasted with the supplementation of the CPEe 413 via the external antennae 416 as in FIG. 9*a*).

As shown in FIG. 9*c*, the external radio access node 406*a* (e.g., pole-mounted 5G-enabled RRH with associated E-UTRAN "small cell") is in data communication with CUe 404 via DUe 409*a* servicing the "edge" of the 5G network.

operation, triggered by either signal strength or signal quality as previously referenced herein.

Moreover, using the architecture of FIG. 9*c* (and FIG. 4), data may be delivered redundantly or separately via the radio access node 406*a* as well as the CPEe 413 via one or more DUe units 409*a* and/or 409*b*, depending on the location of the client device 407, thereby enabling the client device to have constant access to the requested data when in range of the serving node/device, as will be further described below. For instance, in one scenario, the supplemental link is used to maintain a separate data session simultaneously even without mobility; i.e., one session via PHY1 for Service A, and another simultaneous session via PHY2 for Service B (as opposed to handover of Service A from PHY1 to PHY2). In one implementation, extant 3GPP LTE-A multi-band carrier aggregation (CA) protocols are leveraged, wherein the supplemental link acts as a Secondary Cell or "SCell" to the Primary Cell or "PCell" presently serving the user from inside the home/building, or vice versa (e.g., the supplemental link can act as the PCell, and the SCell added thereafter via e.g., the premises node). See inter alia, 3GPP TR 36.808, *"Evolved Universal Terrestrial Radio Access (E-UTRA); Carrier Aggregation; Base Station (BS) radio transmission and reception,"* incorporated herein by reference in its entirety.

Advantageously, the use of common waveforms and protocols over HFC and wireless in exemplary embodiments of the architecture 400 (FIG. 4) allow the use of common network elements such as centralized authentication, authorization, and accounting (AAA) functions, packet gateway and mobility controller (MME) and a common base station for indoor and outdoor areas within a service area, provided the base station is split into a central unit (e.g., CUe 404) and distribution unit (e.g., DUe 409a, 409b) as described elsewhere herein. It is noted that such a split base station architecture can be ported back to 3GPP 4G/4.5G LTE/A as well as previously described.

As illustrated in FIG. 9c, the commonality of network elements advantageously enables seamless mobility experience between indoor and outdoor spaces of the served premises, in part because macro network-grade network elements with high signaling capacity and data throughput capacity control both spaces. Mobility between these spaces by devices such as phones and IoT modems trigger the least amount of signaling toward "northbound" network elements because, in many cases, mobility is constrained between distribution units (DUe 406) connected to a common Central Unit (CUe 404) as illustrated by the dashed lines in FIG. 9c, and generally in FIG. 4.

Moreover, as previously described, mobility via e.g., Multiband Alliance, or data throughput performance-triggered mobility, between 3GPP and Wi-Fi is provided using a centralized Wi-Fi controller connected to a 3GPP mobility controller which services both indoor and outdoor spaces and with Wi-Fi access points cooperating with the Wi-Fi controller 415.

In another variant, the mobility access nodes use one or more of the pole-mounted devices 406a as their backhaul alone. That is, the external radio access node 406a may function as the sole distribution unit(s) for a user device 407, useful for mobile devices that are "on the go" that rely solely on external radio access nodes and gNBs rather than premises equipment (e.g., when the user gets in their car, or walks down the street in their neighborhood). In one implementation, sufficient numbers of external nodes are deployed within a given geographic area to provide overlapping 4G/4.5G/5G coverage to the mobile devices 407 via the architecture 400.

In one variant, the mobility access nodes are ruggedized versions of the CPEe 413, having generally comparable capabilities. For instance, in one implementation, the external access nodes include both a backhaul (fiber or HFC) to the MSO network, as well as a supplemental link antenna such that the access node can communicate with the pole-mounted devices 406a for additional capacity as needed.

WLAN nodes may also be backhauled through the mobility access nodes, including with provision of QoS.

It will also be appreciated that the common MSO core and RAN architecture shown allows for the MSO to selectively supplement coverage using a pole-mounted or other configuration DUe. For example, where a new home or neighborhood is built, the MSO can simply add one or more such DUe devices at locations determined to provide the desired level of coverage; this is in contrast to MNO-based cellular coverage, wherein installation of a new base station (i) can't be directly controlled by the MSO or integrated with other MSO services, (ii) is much more labor and capital intensive.

Yet other combinations and modifications will be appreciated by those of ordinary skill given the present disclosure.

Example Operation

An exemplary illustration of the "seamless" mobility of a mobile user device between indoor and outdoor spaces of a served premises using common waveforms and protocols in a wireless network is now described.

As shown in FIG. 9c, a mobile client device 407 (e.g., smartphone, tablet, smartwatch, portable gaming console) receives data service from a CPEe device 413 located at a premises. The CPEe may provide wireless data service to the mobile client device via e.g., a Wi-Fi or WLAN technology (IEEE Std. 802.11). The CPEe may further additionally, or alternatively, provide wireless data service to the mobile client device via a 3GPP-based protocol; i.e., the CPEe or portions thereof (e.g., antennas) may be configured to operate as a "base station" with cellular radio(s) in the LTE-U or NR-U bands or yet other bands. In this example, such 3GPP-based data communication is herein referred to as "4G/4.5G/5G" communication via "4G/4.5G/5G" components. However, it is appreciated that other types of cellular or non-cellular technologies and associated interfaces and bands may be used, such as GSM, UMTS, CDMA, VoLTE, and XLTE.

In operation, the CPEe 413 receives data from one or more DUe devices 409b located in its backhaul portion of the network. In this exemplary scenario, the backhaul is serviced by extant HFC infrastructure. As noted with respect to FIGS. 8-9a, the premises may be equipped with one or more outdoor antennae 416 that is/are capable of creating a supplemental or complementary link 902 between one or more 4G/4.5G/5G RRH units or base stations (e.g., pole-mounted device linked to the gNB or DUe) that supplies additional data capacity for data delivery to/from the CPEe 413.

The mobile client device 407 is capable of receiving data through data links via either or both WLAN and 4G/4.5G/5G interfaces. The mobile client device and the CPEe 413 establish a data session by which to transmit and/or receive data, such as renderable content and consumable by a user of the mobile client device (e.g., video, audio, gaming content, text, photos). In some variants, one of the links is assigned by the CPEe or requested by the mobile client device to be a "primary" link 901. As used in the present context, the term "primary" refers to one or more attributes which differentiate the link from a secondary or supplemental link 902. For example, a primary link may be that which: (i) contributes more bandwidth than the other link (e.g., Wi-Fi link 903 or the supplemental link 902), (ii) which was established first (temporally); (iii) which is associated with a certain class of device or service (e.g., only CPEe might have primary links, and/or only certain levels of QoS are supported by primary links). In another implementation, the primary link (and the amount of bandwidth/services assigned to it) is determined based on the physical distance of the mobile client device 407 from the CPEe (which may also be correlated to signal strength or another link quality parameter). In one variant, the CPEe can determine the distance to client devices using monitoring techniques, such as sending "heartbeat" signals and measuring the roundtrip transmission (RTT) time, or issuing a "ping" or the like via a monitoring module of the CPEe to invoke a response from nearby devices, then measuring the return time, as described in, for example, co-owned U.S. patent application Ser. No. 15/183,159 entitled "APPARATUS AND METHODS FOR MONITORING AND DIAGNOSING A WIRELESS NETWORK" and filed Jun. 15, 2016, incorporated herein by reference in its entirety.

In other implementations, the primary link may be assigned based on one or more other factors (whether alone or in combination with the foregoing), such as user preferences, time of day, number of client devices being served by the CPEe, whether the client device has enabled 4G/4.5G/5G communication, etc.

While in some cases, both interfaces 901, 902 may be utilized in full capacity, in other cases, the utilization of each interface is respectively determined by a sliding scale or percentage. For example, when the mobile client device 407 is physically close to the CPEe 413, the CPEe 13 may enable 100% of the Wi-Fi bandwidth to be used (with low or 0% utilization of 4G/4.5G/5G). As the mobile device moves away from its AP (e.g., CPEe), the CPEe may shift to more capacity to the 4G/4.5G/5G usage, e.g., 60% 5G and 40% Wi-Fi when the mobile device is exiting the premises and the CPEe is at the opposite side of the house. Further, among other considerations, consumers may prefer that high-frequency electromagnetic emissions be limited in while they are in proximity to a high-powered radio. However, in situations where human operators are sparse or absent (e.g., communications among self-driving vehicles or automated warehouse drones), such considerations may not be necessary.

Similarly, in premises in which multiple client devices are present (e.g., home with multiple family members), the CPEe 413 may consider the position/attributes of each of the "clients" in making the determination of balancing the usage of WLAN and 4G/4.5G/5G signals within the premises.

As shown in FIG. 9c, several distinct common operational scenarios for the architecture 400 may exist and be supported; i.e., (i) supplement of the "primary" link 901 with additional capacity from the supplemental link 902 (i.e., maintain the existing session, yet add further bandwidth capacity via a second air interface), and (ii) handover or migration (i.e., where a given primary link 901 such as an RRC Connected state between the UE and CPEe 413 exists is migrated to another RRC Connected state with a different device, such as a pole-mounted device 406a). However, it will also be recognized that these two scenarios can overlap in some cases, such as where the mobile device 407 is using both a primary and supplemental links 901, 902 simultaneously (e.g., when in range of each), and then moves out of range of one. In this case, the designated "primary" link (e.g., with the CPEe 413) may be ultimately torn down in favor of the new "primary" link (e.g., with the outdoor RRH 406a), the supplemental link then assuming the role of primary link.

In one variant, the disconnection of the WLAN link 903 between the mobile device 407 and the CPEe occurs after the detection of the mobile device by the external node 406a, such as via 3GPP protocols invoked for scanning and detection of UE within the "cell" of the external node 406a. In another variant, the disconnection of the Wi-Fi link occurs after establishing the supplemental link 902 with the mobile client device and the external node 406a (e.g., achieving an RRC Connected state). Evaluation of when to disconnect from the WLAN link during the inside-outside transition may depend on one or more factors, such as distance of the mobile client device from the CPEe 413 and/or corresponding signal strength of the WLAN signal from the CPEe, coverage area of nearby external radio access nodes 406a (i.e., node 406a may already be capable of reaching the mobile client device while it is within the premises), location settings (e.g., enabling outdoor node access based on GPS/A-GPS (hereinafter "GPS") location, e.g., only when not at a particular address, or only when at particular chosen locations).

In one scenario, by virtue of utilizing the common waveforms/protocols being used to deliver data, the mobile client device 407 is able to receive the same data via both the primary link 901 (e.g., that originally established within the premises) and the supplemental link 902. Advantageously, the mobile client device 702 need not disconnect from the original 4G/4.5G/5G session with CPEe while simultaneously being in another 4G/4.5G/5G data session with the pole-mounted external radio access node 406a and receiving the services through the external node 406a when such common protocols (e.g., 3GPP 5G NR-U) are used for both links. In one approach, the 3GPP 5G NR standard's support of the transmission of multiple independent parallel data streams as part of a multiple-input multiple-output (MIMO) channel for the same RF bandwidth is leveraged for this purpose. This allows leverage of spatial diversity that wireless channels afford when multiple antenna elements are used. Additionally, earlier generations of 3GPP chipsets (e.g., 3G, 4/4.5G) may support such parallel MIMO data streams. Hence, the contents of the present disclosure may become relatively less costly and less time consuming when implemented in the extant infrastructure.

Returning to the exemplary embodiment of FIG. 9c, data may be requested by the mobile client device 407 from the core of the network (MSO) via the CUe 404, and is delivered via one or more DUe(s) 409a and/or 409b. The CUe and one or more DUe(s) are logically defined as a gNB (denoted by dashed arrows), and the CUe and DUe(s) may communicate over backhaul cables or wirelessly (given sufficient proximity). Nonetheless, DUe nodes allow distribution of data close to the edge of the network; i.e., near the premises. As will be further described below, DUe's may be equipped with large data storage capabilities in order to allow edge caching and general storage, as well as one or more processor apparatus capable of controlling the flow of high-speed traffic to multiple nodes that are at the edge of the network (e.g., external radio access nodes 406a, 406n).

In one embodiment, data transmitted for delivery to a recipient process (e.g., an application running on a UE 407) is split into two (or more) portions or streams delivered separately via the different DUe 409a, 409b from a data source (e.g., CUe 404, which may be sourced from e.g., a server located in the backend). Respective portions or streams are delivered to the target UE 407 through the supplemental link 902 via the external radio access node 406a, and through the primary link 901 via the CPEe 413. Such "split" data may be used to reduce network resource requirements such as bandwidth and processing power required for individual component of the network (e.g., core, CUe 404, DUe's 609, nodes 406a, CPEe 413); i.e., the split is invoked to reduce loading on an overloaded or limited component, or enable meeting stringent latency requirements. Alternatively, the split may be invoked to support different 5G NR slices, such as different applications/sub-applications or processes with different QoS requirements.

Yet other reasons for splitting (e.g., different security regimes, association with different content providers, etc.) will be appreciated by those of ordinary skill given the present disclosure.

In yet another embodiment, the data delivered via the different links is at least partly redundant or duplicated. Redundant data may ensure complete integrity of the data and files, and permit reconstitution in cases where dropouts or other loss mechanism exist and no retransmission (at least in a sufficiently timely fashion) is possible.

In another embodiment, the data arriving via the supplemental link may be received from some other external radio access node 406n in data communication with the external radio access node 406a (and/or another DUe). In some cases, the other node 406n may have received the data from yet another node or another mobile client device acting as an intermediary node. As can be appreciated, in an exemplary fog-based network environment, data need not reach all the way back to a server or other source located in the backend of a managed network. In fact, ultra-low latency and ultra-fast data rates may be enabled in part because of participation of 5G-enabled devices that participate in the fog network of peer-to-peer connections. Notably, peer-to-peer connections as implemented in this network comprise direct connections between the mobile client devices, obviating the need for a relatively slower connection through a centralized server entity such as that used in prior cloud-based implementations.

Conversely, the mobile client device may "seamlessly" enter the premises, i.e., from position C to position A in FIG. 9c, by virtue of establishing connections with 4G/4.5G/5G links 902, 901. More specifically, as the mobile client device 407 moves more proximate to the premises (e.g., position B), the external radio access node 406a may establish a supplemental link 902 with the mobile client device (e.g., UE), in addition to the extant primary link 901 between the RU 406a and the UE 407. In one embodiment, the supplemental link 902 is effectively another link similar to the primary link, with the same bandwidth, latency, range, etc. In another embodiment, the supplemental link 902 may have a lower bandwidth, lower data rate, greater range (lower frequency), etc. The system may also be configured to transfer or handover without use of a supplemental link; i.e., by establishing the primary link between the UE and the target access point (e.g., CPEe 413) and then tearing down the initial primary link with the radio node 406a. Optionally, the CPEe 413 may establish a WLAN link 903 in conjunction with the 4G/4.5G/5G connection, or by itself (i.e., disconnect the other link).

Figure 9D:
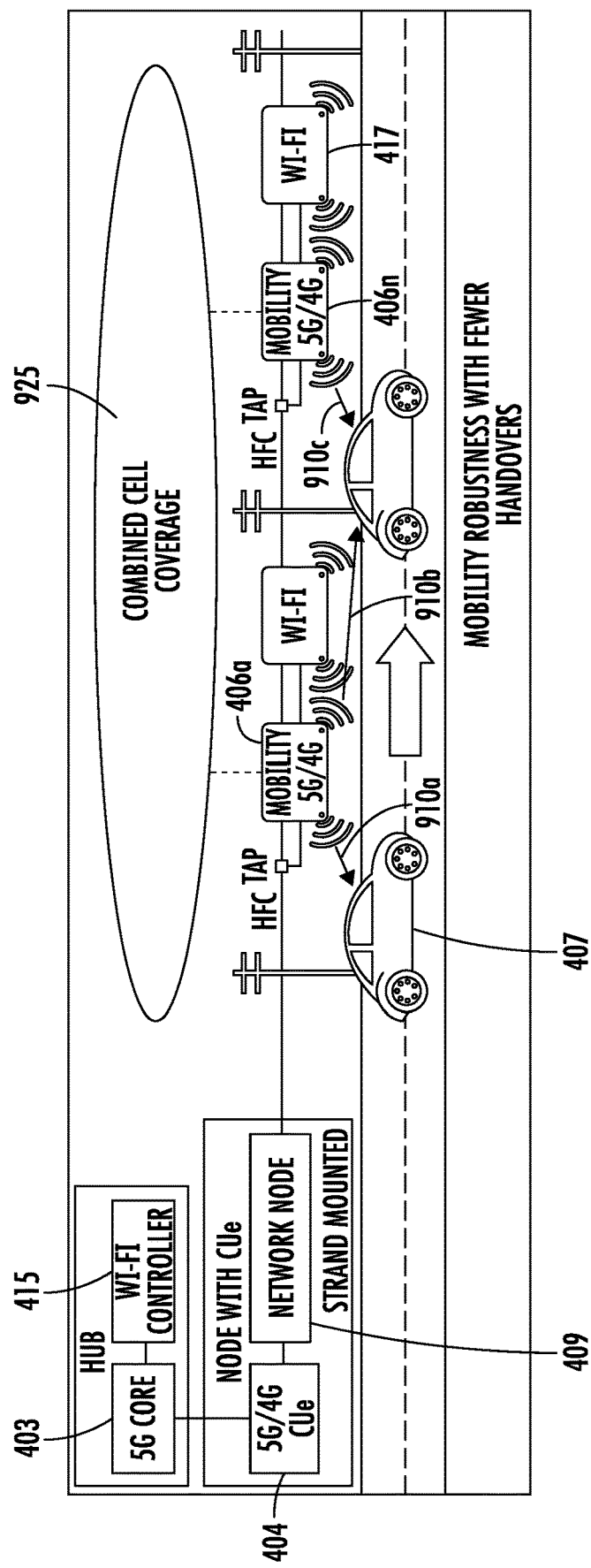
FIG. 9d is a block diagram illustrating an exemplary embodiment of a wireless link architecture supporting outdoor mobility via combined cell coverage, according to the present disclosure.

FIG. 9d illustrates a network architecture implementing the foregoing description of seamless mobility and connection maintenance of a client device moving from one location to another, in this case a vehicle on a road.

Specifically, a 5G-enabled network, supported by a 5G core 403 and one or more gNodeBs (gNBs) is shown. The gNB logically (but not necessarily physically) includes an enhanced controller unit (CUe) 404 and two or more enhanced distribution units (DUe) 409, which relay data and content to 4G/4.5G/5G-enabled external radio access nodes 406a, 406n as described above. As noted, the DUe and external access node functions may also be combined or integrated to varying degrees as well (e.g., each external node 406a may itself be a DUe). A mobile client device (e.g., vehicle with telematics system equipped with one or more 5G radios and antennas) 407 may connect to a first external radio access node 406a via a 4G/4.5G/5G link 910. This wireless link allows the vehicle to, among other functions, receive data, e.g., satellite data for navigation, digital data for rendering or consumption by the vehicle (e.g., images of maps, streaming content for audio or video display, content to distribute to other mobile devices within the vehicle via hotspot functionalities), and Voice over IP (VoIP) data for audio communication with another car.

In the illustrated embodiment, the plurality of external nodes 406a comprise nodes serviced by a common HFC network portion; e.g., which are each associated with different "taps" off the HFC medium (see FIG. 4). Advantageously, such approach can make use of a single bearer medium (e.g., coaxial cable) that exists in proximity to the street on which the vehicle drives. Notably, many existing coaxial cable installations in fact parallel existing streets for at least some distance (whether in "overhead" installations such as being strung along telephone or other utility poles, or in underground cable chases or conduits). This is often an artifact of the neighborhoods they serve, in that houses or apartments are often similarly aligned along the same street. As such, these cables can be readily tapped off as shown to enable installation of external radio nodes 406a at desired spacing or locations. As previously noted, the external nodes themselves can take on many forms, such as pole-mounted, co-existent with other infrastructure, etc. While the nodes 406a must have antennae above ground for signal propagation purposes, the node RRH front ends and associated backhaul can be literally anywhere, including underground, or even with premises along the street (e.g., such as where the MSO or other service provider utilizes an easement on the property to locate a terrestrial box near the street, akin to existing step-down transformers for electrical power distribution to residential customers).

Alternatively, in another embodiment, the external radio access nodes 406a may comprise another 5G-enabled vehicle that acts as an intermediate access node between the client-enabled vehicle 407 and CUe 404, DUe 409, or yet another mobile client device (e.g., another vehicle), such as in a peer-to-peer architecture of the type previously described. As the number of vehicles increases on the road, the "fog" of network nodes participating becomes denser; e.g., congested traffic may be utilized for delivering content at ultra-low latency and ultra-high speeds among participating 5G-enabled vehicles.

As the vehicle 407 moves along a path (e.g., street), another external radio access node 406n detects the vehicle, whether via communication from the CUE/DUe, or directly (e.g., via scanning in the applicable bands for emissions by the vehicle/UE 407). Once the vehicle is detected, the other external radio access node 406n may establish another 4G/4.5G/5G link with the vehicle (e.g., simultaneously with the extant "primary" link with the previous node). Notably, extant 3GPP protocols (whether 4G/4.5G or 5G) account for mobility including within a moving platform, and hence are well suited for applications where different cells (i.e., in a cellular context) are encountered. However, typical 3GPP-based mobility involves cell selection and reselection procedures, including cell addition or deletion, which require significant amounts of signaling between various entities. In contrast, the exemplary embodiment described with respect to FIG. 9d herein utilizes signal level (strength) and/or quality based mobility between the outdoor mounted CPEs (generally using the same principles of mobility as defined in 3GPP discussed previously), yet unlike typical 3GPP based mobility, all outdoor cells can virtually comprise or act as a single cell, and without different cell IDs. This salient advantage is due to such devices each being connected to or communicative with the same baseband at the DU—thereby eliminating the vulnerability on signaling robustness, and simplifying the aforementioned extant procedures of cell selection/reselection/addition/deletion (since in effect there is only one aggregated or virtual large cell). The unified control plane for the various different devices enables the cognizant controller (e.g., CUe or 5GC core entity, depending on configuration) to manage handovers between the RAN coverage area of each of the individual devices seamlessly, and obviates the overhead associated with signaling for cell selection, etc. as noted.

In scenarios in which the vehicle is moving at highway speeds (e.g., 50-80 miles per hour), maintaining the wireless link between the vehicle and the node 406a becomes instrumental to minimizing interruptions in data delivery; if the "handovers" are not fast enough, dropouts/session loss and resulting poor user experience may occur. Once the new link 910c is established, however, the initial link 910a or 910b may be disconnected. Given the common 4G/4.5G/5G protocol used by the vehicle 407 and the nodes 406a and 406n, the vehicle may continue to receive data via the same gNB (just different external node) until the edge of the common coverage area 925 served by that gNB is reached.

It will also be appreciated that while depicted in FIG. 9d as multiple links 910a, 910b, a given external node 406a may or may not utilize multiple links in servicing the vehicle 407 while the latter is within range of the node. For instance, in one variant (and shown), the node 406a includes spatial diversity capability and beamforming, such that the vehicle 407 can maintain a connected state with the external node 406a via different MIMO or other chains of the external node (when so equipped) as shown.

In another variant, as noted above, the other external radio access node 406n may be another vehicle (e.g., registered or subscriber to services provided by the 5G core 403). In one implementation, if multiple vehicles are traveling at similar speeds for at least a period of time, the node itself would be mobile. Hence, in such scenarios, a handover between nodes 406a and 406n as discussed above may not be necessary. A vehicle 407 connected via 4G/4.5G/5G link with another vehicle may evaluate the necessity of maintaining or disconnecting from the other vehicle based on e.g., signal strength or channel quality of the link with the other vehicle (or a change or a rate of change thereof), proximity to the other vehicle (and a risk of disconnection calculated based thereon; e.g., the farther the other vehicle, the more likely it is that a disconnection will occur, and the vehicle should look for a better connection with another node), proximity to other vehicles (e.g., a third vehicle) participating in the 5G network, proximity to or availability of another non-vehicle node 406n, etc.

Moreover, a given CUe 404, via a plurality of DUe units along a road or an area, may possess data about which area has the most vehicles at any given point in time, and thus the most/least number of available connections for a vehicle in proximity to or connected to one of the external nodes to utilize. The CUe may transmit this data to a vehicle 407 via the extant connected link with a first radio node 406a to identify one or more optimal nodes or vehicles to establish links with, and/or may provide this data to the radio nodes 406a-n so as to e.g., cause selected ones of the informed nodes to instigate connection with the vehicle at some time in the future.

As shown in FIG. 9d, the "combined" cell coverage of the aggregated radio nodes 406a-n associated with a given portion of the MSO network is comparatively large due to the unified common architecture of the system as discussed above; no MSO-to-MNO (or vice versa) handovers are required while the vehicle remains in the combined cell coverage area served by the MSO, whether under WLAN APs or the 4G/4.5G/5G external access nodes (which in one embodiment, may include the pole-mounted devices 406a shown in FIG. 4, and/or other devices such as those co-located at cellular base station sites). Specifically, by virtue of the common operator (e.g., MSO) and infrastructure, multiple mobility access nodes can be combined to form a single cell for both higher throughput (e.g., at the cell edge) and greater coverage, thereby further reducing or even obviating intra-entity handovers.

Methods—

The following discussion describes methods for enabling seamless mobility of a wireless-enabled (via, e.g., Std. 802.11 and 3PGG protocols) client device in a wireless data network, including network "path" or route determination, according to the present disclosure.

Figure 10:
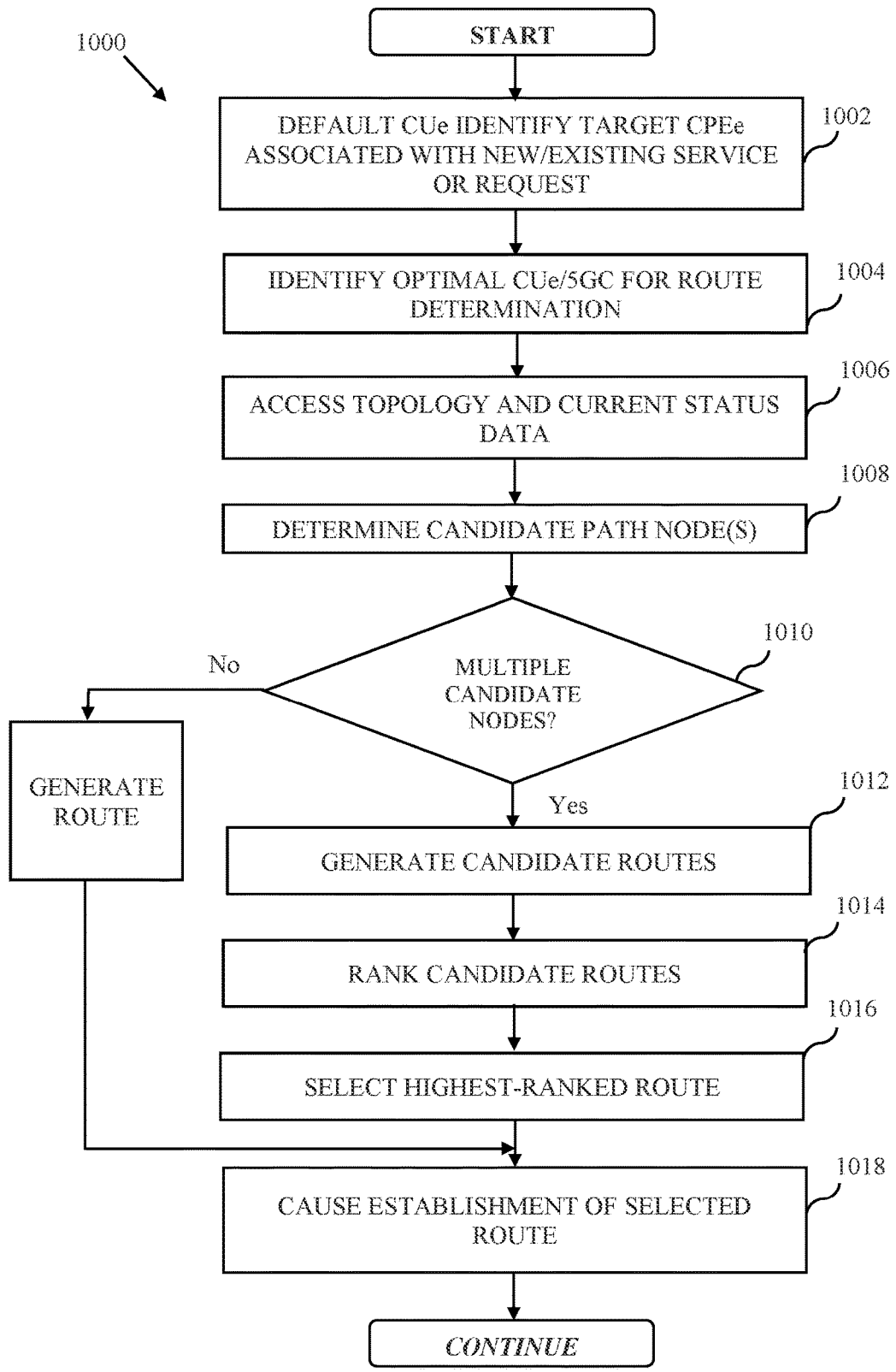
FIG. 10 is a logical flow diagram illustrating one embodiment of a method of path or route selection within e.g., the architecture 400 of FIG. 4, according to the present disclosure.

Referring now to FIG. 10, one embodiment of a method 1000 of path or route selection within e.g., the architecture 400 of FIG. 4 is described in detail. As shown, the method includes first identifying the target CPEe 413 or other entity tow which the data services will be provided per step 1002. In one variant, this step is performed by logic of a default CUe 404; for instance, one that is designated to implement the method 1000 within the network from among others, or one which meets other prescribed criteria.

The identification of the target device or CPEe can be accomplished via, for example, MAC, IP address, wireless ID (e.g., a 3GPP-based on WLAN-based ID), or other data uniquely identifying the CPEe or its place in the network.

Next, per step 1004, the optimal CUe and/or 5GC entity is identified for route determination. In one variant of the architecture 400 of FIG. 4, multiple CUe are present within the network, and each may have data relevant to its DUe and/or external nodes 406a (as well as client premises devices such as CPEe and even UE) which is not possessed by other CUEe or the 5GC, such as local node placement, service group membership, placement of particular taps, etc. Likewise, the 5GC may have relevant data not possessed by every (or any) CUe. As such, one implementation of the logic of step 1004 includes an algorithm for evaluating CUe for most relevance to the target CPEe (e.g., that which is cognizant over all or most DUe/nodes 406a that might serve the target CPEe), such as via topological relationships within the network. As used in this context, the term "optimal" is used generally and is relative; for example, selecting an optimal CUe may include selecting the least non-optimized one of a plurality of CUe.

Next, per step 1006, the topology and other available data relevant to the route determination is accessed by the designated (optimal) CUe/5GC processing entity. This data may be retained as noted above by particular CUe 404, and/or the 5GC, such as in a database.

Per step 1008, the accessed data is used to determine one or more candidate path nodes, such as between one or more serving CUe and the target device (e.g., CPEe). It will be appreciated that the one or more serving CUe may or may not include the selected CUE and/or core for route determination. For instance, in one such case, the determining CUe is new with most relevant data for route determination, yet it is not within the data delivery path, such as where the latter is exclusively towards the edge of the network or via "fog" nodes, while the determining CUe is further inward towards the core.

As can be appreciated, as the complexity of the network topology of the bearer network (e.g., managed HFC network) increases, and the number of users or served premises increases, the number of possible routes over which data can be transmitted increases dramatically. This is especially true as the number of nodes (e.g., N-way taps and DU/DUe nodes 406a) increases within the network; options for data pathways between the CUe 404 and the CPEe 413 also increase exponentially, since different portions of different segments of the network can be combined in different ways to still arrive at the same "destination" node or target user device (e.g., CPEe 413).

Accordingly, in one embodiment of the present disclosure, the route-determining CUe 404 may take into account several network considerations to dynamically determine the best or optimal data throughput from source (e.g., server) to destination (e.g., CPEe, gateway, user device). In some variants, a then-optimal path or route may be determined based by balancing (i) computational load and/or traffic load present on each node (which may be ascertained by e.g., data fed back to the decision-making entity such as the CUe 404 or the 5GC 403 from each node, such as via reporting protocols), (ii) software or hardware capabilities at each node (e.g., inbound/downlink and outbound/uplink bandwidth availabilities, number of simultaneous connections it can sustain, being 5G-enabled), (iii) any authentication levels required for protected or encrypted data, and/or (iv) level of privacy and level of access allowed by each node (especially in the case of mobile devices that has opted-in as a 5G-enabled node), and/or (v) any authorization requirements with the core at each node (e.g., with an MSO or MNO AAA entity), among other factors that will become apparent to those having ordinary skill in the art given the present disclosure.

Per step 1010, where multiple possible candidate nodes exist (and hence multiple possible routes exist), the determining CUe generates the multiple routes (step 1012). The CUe 404 may also rank or prioritize routes (i.e., combinations of different path segments, and any intervening relay devices such as opportunistic client devices 407) per step 1014. This ranking may be performed as a function of time or other parameters, such as by designating lower-priority paths as fallbacks in case of failure or contingencies occurring along the way (e.g., mobile node shuts down or moves out of range); this approach advantageously obviates having to obtain source data and perform the determination(s) upon occurrence of such failures/contingencies. Specifically, in one implementation, the CUe 404 or core 403 entity determines a prioritized list of routes (e.g., specified by the network addresses or other identifying data of each node within the route in a sequence) which remain active for a prescribed period of time ("fresh"); invocation of a contingency such as a node leaving the available service area causes the CUe 404 or core entity to search all remaining fresh routes to identify those which do not utilize the unavailable node for the next highest priority route. If no such routes are available in the fresh list, a new list is generated by the CUe/5GC entity and implemented.

In one implementation, the node identification/naming convention used for route identification/specification is based on extant 3GPP convention (e.g., that for gNB, whether with or without DU/CU "split" of the type described previously herein). This approach has the advantage of maintaining consistency of convention across the entire 3GPP architecture (including both MSO portions and non-MSO portions), thereby avoiding any inconsistencies at network boundaries, and obviating any address/naming translations. See, for example, 3GPP TS 32.300 V15.0.0 (2018-06), "Technical Specification—3rd Generation Partnership Project; Technical Specification Group Services and System Aspects; Telecommunication management; Configuration Management (CM); Name convention for managed objects (Release 15)." Incorporated herein by reference in its entirety. That being said, the MSO may maintain correlation or translation data (e.g., translation or association tables maintained within a database or network management software environment) which correlate the route naming/address data to MSO-specific data, such that internal MSO processes such as AAA, billing, etc. can operate in parallel with route identification for purposes of wireless session management. For instance, billing operations or actions may be invoked depending on the route selected (or portions thereof), and the MSO may not utilize 3GPP nomenclature or addressing internally for management of such billing.

In one embodiment, the possible routes are prioritized based on the timing advance (TA) and return loss (RL) measured between a given DU and CPE (e.g., CPEe). Specifically, in one scenario, routes are prioritized/selected based on evaluation of RL magnitude and TA stability or predictability, and graded accordingly. For instance, in one implementation, the best or most optimal route is that with (i) the smallest value of RL, and (ii) a TA that meets a prescribed minimum level of stability over a period of time. It will be appreciated, however, that other approaches may be used consistent with the present disclosure, including for instance those based network infrastructure location/attributes (e.g., position within the topology of the infrastructure), ability to exert control over the route (e.g., one that will not be withdrawn or reallocated during operation), or any number of other factors that will be recognized by those of ordinary skill in the art given the present disclosure.

In another implementation, the CUe may share the burden of determining these optimal paths with at least one other CUe or other controllers. For example, two or more entities (CUe and CUe, CUe and 5GC, etc.) may allocate portions of the path determination, including to those entities closer within the network topology to the actual path nodes, since the closer entities will ostensibly have better data on the status/availability of each node, and this also reduces the amount of "travel" that such data must incur to be forwarded to the proper determining entity. Hence, in one variant, as a part of each path determination process, the processing entity or entities is/are first selected based on initial knowledge of the requesting CPEe and/or data source (or vice versa). To the extent that a CUe is part of a path node, it may also be preferentially selected, and in effect calculate paths including those with the CUe therein.

It will further be appreciated that the CUe and/or 5GC entity or entities performing the path determination may utilize actual or projected density data as an input to the determination process. For instance, consider the case where the required path includes a CPEe 413 that is disposed within a user premises within a condominium complex in a suburban area near a major metropolitan area. Knowing (e.g., via access to density data such as that maintained by the MSO in a centralized database within the MSO core) that the MSO has a prescribed number of operative 5G-enabled CPEe, opted-in/non-opted out UE, and/or pole-mounted nodes 406a in that particular complex/suburban area, it can immediately calibrate the level of its pathway node selection criteria. Stated simply, it can afford to be more discriminating in its node selection process, such as where some less-than-optimal candidate nodes which would otherwise perhaps be included in the pathway in a rural area pathway determination (i.e., having very low population density), thereby further prospectively optimizing user experience due to, inter alia, reduced latency or other desirable attribute.

Moreover, even where the MSO does not maintain affirmative data on the presence/absence or certain devices (e.g., particular UE associated with its customers), the knowledge of the density of the installed MSO equipment base of CPEe and pole or similar nodes 406a can be used to infer UE density, since users using the CPEe for example will also on average also have personal mobile devices such as smartphones, tablets, etc. which can also be leveraged as described elsewhere herein.

Per step 1016, the highest-ranked route is selected for use, and that route established per step 1018 (e.g., via signaling to the involved nodes such as one or more DUe and external nodes 406a, or other UE such as third-party opted in UE or vehicles) to establish connection with the target device (e.g., CPEe or UE 407). In one variant, such signaling is performed via extant 3GPP protocols.

In instances where there is only one candidate node (e.g., short routes near an extant external node or DUe), the route is generated per step 1011 and the route established directly per step 1018.

Figure 11:
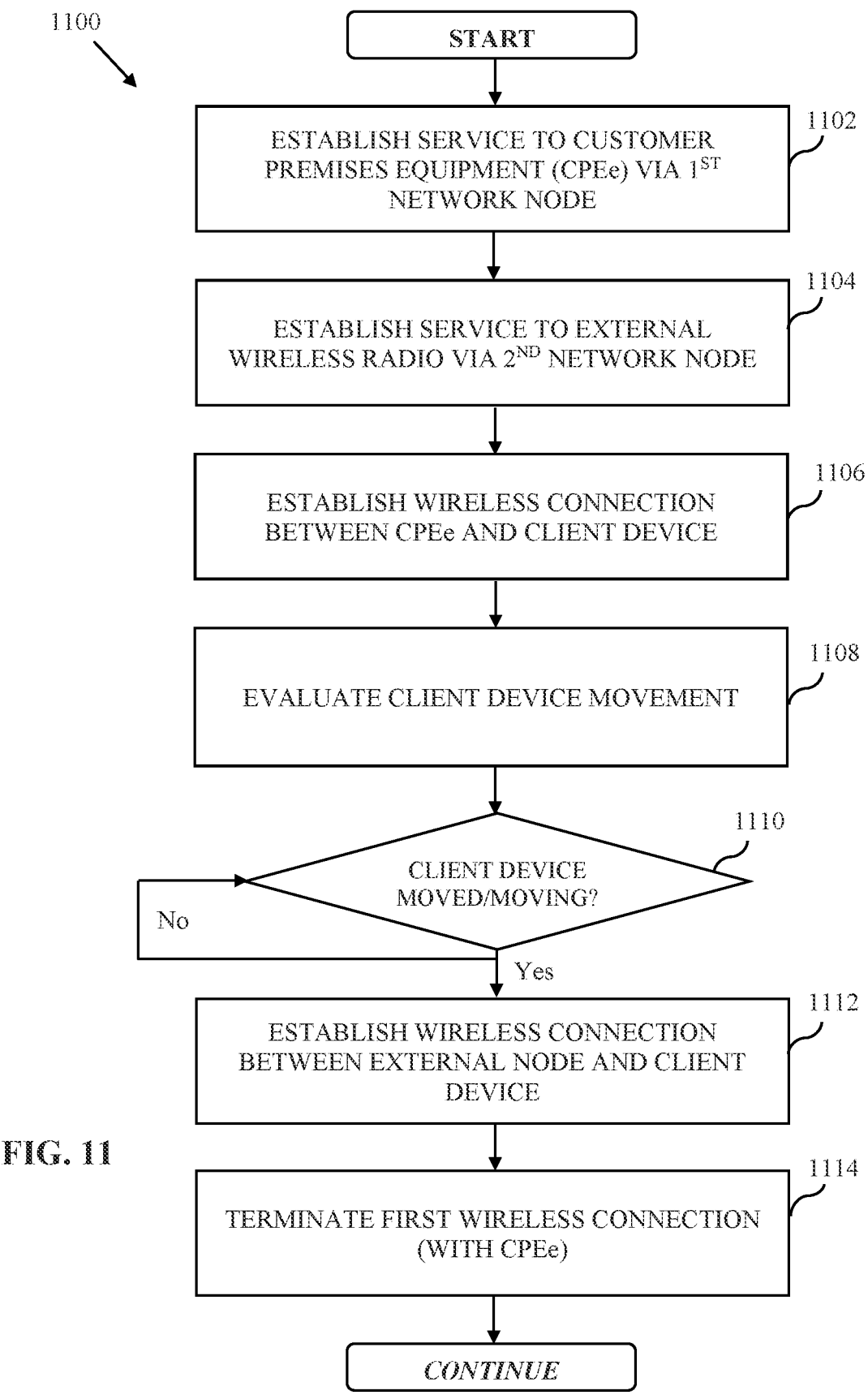
FIG. 11 is a logical flow diagram illustrating one embodiment of a generalized method of operating the architecture 400 of FIG. 4 in the context of e.g., FIGS. 9a-9c.

FIG. 11 illustrates one embodiment of a generalized method of operating the architecture 400 of FIG. 4 in the context of e.g., FIGS. 9a-9c. As shown, the method 1100 includes first establishing service to a "terminal" node (e.g., CPEe 413), such as via one or more other nodes (e.g., HFC tap and associated serving CUe/DUe) per step 1102.

Next, service is established to an external node (e.g., pole node 406), which may be serviced by the same or one or more other nodes (e.g., another serving CUe/DUe) as shown in FIG. 4, per step 1104.

Next, per step 1106, a wireless connection is established between the CPEe 413 and the client (e.g., UE) 407, such as via 3GPP protocols to achieve an RRC Connected state.

At step 1108, the client device movement/position is evaluated, which may be accomplished using any number of different techniques as described in detail subsequently herein. If per step 1110 the client device is determined to have moved or be moving, then a wireless connection is established with one or more external nodes (e.g., pole-mounted nodes 406a) per step 1112.

Alternatively, if no movement has been/is being detected, then the method 1100 returns to step 1108 for a subsequent determination of movement (e.g., after expiration of a prescribed period of time and/or one or more other criteria are met).

Figure 12:
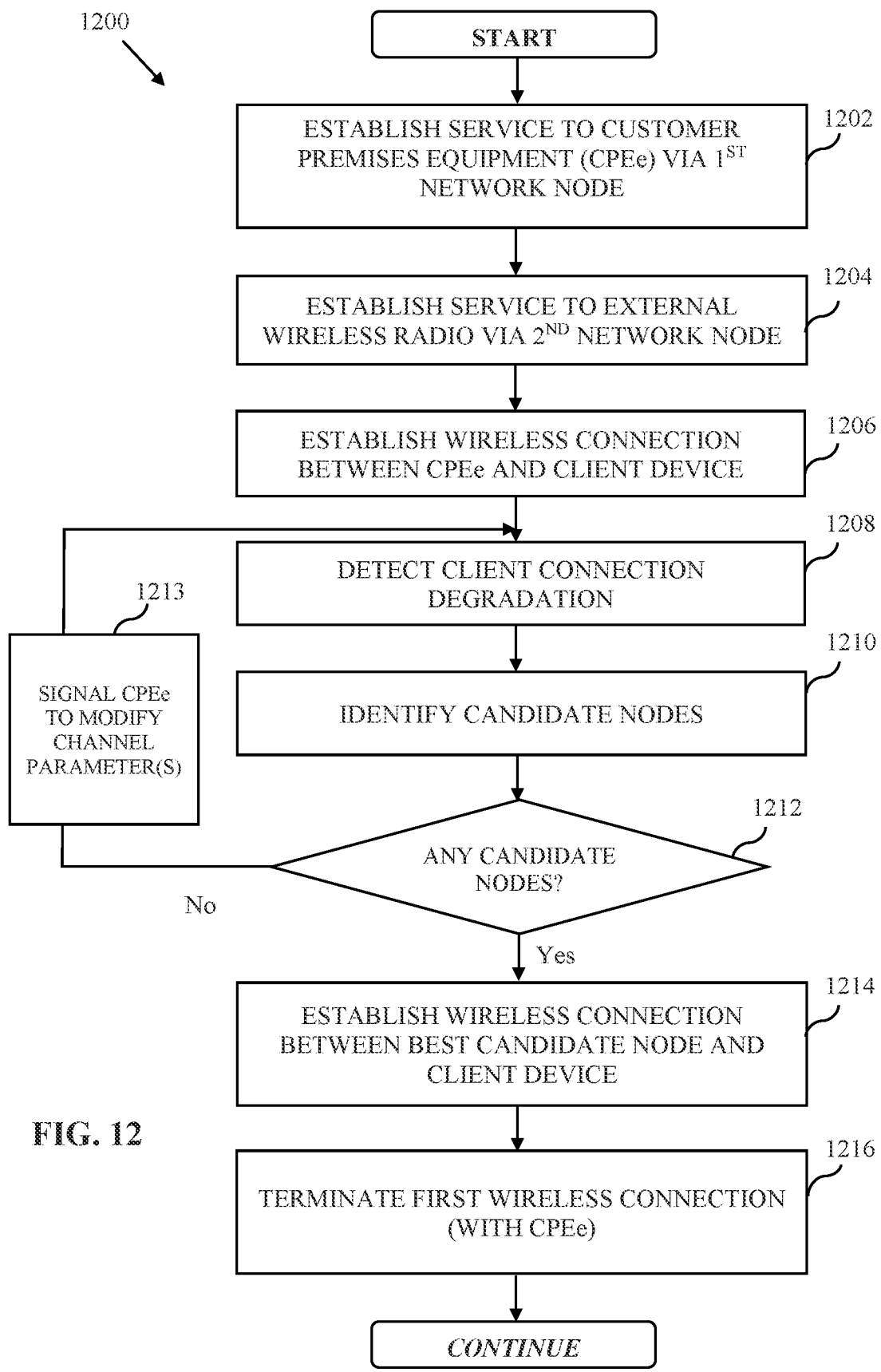
FIG. 12 is a logical flow diagram illustrating another embodiment of a method of operating the architecture 400 of FIG. 4 in the context of e.g., FIGS. 9a-9c.

FIG. 12 illustrates another embodiment of a method of operating the architecture 400 of FIG. 4 in the context of e.g., FIGS. 9a-9c. As shown, the method 1200 includes first establishing service to a "terminal" node (e.g., CPEe 413), such as via one or more other nodes (e.g., HFC tap and associated serving CUe/DUe) per step 1202.

Next, service is established to an external node (e.g., pole node 406), which may be serviced by the same or one or more other nodes (e.g., another serving CUe/DUe) as shown in FIG. 4, per step 1204.

Next, per step 1206, a wireless connection is established between the CPEe 413 and the client (e.g., UE) 407, such as via 3GPP protocols to achieve an RRC Connected state.

At step 1208, the client device connection is evaluated, which may be accomplished using any number of different techniques as described in detail subsequently herein (e.g., RSSI or other signal measurements by the UE and/or CPEe, BER, PER, data throughput, etc.). When the channel/connection is sufficiently degraded (as determined by e.g., one or more parameters exceeding or falling below a desired value), the method 1200 then identifies one or more handover or supplementation candidate nodes per step 1210. In one variant, this identification is based on known topological and/or spatial proximity to the target device (e.g., CPEe 413), since the locations of these external and other nodes are fixed in advance. Alternatively (or in concert), variable-position or moving nodes such as vehicles, other UE devices, etc. may also be included for candidacy, such as for example in cases where the inventory of fixed nodes of sufficient proximity is limited or non-existent, or use of such moving devices would provide some other benefit (e.g., support of a particular 5G NR slice).

If per step 1212 one or more candidate nodes is/are identified, then a wireless connection is established between the client device and the best candidate e.g., one or more external nodes (e.g., pole-mounted nodes 406a) per step 1214, and the existing (degraded) channel terminated per step 1216.

Alternatively, if no candidate nodes are available, the CUe signals the CPEe per step 1213 to modify one or more of its operational channel parameters such as MCS (modulation coding scheme, spatial diversity, transmit power, selected frequencies, etc. in an attempt to restore the extant connection to full (or at least higher) capacity.

Figure 13:
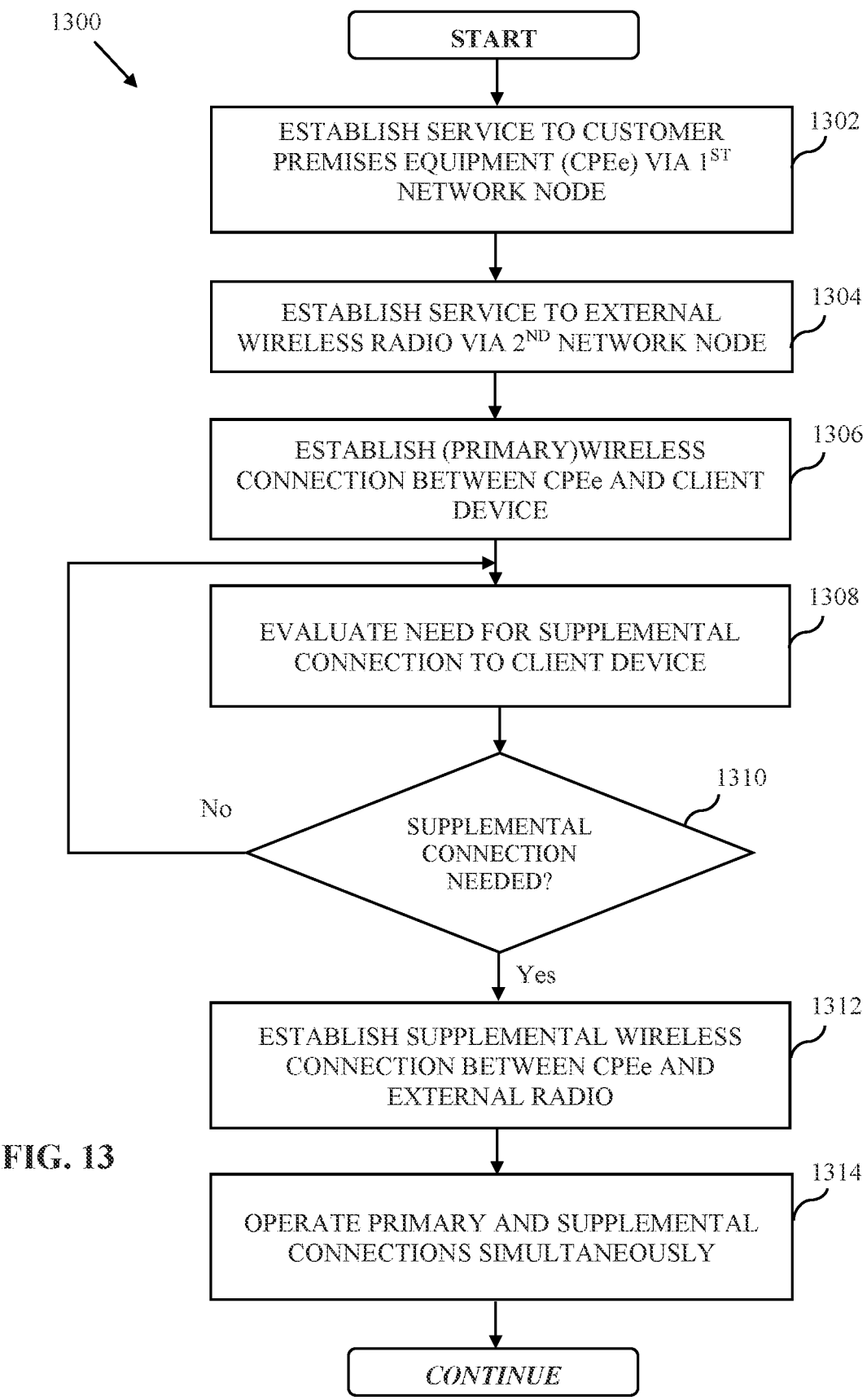
FIG. 13 is a logical flow diagram illustrating yet another embodiment of a method of operating the architecture 400 of FIG. 4 in the context of e.g., FIGS. 9a-9c.

FIG. 13 illustrates yet another embodiment of a method of operating the architecture 400 of FIG. 4 in the context of e.g., FIGS. 9a-9c. As shown, the method 1300 includes first establishing service to a "terminal" node (e.g., CPEe 413), such as via one or more other nodes (e.g., HFC tap and associated serving CUe/DUe) per step 1302.

Next, service is established to an external node (e.g., pole node 406), which may be serviced by the same or one or more other nodes (e.g., another serving CUe/DUe) as shown in FIG. 4, per step 1304.

Next, per step 1306, a primary wireless connection is established between the CPEe 413 and the client (e.g., UE) 407, such as via 3GPP protocols to achieve an RRC Connected state.

At step 1308, the need for a supplemental connection is evaluated, which may include evaluation of the primary client device connection, as discussed above with respect to FIG. 12. For instance, when the application used by the user of the UE 407 (coupled to the CPEe 413 via the user frequency band-based wireless link) requires higher bandwidth than the primary link can provide, or requires more stringent QoS or latency performance, etc., the supplemental link may be needed to meet such requirements. Similarly, the CPEe itself may require the supplemental link, due to e.g., servicing multiple UE 407 which in the aggregate exceed the capability of the primary link. As will be appreciated, the present disclosure contemplates such evaluation being performed by e.g., the CUE 404, the CPEe 413, or combinations of the foregoing. Other entities may also be utilized to evaluate the need for the supplemental link, including the serving DUe 409, and even entities within the 5GC.

When the need for the supplemental link is determined, the method 1300 then identifies one or more handover or supplementation candidate nodes (e.g., per the process of step 1210 of FIG. 12) and established the link per step 1312. For example, the supplemental link may be an external node 406 such as that shown in FIG. 9b which is within sufficient range of the CPEe 413.

Per step 1314, the two (or more) links are operated in parallel such that the required performance is supported. This may include "splitting" of data as previously described, allocation of slices to particular links, allocation of certain types of traffic to certain links, and so forth as previously described herein.

FIGS. 14a-14d illustrate various exemplary implementations of methods of providing service to premises devices under varying conditions, according to the present disclosure.

Figure 14A:
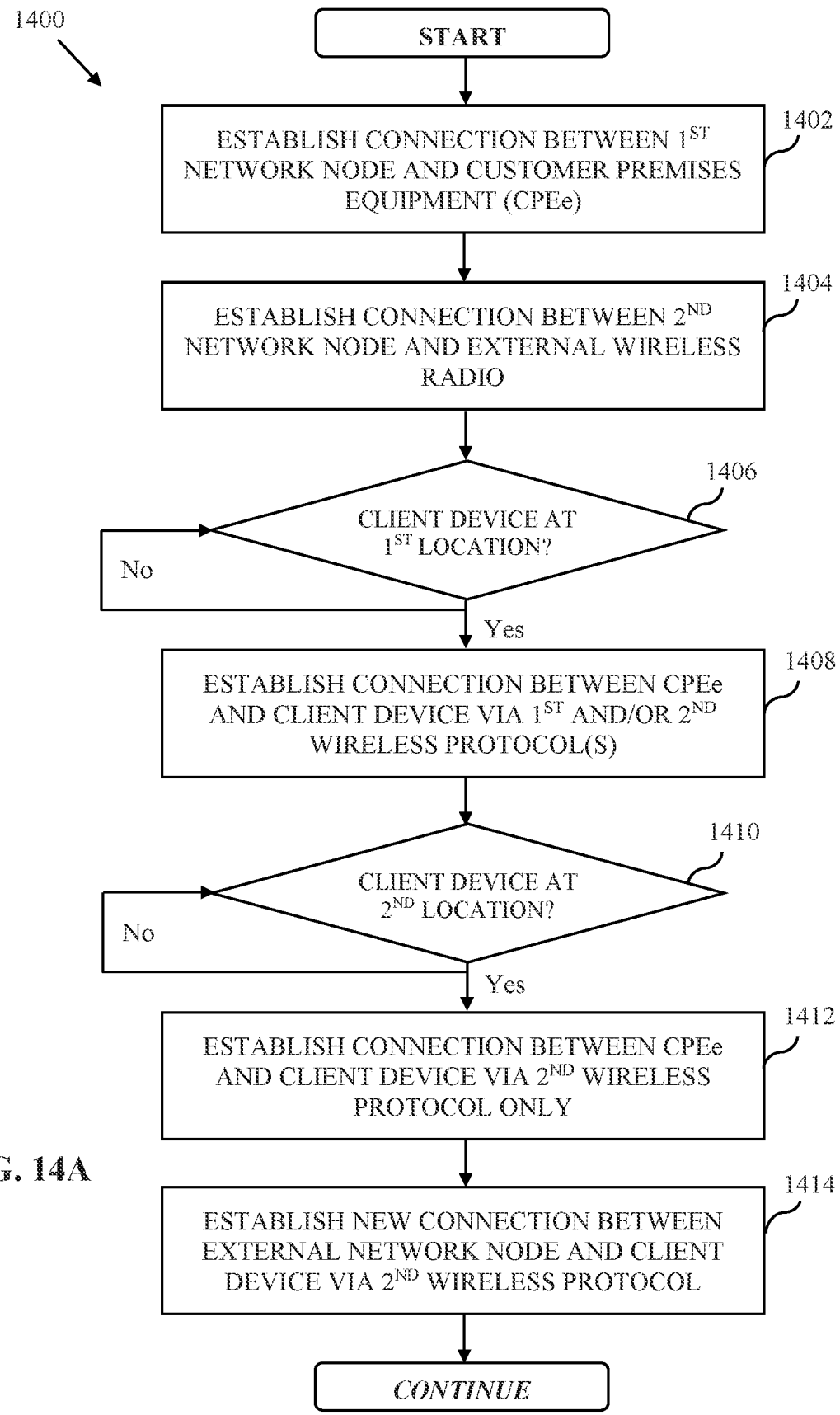
FIGS. 14a-14d are logical flow diagrams illustrating various exemplary implementations of methods of providing service to premises devices under varying conditions, according to the present disclosure.
Figure 14A:
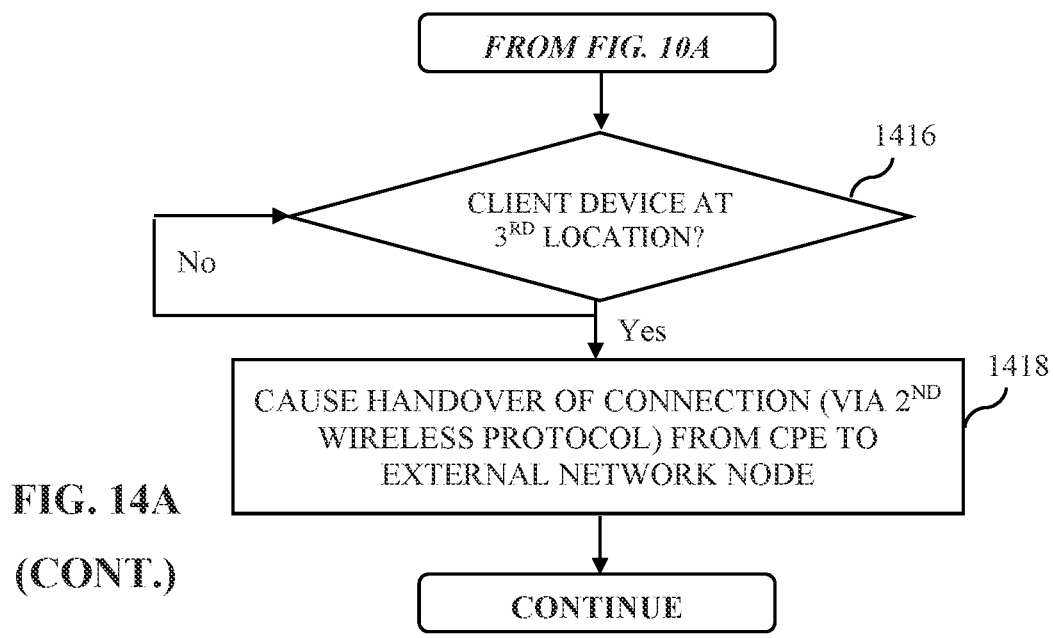

FIG. 14a illustrates one variant of a method 1400 for an enhanced network controller (e.g., CUe 404 as discussed above or gNodeB as a logical entity) to enable a wireless-enabled client device to seamlessly and without interruption receive data from a 5G-enabled network while moving from within, e.g., a premises to outside the same premises.

At step 1402, the controller causes establishment of a data connection between a first network node and a customer premises equipment. In one exemplary embodiment, the first network node includes an enhanced distribution unit (e.g., DUe 409 as discussed above) installed in the extant HFC (and/or optical) infrastructure. The DUe is a network node that receives requested data packets from the core/CUe and delivers them to one or more premises, and vice versa.

It is appreciated that the "backhaul" and the "fronthaul" in a 5G transport network may be fused together into a functionally split "crosshaul" that is dynamically reconfigurable and flexibly implemented based on various factors. For example, at one end of the scale, a 5G-enabled network may accommodate a backhaul and legacy access point or base station used in, e.g., a traditional cloud network. At the other end, a "fog" network may be configured to exchange data through densely distributed wireless radio access nodes, e.g., gNBs (including DUe's), mobile devices, cells, and premises equipment. These widely distributed access nodes may further leverage the enhanced communication protocol with the ubiquity of access nodes to achieve the aforementioned ultra-high data rate and ultra-low latency. A "crosshaul" may have properties of both a backhaul and a fronthaul, in which the infrastructure supports data exchange with a centralized server, e.g., disposed at a backend portion, as well as with various "edge" devices. For example, new data that is not contained within the fog may be delivered to a DU/DUe that "seeds" the data to one or more edge devices.

Returning to the exemplary embodiment, in one variant, the DUe may be disposed closer to the edge of the network, i.e., proximate to user premises (e.g., a house). In a different variant, the DUe is located closer to the backend. DUe that is closer to the user premises is advantageous for, inter alia, leveraging populated areas that already have an existing infrastructure that can support numerous DUe modules, which may allow faster access to the network via a user's client device. Locations lacking in infrastructure may require data to endure a longer trip to DUe that is located closer to the backend; however, such networks may not require much "enhancement" by a network operator. Users may still enjoy a relatively improved experience via 4G/4.5G/5G connectivity.

In the exemplary embodiment, the controller 404 manages data accessed at, e.g., a server entity in the core or elsewhere in the network, and delivers it to one or more DUe(s). Each DUe 409 is configured to deliver the data to the premises. In some variants, a given DUe may manage a service group, a group of subscribers, or a type of content (e.g., video, audio, gaming content). A given premises may receive the data from the DUe via a 4G/4.5G/5G-enabled enhanced customer premises equipment (e.g., CPEe 413 as discussed above and further discussed below). In some variants, the DUe may connect to a router in the premises or a splitter along the backhaul or the fronthaul of the HFC system, each output of the router or splitter being connected to a CPEe.

At step 1404, the controller causes establishment of a data connection between a second network node and an external wireless radio. In the exemplary embodiment, the second network node is another enhanced distribution unit (e.g., DUe 409) in the extant HFC architecture. The external wireless radio may a pole-mounted (or other structure-mounted, hanging, carried by aircraft or autonomous drone, etc.) 4G/4.5G/5G radio access node (e.g., external radio access node 406a). The external radio access node receives data signals from the DUe and relays the signals to client devices and/or other radio access nodes when connected. Since the radio access node may interact with many other upstream or downstream entities, the radio access node may include a memory storage module or buffer as well as a processor apparatus to process the incoming and outgoing data as well as to manage the data stored in the memory, as described further below.

At step 1406, the controller 404 (or a node acting as its proxy, such as the CPEe) determines whether the client device 407 is at a first location (or otherwise meets the "proximity" criteria). The first location may refer to a location within the bounds of a predetermined area or a relative distance or range of distance from another network entity. In the exemplary embodiment, the first location is within the premises at a particular distance range from the CPEe (e.g., position A of FIG. 9b). The CPEe may use for example monitoring techniques described elsewhere herein to measure the distance to the client device. In another embodiment, the client device may use a positioning system (e.g., GPS) to locate its approximate location (within error). This determined position may also be with respect to established real or artificial boundaries. For instance, if the client device is within the bounds of an area designated with a street address (e.g., 123 Main Street), the client device may deem itself to be within the designated premises. In one related example, a user who steps outside of the designated area (e.g., to a backyard area) may indicate that the user's serving CPEe that the client device is no longer in the first area.

In some variants, the client device may require software (e.g., mobile application or app) acquired from the core network/MSO and/or allow transmission of location data. In other cases, the client device must be subscribed to the services provided by the 5G network. The client device may transmit this location information to the CPEe and ultimately the controller 404.

Presence at a particular location may also be inferred from other sources by the controller 404 (or UE 407 itself), such as via accelerometer and/or photo/light sensor on the UE. For example, a moving UE with comparatively high level of light incident (consistent with being outdoors in daylight) can be differentiated from other states, such as no movement in comparative darkness (i.e., the user presumed to be asleep or the UE inside the user's coat or pocketbook). Use of certain apps or functions on the UE may also be used as a basis for such "context" determination; i.e., if the user invokes a map or guidance app for walking directions to some location, they can be inferred to be walking outside of their premises. Numerous other such mechanisms for inferring user context/position will be appreciated by those of ordinary skill when given the present disclosure.

In one embodiment, the controller 404 (or a node acting as its proxy, such as the CPEe) checks the location of the client device 407 periodically, at predetermined intervals. In another embodiment, the frequency of checking the location is determined dynamically. For example, in one variant, the frequency is based on the last determined distance of the client device from the CPEe, and/or trending (e.g., determination that client or UE 407 is moving away from the CPEe 413 causes a higher frequency of determination). In one approach, as the client device moves farther from the CPEe, the distance of the client device becomes more relevant for modifying the connectivity as will be further described below.

In another variant, a signal strength of the link(s) between the client device and the CPEe is used to determine the frequency of checking. In one implementation, if the signal strength of either of the WLAN or 4G/4.5G/5G link is below a particular threshold, this may indicate to the controller 404 and the CPEe that the client device is ready to leave the premises. In another implementation, the signal strength of only the WLAN connection is considered. In yet another implementation, the rate of change in signal strength may be used to create a presumption that the client device is moving toward or away from the CPEe. The controller may check for the location of the client device if it detects a steady drop in the signal strength (or distance) over a period of time.

At step 1408, if the client device is at/within the first location as determined in step 1406, the controller (or a node acting as its proxy) establishes a data connection between the CPEe 413 and the client device 407 via first and/or second wireless air protocols. In the exemplary embodiment, the first wireless protocol may be a WLAN protocol (e.g., Wi-Fi or another Std. 802.11 protocol). The second wireless protocol is a 3GPP-based protocol to allow the 4G/4.5G/5G connectivity as described elsewhere herein. As will be further described below, each the CPEe and the client device has one or more network interfaces (RATs) that allow exchange of data via these protocols. The controller thereby enables data to be transmitted to the client device using either or both WLAN and 4G/4.5G/5G protocols if desired. However, in different embodiments, only either the 3GPP (4G/4.5G/5G) connectivity, or only the WLAN connectivity, may be used at any given time, such as may be predicated on UE 407 battery condition or other criteria.

In one embodiment, data transmissions via WLAN and 4G/4.5/5G may be simultaneous. For example, the requested data being received by/transmitted from the UE 407 may be split and delivered via both protocols. Such split data may be delivered/transmitted using different time-frequency resources as well.

In another embodiment, only the WLAN connectivity is utilized while the client device 407 is fully indoors, i.e., at location A in FIG. 9*b*. In this case, the 4G/4.5/5G link may be instantiated only when the client device is sufficiently distant, as described with respect to step 1410 infra, or other criteria are met (e.g., sufficient degradation of signal quality or channel parameters).

At step 1410, the controller 404 (or a node acting as its proxy, such as the CPEe) determines whether the client device is located at a second location (or otherwise meets the "proximity" criteria). Similar to the first location above, the second location may refer to a location within the bounds of a predetermined area or a relative distance or range of distance from another network entity. In the exemplary embodiment, the second location is outside the premises but still sufficiently proximate to the premises and/or the CPEe (e.g., position B of FIG. 9*b*). In one variant, the controller may determine that the client device is in a second location based on a range from the CPEe using the techniques noted above. In another variant, the controller may determine that the client device is in a second location based on the client being outside a predetermined area (e.g., not in the street address) and/or within another area (e.g., on a street) using GPS services accessible by the client device; the controller may request this location information from the client device. Signal strength, channel quality, or other data including the inferential methods described above, may be used as well or in place of the foregoing, whether alone or in various combinations.

If the client device is not in the second location, i.e., it has not moved from the first location to the second location, the controller does not proceed further, but rather enters a wait state. The client device continues to receive data from and/or transmit data to the CPEe via WLAN and 4G/4.5G/5G connectivity.

At step 1412, if the client device is at the second location as determined in step 1010, the controller establishes a data connection between the CPEe and the client device via the second wireless protocol only (e.g., via 4G/4.5G/5G). That is, the controller causes the CPEe to disconnect the connection established via the first wireless protocol. In the exemplary embodiment, the WLAN connection is severed, and the client device only receives data via the 4G/4.5G/5G connection.

Further, at step 1414, the controller establishes a new connection between the external network node (which the controller has connected a DUe to in step 1404) and the client device via the second wireless protocol (e.g., 4G/4.5G/5G). The concurrent connection to the client device via both the external node and the CPEe (in some cases via a common waveform protocol; i.e., 4G/4.5G/5G) is part of a transition, and in fact enables the transition, from the first position to the second position (and to the third position below).

At step 1416, the controller (or a node acting as its proxy, such as the CPEe) determines whether the client device is in a third location (or otherwise meets the "proximity" criteria). In various embodiments, the third location may refer to a location (e.g., position C of FIG. 9*b*) outside the service range of the CPEe, outside a predetermined or dynamically determined range from the CPEe (but still within the service range), and/or within a range from the external radio access node (e.g., 406*a*). The controller may be aware of the distance from the external node based on data acquired by the node, e.g., with monitoring techniques (e.g., sending and receiving heartbeat signals) as noted previously. GPS-based location detection may also be performed by the client device, as may the previously described exemplary inferential techniques or yet others.

Similar to the determinations of distance or signal strength relative to the CPEe described above, the controller 404 may check for the third location based on distance or signal strength relative to the external radio access node 406*a*, as well as (or in place of) any measurements or data relative to the CPEe 413.

At step 1418, the controller causes disconnection of the client device from the CPEe after the connection to the external node is established (e.g., RRC Connected state is achieved), thereby completing the handover to the outdoor radio access node, which the client is connected to via the supplemental link created in step 1014. The client device thus begins exchanging data with the core network via the 4G/4.5G/5G connection with only the outdoor radio access node. The transition from indoor to outdoor connectivity is made seamless in one variant by using the common 4G/4.5G/5G wireless protocol. Further, the client device may continue to connect to other outdoor nodes using prior handover methods.

It will also be appreciated that the logic referenced above may be permuted; e.g., the determination of presence at the third location may be a predicate for establishment of the connection between the UE 407 and the external node 406*a*.

In an alternate embodiment, the handover may occur only when the supplemental link with the external radio access node is determined to be sufficiently robust. For example, the supplemental link must have a signal/channel quality, signal strength, ping, and/or available number of channels that is above a prescribed threshold.

Figure 14B:
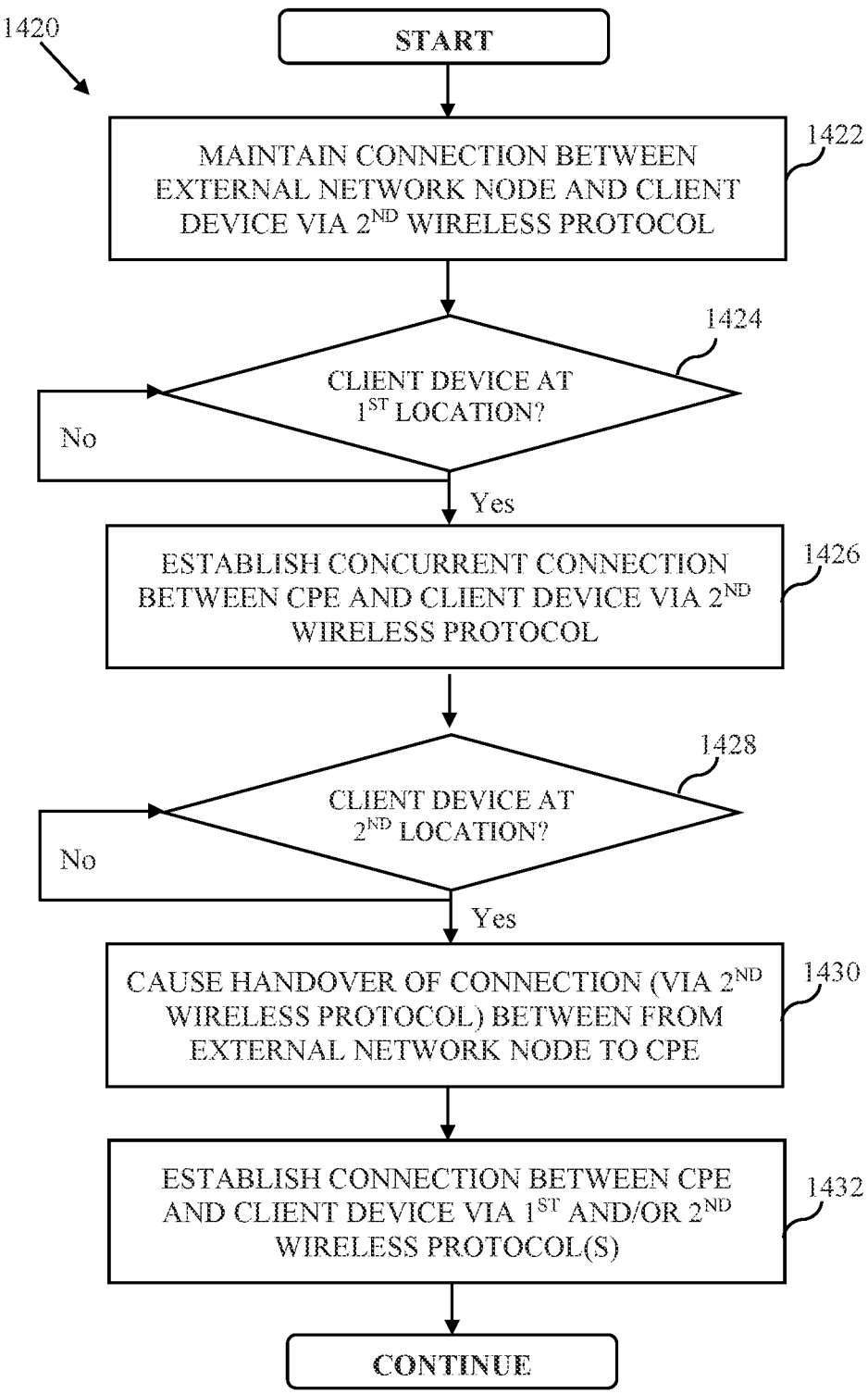

The controller may further proceed in reverse to achieve a seamless outdoor-to-indoor transition of data delivery to the client device, as described now with respect to FIG. 14*b*.

As shown, FIG. 14*b* illustrates an exemplary method 1420 for an enhanced network controller (e.g., CUe 404 as discussed above or gNodeB as a logical entity) to enable a wireless-enabled client device to seamlessly and without interruption receive data from a 5G-enabled network while moving from outside a premises to inside the premises.

At step 1422, the controller 404 has established the connection between the external radio access node and the client device via the second wireless protocol (e.g., 4G/4.5G/5G connectivity), as a result of steps 1402 through 1418 as previously described with respect to FIG. 14*a*.

At step 1424, the controller determines whether the client device is located at a first location (or otherwise meets the "proximity" criteria). In the exemplary embodiment, the first location is outside a premises (e.g., a house) and sufficiently proximate to the premises and/or a CPEe associated with the premises to be detected by the CPEe associated with the premises, or other means as described above.

In one embodiment, the controller 404 may send an instruction to the CPEe 413 to check for the presence of the client device 407, periodically or at dynamic intervals, when the client device is connected to or detected by a node in the "edge" of the 5G network proximate the premises or associated with the premises (e.g., based on e.g., association with a known AP or eNB/gNB or WLAN AP, distance, zip code, assigned property boundaries, or yet other mechanism). Such edge nodes may include the external radio access node 406*a* and/or another client device 407*n* in communication with the controller or one or more DUe(s) 409. As used in this context, the term "proximate" is not limited to spatial or geographic proximity, but also may include e.g., topological proximity (e.g., within the same SG, within so many "hops" on the network, etc.). The presence of the client device proximate a nearby edge node associated with the premises may indicate to the controller that the client device is also near the premises (along with other premises served by the controller 404).

In another embodiment, the CPEe may check for the presence of the client device continuously regardless of a determination of whether the client device is nearby.

If the controller has not determined that the client device is in the first location, i.e., the client device remains "outside" the premises, the controller (or a node acting as its proxy, such as the CPEe) continues to check, per step 1424.

If the controller 404 determines that the client device is in the first location, the controller causes a connection between the CPEe and the client device via the 4G/4.5G/5G interface at step 1426, similar to the concurrent connections as described with respect to step 1414 of FIG. 14*a*. Data may be transmitted by the controller or the core network to the client device redundantly or separately. The common 4G/4.5G/5G protocol used by the external node and the CPEe 413 in one implementation further facilitates enables a transition process that is seamless to the user while the UE is moving into the premises.

Next, the controller (or a node acting as its proxy, such as the CPEe) determines at step 1428 whether the client device is in a second location. In the exemplary embodiment, the second location is fully within the premises. In other embodiments, the second location may be within a particular distance, range, topological proximity, or signal strength with respect to the CPEe.

At step 1430, if the client device is determined to be in the second location (e.g., inside the premises) or otherwise meets the "proximity" criteria, the controller causes a handover from the external radio access node to the CPEe. In other words, the 4G/4.5G/5G link between the external node is disconnected, while the 4G/4.5G/5G link created at step 1426 is maintained. During this handover process, the client continues to exchange requested data with the CPEe via the 4G/4.5G/5G links.

At step 1432, the controller causes the CPEe to establish a link via WLAN. In another embodiment, the WLAN connectivity is utilized exclusively when the client device is fully indoors. That is, the 4G/4.5G/5G link may be disconnected when the client device is sufficiently proximate to or connected with the CPEe. In another embodiment, only the 4G/4.5G/5G connectivity is utilized; i.e., the controller does not instruct the CPEe to establish a link with the WLAN interface. This may be useful in, inter alia, cases where a client device is constantly moving in and out of range of the CPEe, e.g., vehicular, autonomous, or industrial implementations where the client device (e.g., car, drone) may be far distances in a relatively short period of time.

One of ordinary skill in the relevant art will appreciate that in various other embodiments, the controller may also cause the client device 407 to perform some or all of the steps and functions described above, e.g., via instructions sent through the CPEe 413, the external radio access node 406*a*, or other entities within the network infrastructure (e.g., DUe 409). Similarly, in further embodiments, the controller may also cause the external radio access node to perform some or all of the steps and functions described above.

For instance, in one embodiment, the client device may initiate the first and second wireless data connections with the CPEe and/or the external radio access node depending on the location of the client device, such location being detected based on, e.g., GPS signals or signal strength from one or more network nodes (e.g., CPEe, external radio access node).

In another embodiment, the external radio access node may initiate the supplemental connection to the client device when the client device is outside the premises. The radio access node may also disconnect the link with the client device when the device is sufficiently distant (e.g., outside its range; based on instructions or information from client device, CPEe, or controller). Other similar embodiments will become apparent given the present disclosure.

Figure 14C:
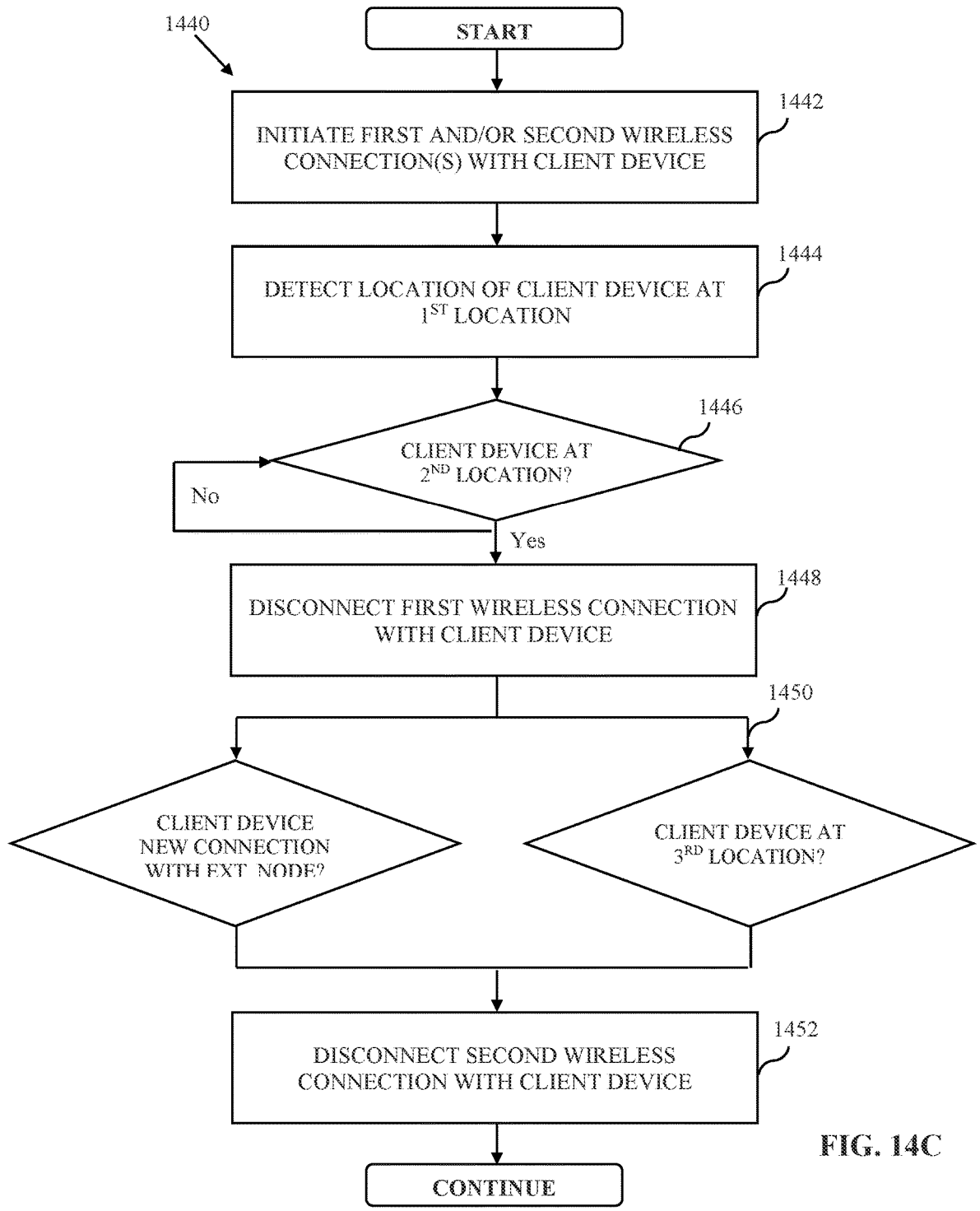

FIG. 14*c* illustrates an exemplary method 1440 for a consumer premises equipment resident in a user's premises to enable a wireless-enabled client device to seamlessly receive uninterrupted data from a 5G-enabled network while moving from within the premises to outside the premises.

At step 1442, the consumer premises equipment initiates one or more wireless data connections with a mobile client device within the service range of the CPE. In one exemplary embodiment, the CPE is an "enhanced" premises equipment (CPEe) 413. As but one example, the CPEe may be a modem device that is configured to receive, packetize, and transmit digital data and digitally rendered content wirelessly over various types of wireless air interfaces, including via WLAN (e.g., Wi-Fi) and 3GPP-based protocols (e.g., 4G, 4.5G, 5G). Hence, each of the one or more wireless data connections may be made via respective first and second wireless data interfaces on the CPE, each of these interfaces being configured to operate via respective first and second wireless air protocols (e.g., WLAN and 4G/4.5G/5G).

The CPEe 413 receives data from a 5G-enabled core network. The data is delivered by, e.g., a controller unit (e.g., CUe 404) along the crosshaul of the 5G network; however, other nodes within the network (e.g., DUe, other client devices, external radio access nodes, or structure-mounted small cells) may contribute to the routing of data from its source. In another embodiment, the CPEe may receive the data via a supplemental input link to an outdoor antenna 416 that also receives data from the core network (e.g., via an external radio access node 406). In another embodiment, multiple CPEe 413 may be present within the premises that relay the data to one another by wired or wireless means. Larger premises such as enterprise locations and buildings may use a DAS (distributed antenna system) to chain multiple nodes (as discussed within co-owned and co-pending U.S. application Ser. No. 16/216,835 filed Dec. 11, 2018 previously incorporated herein). In some such multiple-CPEe embodiments, each CPEe may have overlapping or non-overlapping service areas depending on cost considerations and the extent of the need for robust coverage and contingent redundancy (in case of partial failures, outages, etc. when exchanging critical or sensitive data). For instance, the present disclosure also contemplates use of one CPEe to cover two or more proximate premises, such as under a shared arrangement.

At step 1444, the CPEe 413 monitors the position of the client device 407. In one embodiment, the CPEe may determine the position using roundtrip transmission time of signals broadcasted to the client device. In another embodiment, the client device may periodically send GPS-based location data to the CPEe via one or both of the established connections. Yet other mechanisms as previously described herein (including e.g., inferential mechanisms) may be used as well. In one variant, by monitoring the location of the client device, the CPEe 413 (or a designated determination proxy, such as the DUe 409 or CUE 404) may determine a velocity, acceleration, and/or direction (e.g., vectors) of the client device, such as to predict future location, invoke handover procedures, etc. The CPEe may further determine the signal strength of the one or more data connections and the rate of change thereof to infer a change in location.

The CPEe may further determine that the client device is within a first location that is within a particular range of the CPEe or within a defined location (e.g., within bounds designated to a street address), or otherwise meets the "proximity" criteria. In this case, the CPEe maintains its data links via the respective first and second wireless protocols.

At step 1446, the CPEe 413 also may determine whether the client device is moving toward to at a second location that is within a different range from the CPEe that is greater than the range associated with the first location. In some variants, the second location may be determined as being within a range of the boundary designated to a location (e.g., street address), or relative to a known functional point. For instance, if the client device is within sufficient proximity of a door to a dwelling (e.g., as determined by GPS mapping data or other such means), the CPEe may infer that the client device is heading out of the premises. In one implementation, the vector of the client device's movement may also be taken into consideration; e.g., the client device is heading to a boundary of the premises and is also within a particular distance from the boundary or designated functional point (e.g., door).

At step 1448, when the CPEe determines according to step 1444 that the client device is at the second location, the CPEe disconnects the first link. In the exemplary embodiment, the CPEe disconnects the WLAN link so as to leave the client device connected to it via the 4G/4.5G/5G connection. Not only may the 4G/4.5G/5G link carry a relatively greater distance than WLAN, maintaining the 4G/4.5G/5G link enables the client device to receive a third, supplemental data link with an external 5G-enabled wireless access node via the same 4G/4.5G/5G protocol.

At step 1450, the CPEe determines whether the client device is connected via the third data link. In the exemplary embodiment, the third data link is a 4G/4.5G/5G connection from an external radio access node located outside the premises, e.g., on a street. During this simultaneous connection with the CPEe 413 and the external node, the client device receives the data from the core network via one or both of these connections. In some variants, the data may be redundantly delivered in duplicate or received in portions, as described above.

To determine that the client device 407 is in data communication with another node, the CPEe may request connectivity information from the client device relating with current connections, to be transmitted to the CPEe 413 via the 4G/4.5G/5G link (or through the third data link). In one embodiment, the information may comprise a data structure that lists identities and connection status of other nodes accessible to the client device 407. For example, the structure might comprise an IE (3GPP information element) with fields, tuples, etc., that use an identifier recognized to the core network, connection status, a network address, signal strength, channel ID, Cell ID (CID), Sector ID (identifying, e.g., location information with respect to the external node; sectors of antennas, e.g., bi-sector antennas, tri-sector antennas; type of antenna(s) used, e.g., omnidirectional), RNC-ID (ID of the Radio Network Controller). This information may also optionally be matched against known information stored at the core or other entities in the network including at least some CUe(s), DUe(s), CPEe(s), other base stations or external nodes, 5GC, etc. In some variants, the information may be encrypted (using AES, PGP or other algorithms) and/or hashed (using MD5, SHA, SHA-2 or other algorithms) so as to maintain the privacy of client devices that may be connected to other client devices. This protected information may be compared with stored hash values and/or decrypted using a key available to the user of the client device.

In another embodiment, the CPEe 413 determines the location of the client device using techniques similar to those described above with respect to step 1404.

At step 1452, the CPEe disconnects the second wireless link over the 4G/4.5G/5G protocol when it is determined that the client device is connected to the network via the third link (determined in step 1408 discussed above given the connectivity information). In another embodiment, the CPEe also accounts for the location of the client device. For instance, if the CPEe determines that the client device has connected to an external node recognized by the core network and that the client device is in a location at a third location that is beyond a set range from the CPEe (determined by, e.g., GPS), then the CPEe initiates the disconnection of the second link, i.e., the 4G/4.5G/5G link.

As a result, the client device is now connected to the external radio access node via its 4G/4.5G/5G link. The client device nonetheless receives the data uninterrupted by virtue of connectivity via the common 4G/4.5G/5G protocol, without having to reinitiate a different session as prior implementations would if switching between different types of network or different managed networks of the same type (e.g., to a cellular network from a WLAN connection).

Figure 14D:
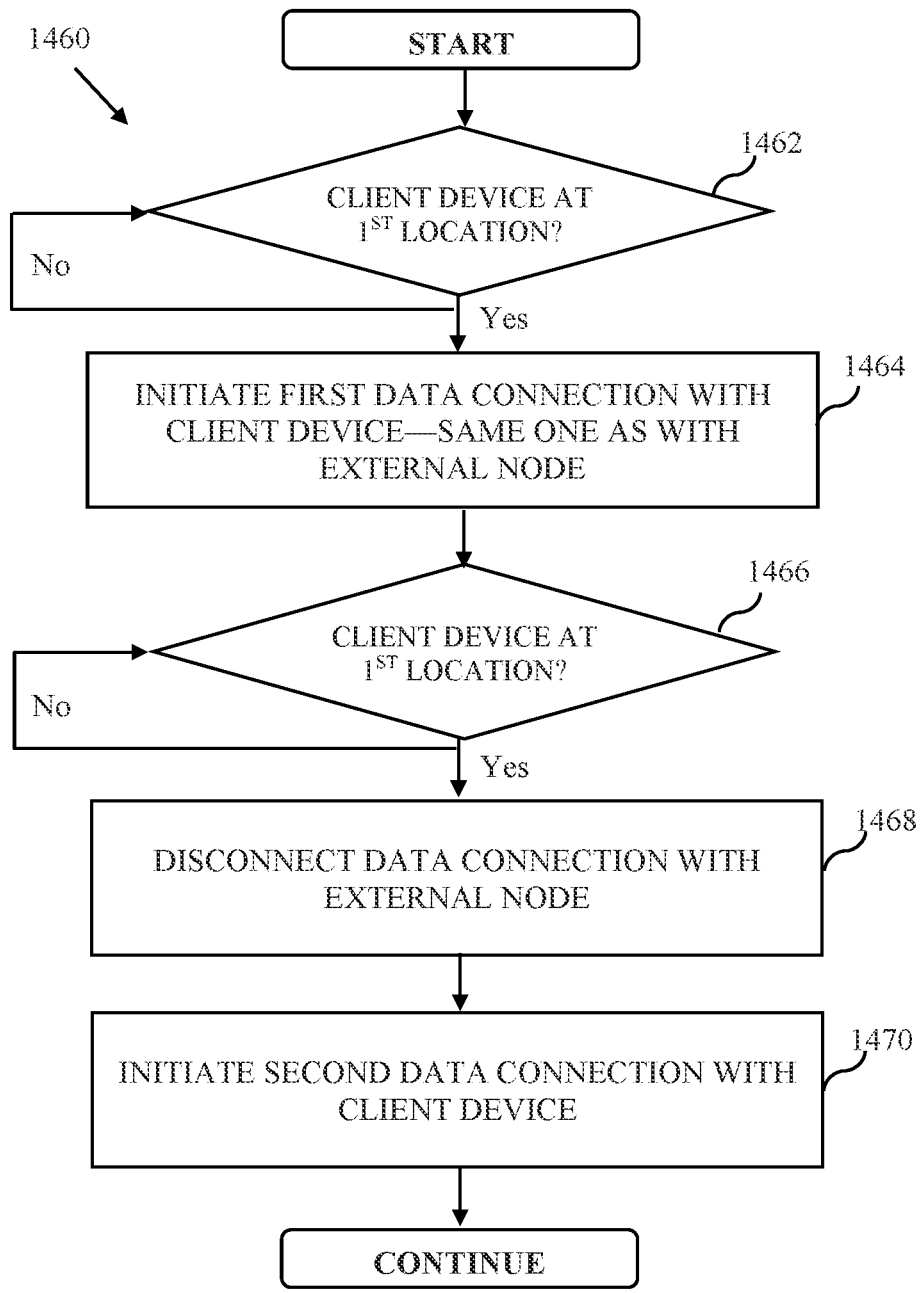

FIG. 14d illustrates an exemplary method 1460 for an enhanced CPE to enable a wireless-enabled client device to seamlessly and without interruption receive data from a 5G-enabled network while moving from outside a premises to inside the premises.

A client device that participates in the 5G "fog" network in data communication with one or more external nodes of the network (e.g., another client device 407n, a pole-mounted radio access node 406, or other) that is attempting to move into a premises, whether for the first time or back into the user's dwelling (e.g., after steps 1402 through 1410 of FIG. 14a), may also experience a seamless transition from the outside the premises to indoors. In the exemplary embodiment, the connection is via the 4G/4.5G/5G protocol on the client device and the external node.

At step 1462, the CPEe detects whether the client device in a first location, for example, near the boundaries of the premises as described above. To accomplish this detection, the CPEe may occasionally or periodically monitor its surroundings to e.g., measure the distance of nearby client devices using pings, RTT, GPS monitoring, etc., or use other means as noted above.

At step 1464, if the CPEe determines that the client device is in the first location (or otherwise meets the "proximity" criteria), the CPEe initiates a data connection with the client device via one of the wireless protocols described above. In the exemplary embodiment, the CPEe initiates a 4G/4.5G/5G data connection so as to maintain the uninterrupted exchange of data that the client device is engaging with the external node. This 4G/4.5G/5G data connection is concurrent with the preexisting 4G/4.5G/5G connection with the external node, thereby allowing simultaneous data transfer over both links.

At step 1466, the CPEe whether the client device in a second location. In the exemplary embodiment, the second location is within the premises. In other embodiments, this location may include other designated areas that are served by the CPEe.

At step 1468, the CPEe causes the client device to disconnect the link with the external node. In one variant, the disconnection is caused by an instruction from the CPEe that is readable by the client device, e.g., using a software application downloadable from the core network. In another variant, the CPEe may request to a controller entity (e.g., CUe) of the core network to instruct the node to disconnect. In another variant, the client device may allow the connection to lapse naturally from the device being too distant from the external node.

At step 1470, optionally, the CPEe may initiate a connection to another wireless communication protocol, e.g., WLAN, whether concurrently or separately from the newly initiated 4G/4.5G/5G connection (step 1128).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a radio frequency (RF) network so that extant infrastructure is used to enable intra-network mobility of a client device, the computerized method comprising:

transmitting OFDM (orthogonal frequency division multiplexing) waveforms over at least a portion of the extant infrastructure using at least a frequency band wider in frequency than a normal operating band of the extant infrastructure;

receiving at least a first portion of the transmitted OFDM waveforms via a premises device disposed at a premises;

receiving at least a second portion of the transmitted OFDM waveforms via a radio device external to the premises, the radio device external to the premises in data communication with the premises device;

enabling establishment of a radio frequency connection between the client device and the premises device;

determining that the established radio frequency connection is insufficient to meet one or more QoS (quality of service) or QoE (quality of experience) requirements required by the client device;

based on the determining, causing establishment of a radio frequency connection between the client device and the radio device external to the premises to supplement the radio frequency connection between the client device and the premises device for at least a period of time; and utilizing both of the radio frequency connections between (i) the client device and the premises device, and (ii) the client device and the radio device external to the premises, to cause delivery to the client device of the at least first portion of the OFDM waveforms received by the premises device and the at least second portion of the OFDM waveforms received by the radio device external to the premises, respectively, such that the one or more QoS or QoE requirements are met;

wherein each session associated with the radio frequency connections between (i) the client device and the premises device, and (ii) the client device and the radio device external to the premises are controlled by a common controller apparatus disposed at a headend of the extant infrastructure.

2. The computerized method of claim 1, wherein the extant infrastructure comprises a hybrid fiber coax (HFC) infrastructure, and at least one of (i) the radio frequency connection between the client device and the premises device, and (ii) the radio frequency connection between the client device and the radio device external to the premises, is configured for data delivery at rates in excess of 1 Gbps.

3. The computerized method of claim 2, wherein the frequency band wider in frequency than the normal operating band of the extant infrastructure comprises a frequency band of at least 1.6 GHz in total bandwidth.

4. The computerized method of claim 3, further comprising allocating the frequency band of at least 1.6 GHz in total bandwidth to two or more sub-bands.

5. The computerized method of claim 1, wherein the premises comprises a served premises associated with a user or subscriber of a network operator of the extant infrastructure.

6. The computerized method of claim 1, further comprising:
terminating the radio frequency connection between the premises device and the client device after the radio frequency connection between the radio device external to the premises and the client device has been established; and
causing all OFDM waveforms destined for the client device to be transmitted to the radio device external to the premises.

7. The computerized method of claim 1, further comprising upconverting the at least first portion of the OFDM waveforms received via the premises device to a user frequency band.

8. The computerized method of claim 7, further comprising upconverting the at least second portion of the OFDM waveforms received via the radio device external to the premises to the user frequency band.

9. The computerized method of claim 8, wherein the establishments of the radio frequency connections between the premises device and the client device and between the radio device external to the premises and the client device each comprise establishment via a 3GPP (Third Generation Partnership Project) wireless protocol, and the user frequency band comprises at least one unlicensed frequency that is designated for use with at least one 3GPP unlicensed standard.

10. The computerized method of claim 9, wherein the at least one 3GPP unlicensed standard comprises at least one of: (i) a 5G NR-U (New Radio-Unlicensed) standard, or (ii) an LTE (Long Term Evolution) unlicensed standard.

11. The computerized method of claim 1, wherein the transmitting OFDM waveforms over at least the portion of the extant infrastructure using at least the frequency band wider in frequency than the normal operating band of the extant infrastructure comprises transmitting the OFDM waveforms over at least coaxial cable and via a plurality of amplifier stages associated with the coaxial cable.

12. The computerized method of claim 1, wherein:
the premises device comprises a wireless local area network (WLAN)-compliant premises device;
the radio device external to the premises comprises a Third Generation Partnership Project (3GPP)-compliant radio node; and
the common controller apparatus enables internetworking between Wi-Fi and 3GPP technologies to maintain session continuity between the WLAN-compliant premises device and 3GPP-compliant radio node using multiple system operator (MSO)-only control functions.

13. A network architecture configured to support wireless user devices, the network architecture comprising:
a distribution node, the distribution node configured to transmit radio frequency (RF) waveforms onto a wireline or optical medium of a network, the RF waveforms being orthogonal frequency division multiplex (OFDM) modulated;
at least one wireless local area network (WLAN)-compliant user node in data communication with the wireline or optical medium and comprising a receiver apparatus configured to receive at least a first portion of the transmitted OFDM modulated waveforms;
at least one Third Generation Partnership Project (3GPP)-compliant radio node in data communication with the distribution node, the at least one 3GPP-compliant radio node configured to receive at least at least a second portion of the transmitted OFDM modulated waveforms and provide, via the second portion of the transmitted OFDM modulated waveforms, supplemental data communication to the at least one WLAN-compliant user node in order to provide a prescribed threshold level of coverage to a wireless user device; and
computerized controller apparatus in data communication with the at least one WLAN-compliant user node and the at least one 3GPP-compliant radio node, the computerized controller apparatus comprising logic configured to effectuate at least one of:
(i) handover of the wireless user device at least from the at least one WLAN-compliant user node to the at least one 3GPP-compliant radio node; or
(ii) creation of simultaneous wireless connections between a) the wireless user device and the at least one WLAN-compliant user node, and b) the wireless user device and the at least one 3GPP-compliant radio node;
wherein the computerized controller apparatus comprises a Third Generation Partnership Project (3GPP) Fifth Generation New Radio (5G NR) $X_n$ interface for data communication with a Fifth Generation Core (5GC), and an Internet Protocol (IP) address of the wireless user device is anchored at the 5GC and connected to the Internet over an N6 interface of the 5GC.

14. The network architecture of claim 13, wherein the computerized controller apparatus comprises a 3GPP 5G NR (New Radio) compliant central unit (CU), and the at least one 3GPP-compliant radio node comprises a 3GPP 5G NR (New Radio) compliant distributed unit (DU).

15. The network architecture of claim 13, further comprising at least one wireless local area node controller in data communication with the distribution node, the at least one wireless local area node controller configured to cooperate with the distribution node to effect handover of one or more wireless sessions between the at least one WLAN-compliant user node and the at least one 3GPP-compliant radio node.

16. The network architecture of claim 13, wherein the at least one one WLAN-compliant user node operates within a first unlicensed frequency band, and the at least one 3GPP-compliant radio node operates within a second unlicensed frequency band different from the first unlicensed frequency band.

17. The network architecture of claim 13, wherein the effectuation of the at least one of: (i) or (ii) above, comprises effectuation without use of connection manager logic of the wireless user device configured to control a preferential connection to the at least one 3GPP-compliant radio node or the at least one WLAN-compliant user node.

18. The network architecture of claim 13, wherein:
the network comprise a hybrid fiber coax (HFC) infrastructure operated by a multiple systems operator (MSO); and
the at least one WLAN-compliant user node and the at least one 3GPP-compliant radio node are each backhauled by the HFC infrastructure.

19. The network architecture of claim 13, wherein the computerized controller apparatus further comprises:
a 3GPP Fifth Generation New Radio (5G NR) F1 interface operative over at least a wireline data bearer medium for data communication with at least one WLAN-compliant user node; and
a 3GPP 5G NR F1 interface operative over at least a dense wave division multiplexed (DWDM) optical data bearer for data communication with the at least one 3GPP-compliant radio node.

20. A method of operating a content distribution network, the method comprising:
delivering waveforms via at least a radio frequency medium of the content distribution network to a first node disposed at a premises;
enabling a first wireless communication session between a wireless user device and the first node, the first wireless communication session enabling delivery of the waveforms to the wireless user device;
determining a condition necessitating handover of the wireless user device from the first node;
delivering the waveforms via the at least radio frequency medium of the content distribution network to a second node disposed external to the premises;
causing creation of a wireless connection between the wireless user device and the second node;
causing handover of the first wireless communication session from the first node to the second node; and
continuing operation of the first wireless communication session via the wireless connection between the wireless user device and the second node, the continued operation comprising continuing delivery of the waveforms to the wireless user device;
wherein at least the determining of the condition necessitating the handover of the wireless user device from the first node comprises utilizing a centralized Wi-Fi controller integrated with a Fifth Generation Core (5GC) at a distribution hub disposed at a headend of the content distribution network, the centralized Wi-Fi controller configured to provide intra-node mobility between at least the first and second nodes using multiple system operator (MSO)-only control functions, thereby obviating a need to utilize an interface with an external mobile network operator (MNO) entity or connection manager logic of the wireless user device to effect the handover.

21. The method of claim 20, further comprising selecting the second node from a plurality of candidate nodes, the selecting at least based on at least one of (i) spatial or physical location relative to the premises, or (ii) topological location within the content distribution network.

22. The method of claim 20, further comprises causing the wireless user device and the first node to exchange data relating to respective cellular data network capabilities of the wireless user device and the first node, the exchange of the data comprising provision of an information element (IE) by the first node to the wireless user device, the IE indicting whether overlapping cellular data network coverage exists between the first node and the second node.

* * * * *